US012659095B2

(12) United States Patent
Tang et al.

(10) Patent No.: US 12,659,095 B2
(45) Date of Patent: Jun. 16, 2026

(54) DATA TRANSMISSION METHOD, RELATED APPARATUS, AND DEVICE

(71) Applicant: HUAWEI TECHNOLOGIES CO., LTD., Shenzhen (CN)

(72) Inventors: Penghe Tang, Nanjing (CN); Qi Yu, Hangzhou (CN); Wenkui Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 270 days.

(21) Appl. No.: 18/370,563

(22) Filed: Sep. 20, 2023

(65) Prior Publication Data

US 2024/0014958 A1     Jan. 11, 2024

Related U.S. Application Data

(63) Continuation of application No. PCT/CN2022/082137, filed on Mar. 22, 2022.

(30) Foreign Application Priority Data

Mar. 22, 2021    (CN) .......................... 202110303162.2

(51) Int. Cl.
 *H04L 5/00* (2006.01)
 *H04L 1/1607* (2023.01)
 *H04L 1/1829* (2023.01)

(52) U.S. Cl.
 CPC .......... *H04L 5/0044* (2013.01); *H04L 1/1642* (2013.01); *H04L 1/1835* (2013.01); *H04L 5/0053* (2013.01)

(58) Field of Classification Search
 CPC ... H04L 5/0044; H04L 5/0053; H04L 1/1642; H04L 47/625; H04L 47/622
 See application file for complete search history.

(56) References Cited

U.S. PATENT DOCUMENTS

2012/0224646 A1*   9/2012   Purohit ..................... H04L 5/06
                                                                    375/259

FOREIGN PATENT DOCUMENTS

CN          108650061 A       10/2018
CN          110830386 A        2/2020

* cited by examiner

*Primary Examiner* — Jamal Javaid
(74) *Attorney, Agent, or Firm* — WOMBLE BOND DICKINSON (US) LLP

(57) ABSTRACT

Embodiments of this application disclose a data transmission method, a related apparatus, and a device. In the method, a transmit end device obtains a plurality of pieces of packet data in a transmission sequence and encapsulates the plurality of pieces of packet data in the transmission sequence, to obtain N pieces of encapsulated packet data, and sends the N pieces of encapsulated packet data to a receive end device in the transmission sequence through a plurality of communication links. The receive end device receives the plurality of pieces of encapsulated packet data and perform unpacking processing on the plurality of pieces of encapsulated packet data, to obtain the plurality of pieces of packet data and packet sequence numbers, determine the transmission sequence based on the packet sequence numbers of the plurality of pieces of packet data, and send the plurality of pieces of packet data in the transmission sequence.

21 Claims, 13 Drawing Sheets

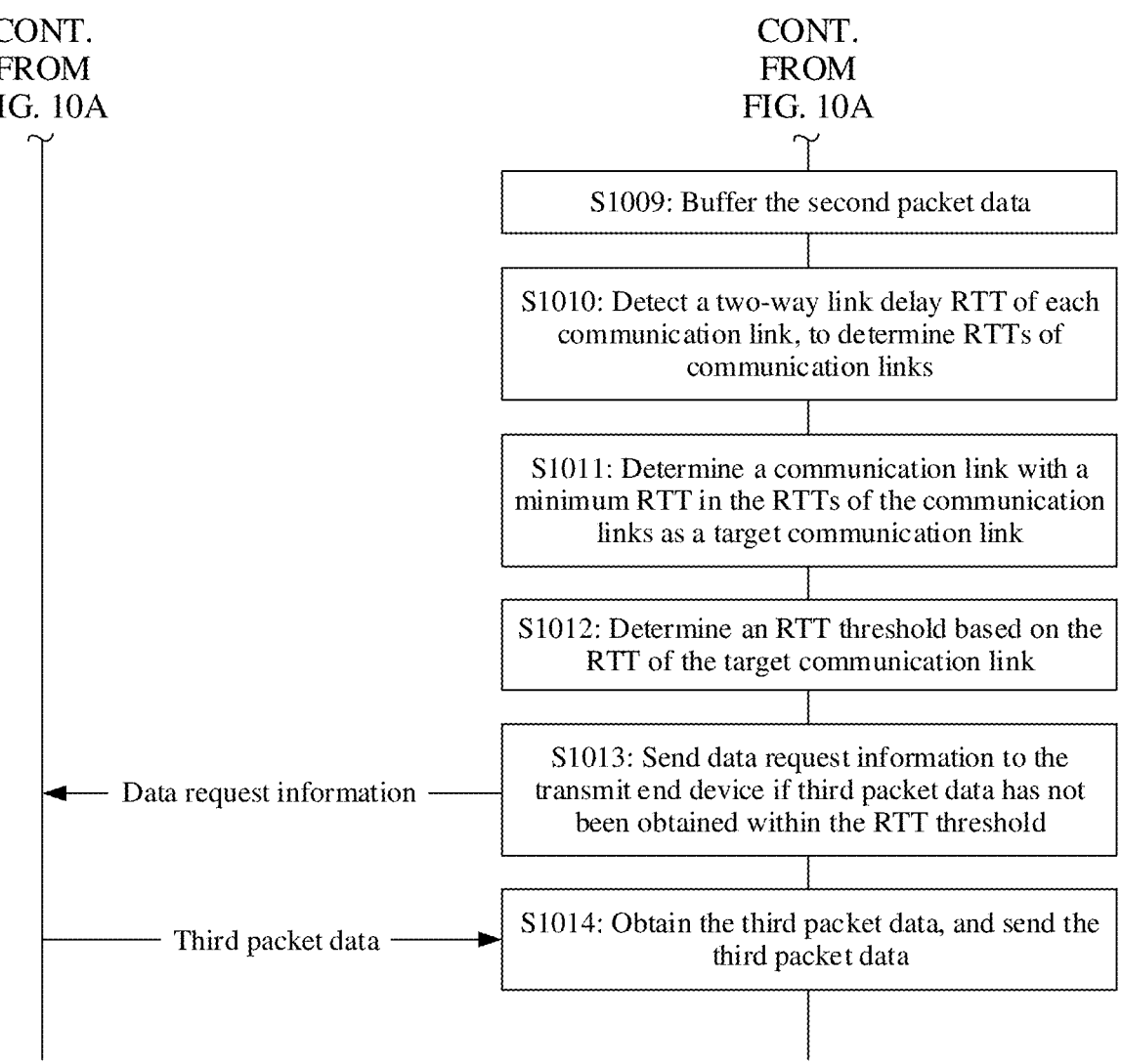

CONT.
FROM
FIG. 10A

CONT.
FROM
FIG. 10A

S1009: Buffer the second packet data

S1010: Detect a two-way link delay RTT of each communication link, to determine RTTs of communication links S1011: Determine a communication link with a minimum RTT in the RTTs of the communication links as a target communication link S1012: Determine an RTT threshold based on the RTT of the target communication link ◄— Data request information —

S1013: Send data request information to the transmit end device if third packet data has not been obtained within the RTT threshold ———— Third packet data ——►

S1014: Obtain the third packet data, and send the third packet data

FIG. 10B

DATA TRANSMISSION METHOD, RELATED APPARATUS, AND DEVICE

CROSS-REFERENCE TO RELATED APPLICATIONS

This application is a continuation of International Application No. PCT/CN2022/082137, filed on Mar. 22, 2022, which claims priority to Chinese Patent Application No. 202110303162.2, filed on Mar. 22, 2021. The disclosures of the aforementioned applications are hereby incorporated by reference in their entireties.

TECHNICAL FIELD

Embodiments of this application relate to the communication field, and in particular, to a data transmission method, a related apparatus, and a device.

BACKGROUND

With development of communication technologies, people have a growing requirement for a high data rate and user experience. Therefore, people have an increasing requirement for a proximity service for knowing and communicating with surrounding people or things. Based on this, most application scenarios of wireless communication technologies relate to the field of things-to-things communication, and a minority of application scenarios relate to the field of people-to-things communication. In a 5th generation (5G) mobile communication technology, applications of 5G to business (5GtoB) include but are not limited to security surveillance, industrial manufacturing, a power grid, smart medical, and smart education. 5G communication standards can satisfy real-time and stability requirements of industrial communication, and promote application innovation of industrial technologies. However, there are still many technical difficulties in bandwidth, delay, slicing, and edge-cloud collaboration to be overcome, to enable applications, platforms, networks, and edges to collaboratively achieve intelligence in the industrial manufacturing field. The industrial field is used as an example. An industrial scenario is particularly more sensitive to network reliability, delay, and jitter. Therefore, how to resolve these problems in a network aspect determines whether 5G can be commercially used on a large scale in the industrial manufacturing field.

Currently, for some scenarios that do not support or are inconvenient to deploy a wired connection, a wireless fidelity (Wi-Fi) network connection or a 5G connection is used to resolve a network connectivity problem, so that data transmission can be performed in a scenario with a wireless network connection.

However, because the wireless network connection is greatly affected by environment and weather interference, in an industrial production environment, a delay, jitter, and reliability of a network connection cannot be ensured. Consequently, when data transmission is performed in a network in which a delay, jitter, and reliability cannot be ensured, a delay of the data transmission is increased and reliability of the data transmission is reduced. Therefore, how to reduce a delay of data transmission and improve reliability of data transmission in a wireless network connection is a problem to be urgently resolved.

SUMMARY

This application provides a data transmission method, a related apparatus, and a device. After unpacking encapsulated packet data, a receive end device can determine, based on included packet sequence numbers, that obtained packet data is sent in a transmission sequence, to ensure that the data is sent in the transmission sequence, thereby improving reliability of data transmission. In addition, a transmit end device sends encapsulated packet data through a plurality of communication links, so that a delay of data transmission can be reduced.

According to a first aspect of this application, a data transmission method is provided. The method may be performed by a receive end device or may be performed by a chip configured in a receive end device. This is not limited in this application. In the method, a receive end device first receives, through a communication link, a plurality of pieces of encapsulated packet data sent by a transmit end device. The plurality of pieces of encapsulated packet data are obtained by encapsulating a plurality of pieces of packet data in a transmission sequence, each piece of encapsulated packet data includes packet data and a packet sequence number, the packet sequence number indicates a rank of corresponding encapsulated packet data in the plurality of pieces of encapsulated packet data, and a rank of each piece of encapsulated packet data in the plurality of pieces of encapsulated packet data is consistent with that in the transmission sequence. Then, the receive end device performs unpacking processing on the plurality of pieces of encapsulated packet data, to obtain the plurality of pieces of packet data and packet sequence numbers of the plurality of pieces of packet data, determines the transmission sequence based on the packet sequence numbers of the plurality of pieces of packet data, and finally sends the plurality of pieces of packet data in the transmission sequence.

In an embodiment, after unpacking encapsulated packet data, a receive end can determine, based on included packet sequence numbers, that obtained packet data is sent in a transmission sequence, to ensure that the data is sent in the transmission sequence, thereby improving reliability of data transmission.

In an embodiment of this application, encapsulated packet data further includes indication information, where the indication information indicates a target packet loss processing policy. Therefore, before the receive end device receives, through the communication link, the plurality of pieces of encapsulated packet data sent by the transmit end device, the receive end device further needs to send an acknowledgment message to the transmit end device. The acknowledgment message indicates that the receive end device supports the target packet loss processing policy.

In an embodiment, as the acknowledgment message can indicate that the receive end device supports the target packet loss processing policy, the transmit end device can further encapsulate, based on the acknowledgment message, the indication information that indicates the target packet loss processing policy in an encapsulation process. Therefore, the encapsulated packet data can include the indication information, so that when determining that packet loss occurs, the receive end device can perform packet loss processing based on the target packet loss processing policy indicated by the indication information, thereby ensuring that data transmission can be performed in order, and further improving reliability of data transmission.

In an embodiment of this application, the plurality of pieces of encapsulated packet data include first packet data and second packet data, a packet sequence number of the first packet data indicates that a rank of the first packet data in the plurality of pieces of encapsulated packet data is prior to a rank of the second packet data in the plurality of pieces of encapsulated packet data, and the first packet data and the second packet data are adjacent packet data in the plurality of pieces of encapsulated packet data. Based on this, the receive end device can perform unpacking processing on the plurality of pieces of encapsulated packet data, to obtain the second packet data and a packet sequence number of the second packet data, and then determine, based on the packet sequence number of the second packet data, that the second packet data is sent after the first packet data. In this case, if the receive end device can determine that the first packet data has been sent, as the first packet data and the second packet data are adjacent packet data, the second packet data can be sent in the transmission sequence.

In an embodiment, after performing unpacking processing on the encapsulated packet data, the receive end device can obtain the packet data included in the encapsulated packet data, and determine the transmission sequence based on the packet sequence numbers of the packet data. When packet data before the packet data has been sent, it can be determined that there is no packet loss in this case. Therefore, the packet data can continue to be sent, and in this case, data transmission is order-preserving, thereby improving reliability of data transmission.

In an embodiment of this application, the plurality of pieces of encapsulated packet data include first packet data and second packet data, a packet sequence number of the first packet data indicates that a rank of the first packet data in the plurality of pieces of encapsulated packet data is prior to a rank of the second packet data in the plurality of pieces of encapsulated packet data, and the first packet data and the second packet data are non-adjacent packet data in the plurality of pieces of encapsulated packet data.

In an embodiment, the plurality of pieces of encapsulated packet data received by the receive end device include non-adjacent packet data. In other words, packet loss occurs in this data transmission process. In this case, packet loss processing needs to be performed based on a packet loss processing policy, thereby improving diversity and feasibility of this solution.

In an embodiment of this application, when packet loss occurs, the receive end device performs unpacking processing on the plurality of pieces of encapsulated packet data to obtain the second packet data and the packet sequence number of the second packet data, and determines, based on the packet sequence number of the second packet data, that the second packet data is sent after the first packet data. If it is determined that the first packet data has been sent, as the first packet data and the second packet data are non-adjacent packet data, it is likely that the second packet data is directly sent out of order, and therefore the second packet data needs to be buffered. Based on this, the receive end device further performs unpacking processing on the plurality of pieces of encapsulated packet data. Third packet data and a packet sequence number of the third packet data can be obtained, the packet sequence number of the third packet data indicates that a rank of the third packet data in the plurality of pieces of encapsulated packet data is posterior to a rank of the first packet data in the plurality of pieces of encapsulated packet data, and the third packet data and the first packet data are adjacent packet data in the plurality of pieces of encapsulated packet data, that is, the third packet data is next packet data of the first packet data. In this case, the receive end device sends the third packet data.

In an embodiment, the receive end device buffers packet data (namely, the second packet data) in an incorrect transmission sequence indicated by a packet sequence number. The transmit end device sends a plurality of pieces of encapsulated packet data through a plurality of communication links. Therefore, after unpacking processing is performed on a plurality of pieces of encapsulated packet data received through another communication link, packet data (namely, the third packet data) in a correct transmission sequence indicated by a packet sequence number can be obtained, that is, the packet data in the correct transmission sequence indicated by the packet sequence number can be sent, and a sequence of data transmission can be ensured, satisfying order-preserving requirements, thereby ensuring reliability of data transmission.

In an embodiment of this application, when packet loss occurs, the receive end device performs unpacking processing on the plurality of pieces of encapsulated packet data to obtain the second packet data, a packet sequence number of the second packet data, and a target packet loss processing policy. The target packet loss processing policy includes a first packet loss processing policy. Then, the receive end device determines, based on the packet sequence number of the second packet data, that the second packet data is sent after the first packet data. As the first packet data and the second packet data are non-adjacent packet data, it is likely that the second packet data is directly sent out of order. Therefore, if it is determined that the first packet data has been sent, the first packet loss processing policy needs to be executed. Specifically, the receive end device buffers the second packet data. If a buffer time of the second packet data is greater than a first time threshold, the receive end device sends the second packet data. If the receive end device may receive, through another communication link within the first time threshold, encapsulated packet data including the third packet data, the receive end device unpacks the encapsulated packet data to obtain the third packet data, and sends the third packet data. Optionally, the first time threshold may be a minimum value (for example, 10 milliseconds (ms)) of a buffer that can be allowed by a service corresponding to a plurality of pieces of packet data, or the first time threshold may be a maximum value (for example, 1 second (s)) of a buffer that can be allowed by a service corresponding to a plurality of pieces of packet data. This is not limited in this embodiment.

In an embodiment, when the first time threshold is the minimum value of the buffer that can be allowed by the service corresponding to the plurality of pieces of packet data, lost packet data (for example, the third packet data) may be optionally discarded or forwarded on subsequent arrival, to reduce a delay increased by buffering packet data, thereby reducing a delay of data transmission. Alternatively, when the first time threshold is the maximum value of the buffer that can be allowed by the service corresponding to the plurality of pieces of packet data, the receive end device waits for lost packet data (for example, the third packet data) to arrive as much as possible, so that order preserving of data transmission can be ensured, thereby ensuring reliability of data transmission.

In an embodiment of this application, when packet loss occurs, the receive end device performs unpacking processing on the plurality of pieces of encapsulated packet data to obtain the second packet data, a packet sequence number of the second packet data, and a target packet loss processing policy. The target packet loss processing policy includes a second packet loss processing policy. Then, the receive end device determines, based on the packet sequence number of the second packet data, that the second packet data is sent after the first packet data. As the first packet data and the second packet data are non-adjacent packet data, it is likely that the second packet data is directly sent out of order.

Therefore, if it is determined that the first packet data has been sent, the second packet loss processing policy needs to be executed. Specifically, the receive end device determines a first time point at which first encapsulated packet data is received and a second time point at which second encapsulated packet data is received. The first encapsulated packet data includes the first packet data, and the second encapsulated packet data includes the second packet data. When a difference between the first time point and the second time point is greater than a second time threshold, the receive end device sends the second packet data. For example, when a service with a high jitter requirement is performed, a transmission time interval of a plurality of data packets is set to 10 ms for packet data transmission, and a second time threshold is 13 ms. If a time interval between two pieces of received adjacent encapsulated packet data is greater than 13 ms, a data transmission link or operation may be faulty. In this case, next packet data is directly sent without considering a transmission sequence. It should be understood that the target packet loss processing policy may further include a first packet loss processing policy and a second packet loss processing policy. In other words, data transmission is processed based on both jitter and a delay, or jitter and order preserving. Details are not further described herein.

In an embodiment, some services have a high requirement on a jitter time. In other words, transmission of a plurality of data packets is expected to be performed within a specific time interval. Based on this, considering the jitter time, when a time interval between two pieces of adjacent encapsulated packet data is greater than the second time threshold, even if packet data in an incorrect transmission sequence is obtained by unpacking, the packet data is still sent, so that some services that have a high requirement on the jitter time can be ensured, thereby improving flexibility and feasibility of data transmission.

In an embodiment of this application, when packet loss occurs, the receive end device performs unpacking processing on the plurality of pieces of encapsulated packet data to obtain the second packet data, a packet sequence number of the second packet data, and a target packet loss processing policy. The target packet loss processing policy includes a third packet loss processing policy. Then, the receive end device determines, based on the packet sequence number of the second packet data, that the second packet data is sent after the first packet data. As the first packet data and the second packet data are non-adjacent packet data, it is likely that the second packet data is directly sent out of order. Therefore, if it is determined that the first packet data has been sent, the third packet loss processing policy needs to be executed. Specifically, the receive end device buffers the second packet data. The receive end device sends data request information to the transmit end device when the receive end device has not obtained third packet data within a round trip time (RTT) threshold (also referred to as a round trip link delay threshold). The data request information carries a packet sequence number of the third packet data. The data request information indicates the transmit end device to determine the third packet data based on the packet sequence number of the third packet data and send the third packet data to the receive end device through a target communication link, where the target communication link is a communication link with a minimum RTT; and the RTT threshold is determined based on the RTT of the target communication link. Based on this, after sending the data request information, the receive end device performs unpacking processing on a plurality of pieces of encapsulated packet data obtained through another communication link. If third packet data can be obtained, the receive end device directly sends the third packet data obtained by unpacking without waiting for the transmit end device to retransmit the third packet data. Alternatively, if the receive end device fails to obtain third packet data by unpacking processing after sending the data request information, the receive end device needs to wait for the transmit end device to retransmit the third packet data, and then send the third packet data. During actual application, both the foregoing two cases may occur. How the receive end device obtains the third packet data is not limited. It should be understood that the target packet loss processing policy may further include a combination of at least one of a first packet loss processing policy, a second packet loss processing policy, and a third packet loss processing policy. Details are not further described herein.

In an embodiment, when a packet of encapsulated packet data sent through another communication link has not been received within the RTT threshold, the data request information is actively sent to the transmit end device, that is, a packet loss retransmission request is performed, and retransmitted packet data is received through a communication link with a minimum RTT. Therefore, a buffer waiting time and a possibility of packet loss can be reduced, so that optimization and balancing of packet loss and a delay can be implemented, improving efficiency of data transmission, and reducing a delay of data transmission, thereby ensuring reliability of data transmission.

In an embodiment of this application, the receive end device detects an RTT of each communication link to determine RTTs of communication links, then determines a communication link with a minimum RTT in the RTTs of the communication links as the target communication link, and determines the RTT threshold based on the RTT of the target communication link. In this embodiment, ½ of the RTT of the target communication link is determined as the RTT threshold. During actual application, the RTT threshold may be ⅓ or the like of the RTT of the target communication link. This needs to be flexibly limited based on a service requirement.

In an embodiment, the communication link with the minimum RTT is determined, so that after determining packet data with packet loss, the transmit end performs data retransmission through the communication link with the minimum RTT, thereby reducing a buffer waiting time, and further reducing a delay of data transmission.

In an embodiment of this application, the receive end device can receive, through an original communication link, a plurality of pieces of encapsulated original packet data and a plurality of pieces of redundant data that are sent by the transmit end device. The original packet data is packet data that has not been replicated, the original communication link is a communication link for sending the original packet data, the redundant data is generated by grouping the plurality of pieces of packet data based on a preset condition and performing forward error correction (FEC) encoding on a plurality of pieces of packet data that belong to a same group, and a plurality of pieces of encapsulated original packet data that belong to a same group and redundant data corresponding to the group include a same group identifier.

In an embodiment, a plurality of pieces of packet data that have not been replicated are the most complete and have a low error rate. Therefore, FEC encoding is performed on the plurality of pieces of packet data to generate redundant data with high accuracy, so that the most accurate and error-free data can be obtained when the redundant data is subsequently used to repair packet data, thereby further ensuring reliability of data transmission.

In an embodiment of this application, the first packet data, the second packet data, and the third packet data are all the original packet data, the first packet data, the second packet data, and the third packet data include a same group identifier, and redundant data that includes the same group identifier as the first packet data, the second packet data, and the third packet data is target redundant data. When packet loss occurs, the receive end device performs unpacking processing on the plurality of pieces of encapsulated packet data to obtain the second packet data, a packet sequence number of the second packet data, and a target packet loss processing policy. The target packet loss processing policy includes a fourth packet loss processing policy. Then, the receive end device determines, based on the packet sequence number of the second packet data, that the second packet data is sent after the first packet data. Based on this, if it is determined that the first packet data has been sent and the first packet data is buffered in an FEC buffer queue, as the first packet data and the second packet data are non-adjacent packet data, it is likely that the second packet data is directly sent out of order, and therefore the fourth packet loss processing policy needs to be executed. Specifically, the receive end device obtains the first packet data from the FEC buffer queue, and then performs repair processing based on the first packet data, the second packet data, and the target redundant data, to obtain the third packet data. The receive end device sends the third packet data. Based on this, if the receive end device can obtain third packet data by performing unpacking processing on a plurality of pieces of encapsulated packet data obtained through another communication link when performing repair processing, the receive end device does not continue to perform the repair processing, but directly sends the third packet data obtained by unpacking. Alternatively, if the receive end device fails to obtain third packet data by unpacking processing when performing repair processing, the receive end device needs to wait for the repair processing to be completed to obtain the third packet data, and then sends the third packet data. During actual application, both the foregoing two cases may occur. A manner of obtaining the third packet data sent by the receive end device is not limited.

In an embodiment, because the first packet data, the second packet data, and the third packet data are all the original packet data, that is, the target redundant data is generated based on the first packet data, the second packet data, and the third packet data, repair of packet data based on redundant data with high accuracy can obtain the most accurate and error-free third packet data, thereby further ensuring reliability of data transmission.

According to a second aspect of this application, another data transmission method is provided. The method may be performed by a transmit end device or may be performed by a chip configured in a transmit end device. This is not limited in this application. In the method, the transmit end device obtains a plurality of pieces of packet data in a transmission sequence, and then encapsulates the plurality of pieces of packet data in the transmission sequence, to obtain a plurality of pieces of encapsulated packet data. Each piece of encapsulated packet data includes packet data and a packet sequence number. The packet sequence number indicates a rank of corresponding encapsulated packet data in the plurality of pieces of encapsulated packet data. A rank of each piece of encapsulated packet data in the plurality of pieces of encapsulated packet data is consistent with that in the transmission sequence. Then, the transmit end device sends the plurality of pieces of encapsulated packet data to a receive end device in the transmission sequence through N communication links. N is an integer greater than or equal to 2.

In an embodiment, the transmit end device can send encapsulated packet data through a plurality of communication links, so that efficiency of data transmission can be improved, thereby reducing a delay of data transmission.

In an embodiment of this application, each piece of encapsulated packet data further includes indication information, where the indication information indicates a target packet loss processing policy. Therefore, the transmit end device needs to receive an acknowledgment message sent by a receive end device. The acknowledgment message indicates that the receive end device supports a target packet loss processing policy.

In an embodiment, as the acknowledgment message can indicate that the receive end device supports the target packet loss processing policy, the transmit end device can further encapsulate, based on the acknowledgment message, the indication information that indicates the target packet loss processing policy in an encapsulation process. Therefore, when packet loss occurs, the receive end device can perform packet loss processing based on the target packet loss processing policy indicated by the indication information, thereby ensuring that data transmission can be performed in order, and further improving reliability of data transmission.

In an embodiment of this application, the plurality of pieces of encapsulated packet data include first packet data and second packet data, a packet sequence number of the first packet data indicates that a rank of the first packet data in the plurality of pieces of encapsulated packet data is prior to a rank of the second packet data in the plurality of pieces of encapsulated packet data, and the first packet data and the second packet data are adjacent packet data in the plurality of pieces of encapsulated packet data.

In an embodiment, the plurality of pieces of encapsulated packet data include the first packet data and the second packet data that are adjacent packet data. In other words, it can be determined that the receive end device receives the plurality of pieces of encapsulated packet data in the transmission sequence, that is, no packet loss occurs. In this way, the receive end device continues to perform order-preserving data transmission, thereby improving reliability of data transmission.

In an embodiment of this application, the plurality of pieces of encapsulated packet data include first packet data and second packet data, a packet sequence number of the first packet data indicates that a rank of the first packet data in the plurality of pieces of encapsulated packet data is prior to a rank of the second packet data in the plurality of pieces of encapsulated packet data, and the first packet data and the second packet data are non-adjacent packet data in the plurality of pieces of encapsulated packet data.

In an embodiment, as the first packet data and the second packet data are non-adjacent packet data, it can be determined that packet loss occurs in a process of sending the plurality of pieces of encapsulated packet data to the receive end device. In this case, the receive end device needs to perform packet loss processing based on a packet loss processing policy, thereby improving diversity and feasibility of this solution.

In an embodiment of this application, the target packet loss processing policy includes a first packet loss processing policy. Specifically, the first packet loss processing policy is that the receive end device buffers the second packet data, and the receive end device sends the second packet data when a buffer time of the second packet data is greater than a first time threshold.

In an embodiment, when packet loss occurs, the receive end device can perform packet loss processing based on the target packet loss processing policy included in the encapsulated packet data, thereby improving feasibility of this solution. In addition, the receive end device can ensure order preserving of data transmission, thereby ensuring reliability of data transmission.

In an embodiment of this application, the target packet loss processing policy includes a second packet loss processing policy. Specifically, the second packet loss processing policy is that the receive end device determines a first time point at which first encapsulated packet data is received and a second time point at which second encapsulated packet data is received, where the first encapsulated packet data includes the first packet data, and the second encapsulated packet data includes the second packet data; and the receive end device sends the second packet data if a difference between the first time point and the second time point is greater than a second time threshold.

In an embodiment, when packet loss occurs, the receive end device can perform packet loss processing based on the target packet loss processing policy included in the encapsulated packet data, thereby improving feasibility of this solution. In addition, the receive end device can improve flexibility and feasibility of data transmission.

In an embodiment of this application, the target packet loss processing policy includes a third packet loss processing policy. Specifically, the third packet loss processing policy is that the receive end device buffers the second packet data; the receive end device sends data request information to the transmit end device if the receive end device has not obtained third packet data within an RTT threshold, where the data request information carries a packet sequence number of the third packet data; the data request information indicates the transmit end device to determine the third packet data based on the packet sequence number of the third packet data and send the third packet data to the receive end device through a target communication link, where the target communication link is a communication link with a minimum RTT; and the RTT threshold is determined based on the RTT of the target communication link; and the receive end device obtains the third packet data, and sends the third packet data.

In an embodiment, when packet loss occurs, the receive end device can perform packet loss processing based on the target packet loss processing policy included in the encapsulated packet data, thereby improving feasibility of this solution. In addition, the receive end device can reduce a buffer waiting time and a possibility of packet loss, to implement optimization and balancing of packet loss and a delay, improve efficiency of data transmission, and reduce a delay of data transmission, thereby ensuring reliability of data transmission.

In an embodiment of this application, the transmit end device may further receive the data request information sent by the receive end device, determine the third packet data based on the packet sequence number of the third packet data, and finally send the third packet data to the receive end device through the target communication link.

In an embodiment, lost packet data is sent through a communication link with a minimum RTT, thereby improving efficiency of data transmission and reducing a delay of data transmission.

In an embodiment of this application, the transmit end device may further group the plurality of pieces of packet data based on a preset condition, and perform FEC encoding on a plurality of pieces of packet data that belong to a same group, to generate redundant data corresponding to the group. A plurality of pieces of packet data in each group are adjacent, and a plurality of pieces of packet data that belong to a same group and redundant data corresponding to the group include a same group identifier. Based on this, the transmit end device encapsulates the plurality of pieces of packet data in the transmission sequence, to obtain the plurality of pieces of encapsulated packet data. A plurality of pieces of encapsulated packet data that belong to a same group and redundant data corresponding to the group include a same group identifier. Then, the transmit end device replicates the plurality of pieces of packet data, and encapsulates a plurality of pieces of replicated packet data in the transmission sequence, to obtain a plurality of pieces of encapsulated replicated packet data.

In an embodiment, the plurality of pieces of packet data are replicated to obtain data with similar information included in the packet data, and a plurality of communication links are selected for sending the data, thereby improving feasibility of backups.

In an embodiment of this application, the plurality of pieces of packet data are a plurality of pieces of original packet data, the plurality of pieces of encapsulated packet data are a plurality of pieces of encapsulated original packet data, and a communication link, in the N communication links, for sending the plurality of pieces of encapsulated original packet data is an original communication link. Based on this, the transmit end device can send the plurality of pieces of encapsulated original packet data to the receive end device in the transmission sequence through the original communication link, and send redundant data including a group identifier to the receive end device after a plurality of pieces of encapsulated original packet data including the same group identifier is sent; and send the plurality of pieces of encapsulated replicated packet data to the receive end device in the transmission sequence through N−1 communication links.

In an embodiment, a plurality of communication links are selected to send encapsulated packet data, so that when packet loss occurs on one or more communication links, required packet data can be obtained through another communication link, thereby ensuring reliability of data transmission.

In an embodiment of this application, the target packet loss processing policy includes a fourth packet loss processing policy. Specifically, the fourth packet loss processing policy is that the receive end device obtains the first packet data from an FEC buffer queue, and performs repair processing based on the first packet data, the second packet data, and target redundant data, to obtain the third packet data, where the first packet data, the second packet data, and the third packet data are all the original packet data, the first packet data, the second packet data, and the third packet data include a same group identifier, and redundant data that includes the same group identifier as the first packet data, the second packet data, and the third packet data is the target redundant data; and then the receive end device sends the third packet data.

In an embodiment, when packet loss occurs, because the first packet data, the second packet data, and the third packet data are all the original packet data, that is, the target redundant data is generated based on the first packet data, the second packet data, and the third packet data, the receive end device can repair packet data based on redundant data with high accuracy to obtain the most accurate and error-free third packet data, thereby further ensuring reliability of data transmission.

According to a third aspect of this application, another data transmission method is provided. The method may be performed by a transmit end device or may be performed by a chip configured in a transmit end device. This is not limited in this application. In the method, the transmit end device first receives an acknowledgment message sent by a receive end device. The acknowledgment message indicates that the receive end device supports a target packet loss processing policy. Then, the transmit end device obtains a plurality of pieces of packet data in a transmission sequence; encapsulates the plurality of pieces of packet data in the transmission sequence, to obtain a plurality of pieces of encapsulated packet data, where each piece of encapsulated packet data includes packet data, a packet sequence number, and indication information, the packet sequence number indicates a rank of corresponding encapsulated packet data in the plurality of pieces of encapsulated packet data, a rank of each piece of encapsulated packet data in the plurality of pieces of encapsulated packet data is consistent with that in the transmission sequence, and the indication information indicates the target packet loss processing policy; and finally sends the plurality of pieces of encapsulated packet data to the receive end device in the transmission sequence through N communication links, where N is an integer greater than or equal to 2.

In an embodiment, the transmit end device can send encapsulated packet data through a plurality of communication links, so that efficiency of data transmission can be improved, thereby reducing a delay of data transmission. In addition, as the acknowledgment message can indicate that the receive end device supports the target packet loss processing policy, the transmit end device can further encapsulate, based on the acknowledgment message, the indication information that indicates the target packet loss processing policy in an encapsulation process. Therefore, when packet loss occurs, the receive end device can perform packet loss processing based on the target packet loss processing policy indicated by the indication information, thereby ensuring that data transmission can be performed in order, and further improving reliability of data transmission.

In an embodiment of this application, the plurality of pieces of encapsulated packet data include first packet data and second packet data, a packet sequence number of the first packet data indicates that a rank of the first packet data in the plurality of pieces of encapsulated packet data is prior to a rank of the second packet data in the plurality of pieces of encapsulated packet data, and the first packet data and the second packet data are adjacent packet data in the plurality of pieces of encapsulated packet data.

In an embodiment, the plurality of pieces of encapsulated packet data include the first packet data and the second packet data that are adjacent packet data. In other words, it can be determined that the receive end device receives the plurality of pieces of encapsulated packet data in the transmission sequence, that is, no packet loss occurs. In this way, the receive end device continues to perform order-preserving data transmission, thereby improving reliability of data transmission.

In an embodiment of this application, the plurality of pieces of encapsulated packet data include first packet data and second packet data, a packet sequence number of the first packet data indicates that a rank of the first packet data in the plurality of pieces of encapsulated packet data is prior to a rank of the second packet data in the plurality of pieces of encapsulated packet data, and the first packet data and the second packet data are non-adjacent packet data in the plurality of pieces of encapsulated packet data.

In an embodiment, as the first packet data and the second packet data are non-adjacent packet data, it can be determined that packet loss occurs in a process of sending the plurality of pieces of encapsulated packet data to the receive end device. In this case, the receive end device needs to perform packet loss processing based on a packet loss processing policy, thereby improving diversity and feasibility of this solution.

In an embodiment of this application, the target packet loss processing policy includes a first packet loss processing policy. Specifically, the first packet loss processing policy is that the receive end device buffers the second packet data, and the receive end device sends the second packet data when a buffer time of the second packet data is greater than a first time threshold.

In an embodiment, when packet loss occurs, the receive end device can perform packet loss processing based on the target packet loss processing policy included in the encapsulated packet data, thereby improving feasibility of this solution. In addition, the receive end device can ensure order preserving of data transmission, thereby ensuring reliability of data transmission.

In an embodiment of this application, the target packet loss processing policy includes a second packet loss processing policy. Specifically, the second packet loss processing policy is that the receive end device determines a first time point at which first encapsulated packet data is received and a second time point at which second encapsulated packet data is received, where the first encapsulated packet data includes the first packet data, and the second encapsulated packet data includes the second packet data; and the receive end device sends the second packet data if a difference between the first time point and the second time point is greater than a second time threshold.

In an embodiment, when packet loss occurs, the receive end device can perform packet loss processing based on the target packet loss processing policy included in the encapsulated packet data, thereby improving feasibility of this solution. In addition, the receive end device can improve flexibility and feasibility of data transmission.

In an embodiment of this application, the target packet loss processing policy includes a third packet loss processing policy. Specifically, the third packet loss processing policy is that the receive end device buffers the second packet data; the receive end device sends data request information to the transmit end device if the receive end device has not obtained third packet data within an RTT threshold, where the data request information carries a packet sequence number of the third packet data; the data request information indicates the transmit end device to determine the third packet data based on the packet sequence number of the third packet data and send the third packet data to the receive end device through a target communication link, where the target communication link is a communication link with a minimum RTT; and the RTT threshold is determined based on the RTT of the target communication link; and the receive end device obtains the third packet data, and sends the third packet data.

In an embodiment, when packet loss occurs, the receive end device can perform packet loss processing based on the target packet loss processing policy included in the encapsulated packet data, thereby improving feasibility of this solution. In addition, the receive end device can reduce a buffer waiting time and a possibility of packet loss, to implement optimization and balancing of packet loss and a delay, improve efficiency of data transmission, and reduce a delay of data transmission, thereby ensuring reliability of data transmission.

In an embodiment of this application, the transmit end device may further receive the data request information sent by the receive end device, determine the third packet data based on the packet sequence number of the third packet data, and finally send the third packet data to the receive end device through the target communication link.

In an embodiment, lost packet data is sent through a communication link with a minimum RTT, thereby improving efficiency of data transmission and reducing a delay of data transmission.

In an embodiment of this application, the transmit end device may further group the plurality of pieces of packet data based on a preset condition, and perform FEC encoding on a plurality of pieces of packet data that belong to a same group, to generate redundant data corresponding to the group. A plurality of pieces of packet data in each group are adjacent, and a plurality of pieces of packet data that belong to a same group and redundant data corresponding to the group include a same group identifier. Based on this, the transmit end device encapsulates the plurality of pieces of packet data in the transmission sequence, to obtain the plurality of pieces of encapsulated packet data. A plurality of pieces of encapsulated packet data that belong to a same group and redundant data corresponding to the group include a same group identifier. Then, the transmit end device replicates the plurality of pieces of packet data, and encapsulates a plurality of pieces of replicated packet data in the transmission sequence, to obtain a plurality of pieces of encapsulated replicated packet data.

In an embodiment, the plurality of pieces of packet data are replicated to obtain data with similar information included in the packet data, and a plurality of communication links are selected for sending the data, thereby improving feasibility of backups.

In an embodiment of this application, the plurality of pieces of packet data are a plurality of pieces of original packet data, the plurality of pieces of encapsulated packet data are a plurality of pieces of encapsulated original packet data, and a communication link, in the N communication links, for sending the plurality of pieces of encapsulated original packet data is an original communication link. Based on this, the transmit end device can send the plurality of pieces of encapsulated original packet data to the receive end device in the transmission sequence through the original communication link, and send redundant data including a group identifier to the receive end device after a plurality of pieces of encapsulated original packet data including the same group identifier is sent; and send the plurality of pieces of encapsulated replicated packet data to the receive end device in the transmission sequence through N−1 communication links.

In an embodiment, a plurality of communication links are selected to send encapsulated packet data, so that when packet loss occurs on one or more communication links, required packet data can be obtained through another communication link, thereby ensuring reliability of data transmission.

In an embodiment of this application, the target packet loss processing policy includes a fourth packet loss processing policy. Specifically, the fourth packet loss processing policy is that the receive end device obtains the first packet data from an FEC buffer queue, and performs repair processing based on the first packet data, the second packet data, and target redundant data, to obtain the third packet data, where the first packet data, the second packet data, and the third packet data are all the original packet data, the first packet data, the second packet data, and the third packet data include a same group identifier, and redundant data that includes the same group identifier as the first packet data, the second packet data, and the third packet data is the target redundant data; and then the receive end device sends the third packet data.

In an embodiment, when packet loss occurs, because the first packet data, the second packet data, and the third packet data are all the original packet data, that is, the target redundant data is generated based on the first packet data, the second packet data, and the third packet data, the receive end device can repair packet data based on redundant data with high accuracy to obtain the most accurate and error-free third packet data, thereby further ensuring reliability of data transmission.

According to a fourth aspect of this application, a data transmission apparatus is provided, and includes:

a communication module, configured to receive, through a communication link, a plurality of pieces of encapsulated packet data sent by a transmit end device, where the plurality of pieces of encapsulated packet data are obtained by encapsulating a plurality of pieces of packet data in a transmission sequence, each piece of encapsulated packet data includes packet data and a packet sequence number, the packet sequence number indicates a rank of corresponding encapsulated packet data in the plurality of pieces of encapsulated packet data, and a rank of each piece of encapsulated packet data in the plurality of pieces of encapsulated packet data is consistent with that in the transmission sequence; and a processing module, configured to perform unpacking processing on the plurality of pieces of encapsulated packet data, to obtain the plurality of pieces of packet data and packet sequence numbers of the plurality of pieces of packet data, where the processing module is further configured to determine the transmission sequence based on the packet sequence numbers of the plurality of pieces of packet data; and the communication module is further configured to send the plurality of pieces of packet data in the transmission sequence.

In an embodiment of this application, encapsulated packet data further includes indication information, where the indication information indicates a target packet loss processing policy.

The communication module is further configured to send an acknowledgment message to the transmit end device before receiving, through the communication link, the plurality of pieces of encapsulated packet data sent by the transmit end device, where the acknowledgment message indicates that a receive end device supports the target packet loss processing policy.

In an embodiment of this application, the plurality of pieces of encapsulated packet data include first packet data and second packet data, a packet sequence number of the first packet data indicates that a rank of the first packet data in the plurality of pieces of encapsulated packet data is prior to a rank of the second packet data in the plurality of pieces of encapsulated packet data, and the first packet data and the second packet data are adjacent packet data in the plurality of pieces of encapsulated packet data.

The processing module is configured to perform unpacking processing on the plurality of pieces of encapsulated packet data, to obtain the second packet data and a packet sequence number of the second packet data.

The processing module is configured to determine, based on the packet sequence number of the second packet data, that the second packet data is sent after the first packet data.

The communication module is configured to send the second packet data if it is determined that the first packet data has been sent.

In an embodiment of this application, the plurality of pieces of encapsulated packet data include first packet data and second packet data, a packet sequence number of the first packet data indicates that a rank of the first packet data in the plurality of pieces of encapsulated packet data is prior to a rank of the second packet data in the plurality of pieces of encapsulated packet data, and the first packet data and the second packet data are non-adjacent packet data in the plurality of pieces of encapsulated packet data.

In an embodiment of this application, the processing module is configured to perform unpacking processing on the plurality of pieces of encapsulated packet data, to obtain the second packet data and a packet sequence number of the second packet data.

The processing module is configured to determine, based on the packet sequence number of the second packet data, that the second packet data is sent after the first packet data.

The communication module is configured to buffer the second packet data if it is determined that the first packet data has been sent;

perform unpacking processing on the plurality of pieces of encapsulated packet data, to obtain third packet data and a packet sequence number of the third packet data, where the packet sequence number of the third packet data indicates that a rank of the third packet data in the plurality of pieces of encapsulated packet data is posterior to the rank of the first packet data in the plurality of pieces of encapsulated packet data, and the third packet data and the first packet data are adjacent packet data in the plurality of pieces of encapsulated packet data; and send the third packet data.

In an embodiment of this application, the processing module is configured to perform unpacking processing on the plurality of pieces of encapsulated packet data, to obtain the second packet data, a packet sequence number of the second packet data, and the target packet loss processing policy, where the target packet loss processing policy includes a first packet loss processing policy.

The processing module is configured to determine, based on the packet sequence number of the second packet data, that the second packet data is sent after the first packet data.

The communication module is configured to execute, by the receive end device, the first packet loss processing policy if it is determined that the first packet data has been sent; buffer the second packet data; and send the second packet data if a buffer time of the second packet data is greater than a first time threshold.

In an embodiment of this application, the processing module is configured to perform unpacking processing on the plurality of pieces of encapsulated packet data, to obtain the second packet data, a packet sequence number of the second packet data, and the target packet loss processing policy, where the target packet loss processing policy includes a second packet loss processing policy.

The processing module is configured to determine, based on the packet sequence number of the second packet data, that the second packet data is sent after the first packet data.

The communication module is configured to execute, by the receive end device, the second packet loss processing policy if it is determined that the first packet data has been sent; determine a first time point at which first encapsulated packet data is received and a second time point at which second encapsulated packet data is received, where the first encapsulated packet data includes the first packet data, and the second encapsulated packet data includes the second packet data; and send the second packet data if a difference between the first time point and the second time point is greater than a second time threshold.

In an embodiment of this application, the processing module is configured to perform unpacking processing on the plurality of pieces of encapsulated packet data, to obtain the second packet data, a packet sequence number of the second packet data, and the target packet loss processing policy, where the target packet loss processing policy includes a third packet loss processing policy.

The processing module is configured to determine, based on the packet sequence number of the second packet data, that the second packet data is sent after the first packet data.

The communication module is configured to execute, by the receive end device, the third packet loss processing policy if it is determined that the first packet data has been sent; buffer the second packet data; send data request information to the transmit end device if third packet data has not been obtained within an RTT threshold, where the data request information carries a packet sequence number of the third packet data; the data request information indicates the transmit end device to determine the third packet data based on the packet sequence number of the third packet data and send the third packet data to the receive end device through a target communication link, where the target communication link is a communication link with a minimum RTT; and the RTT threshold is determined based on the RTT of the target communication link; and obtain, by the receive end device, the third packet data, and send the third packet data.

In an embodiment of this application, the processing module is further configured to detect an RTT of each communication link, to determine RTTs of communication links.

The processing module is further configured to determine a communication link with a minimum RTT in the RTTs of the communication links as the target communication link.

The processing module is further configured to determine the RTT threshold based on the RTT of the target communication link.

In an embodiment of this application, the communication module is configured to receive, through an original communication link, a plurality of pieces of encapsulated original packet data and a plurality of pieces of redundant data that are sent by the transmit end device, where the original packet data is packet data that has not been replicated, the original communication link is a communication link for sending the original packet data, the redundant data is generated by grouping the plurality of pieces of packet data based on a preset condition and performing FEC encoding on a plurality of pieces of packet data that belong to a same group, and a plurality of pieces of encapsulated original packet data that belong to a same group and redundant data corresponding to the group include a same group identifier.

In an embodiment of this application, the first packet data, the second packet data, and the third packet data are all the original packet data, the first packet data, the second packet data, and the third packet data include a same group identifier, and redundant data that includes the same group identifier as the first packet data, the second packet data, and the third packet data is the target redundant data.

The processing module is configured to perform unpacking processing on the plurality of pieces of encapsulated packet data, to obtain the second packet data, a packet sequence number of the second packet data, and the target packet loss processing policy, where the target packet loss processing policy includes a fourth packet loss processing policy.

The processing module is configured to determine, based on the packet sequence number of the second packet data, that the second packet data is sent after the first packet data.

The communication module is configured to execute, by the receive end device, the fourth packet loss processing policy if it is determined that the first packet data has been sent and the first packet data is buffered in an FEC buffer queue; obtain the first packet data from the FEC buffer queue; perform repair processing based on the first packet data, the second packet data, and the target redundant data, to obtain the third packet data; and send the third packet data.

According to a fifth aspect of this application, another data transmission apparatus is provided, and includes:

a communication module, configured to obtain a plurality of pieces of packet data in a transmission sequence; and a processing module, configured to encapsulate the plurality of pieces of packet data in the transmission sequence, to obtain a plurality of pieces of encapsulated packet data, where each piece of encapsulated packet data includes packet data and a packet sequence number, the packet sequence number indicates a rank of corresponding encapsulated packet data in the plurality of pieces of encapsulated packet data, and a rank of each piece of encapsulated packet data in the plurality of pieces of encapsulated packet data is consistent with that in the transmission sequence, where the communication module is further configured to send the plurality of pieces of encapsulated packet data to a receive end device in the transmission sequence through N communication links, where N is greater than or equal to 2.

In an embodiment of this application, each piece of encapsulated packet data further includes indication information, where the indication information indicates a target packet loss processing policy.

The communication module is further configured to receive an acknowledgment message sent by the receive end device before encapsulating the plurality of pieces of packet data in the transmission sequence to obtain the plurality of pieces of encapsulated packet data, where the acknowledgment message indicates that the receive end device supports the target packet loss processing policy.

In an embodiment of this application, the plurality of pieces of encapsulated packet data include first packet data and second packet data, a packet sequence number of the first packet data indicates that a rank of the first packet data in the plurality of pieces of encapsulated packet data is prior to a rank of the second packet data in the plurality of pieces of encapsulated packet data, and the first packet data and the second packet data are adjacent packet data in the plurality of pieces of encapsulated packet data.

In an embodiment of this application, the plurality of pieces of encapsulated packet data include first packet data and second packet data, a packet sequence number of the first packet data indicates that a rank of the first packet data in the plurality of pieces of encapsulated packet data is prior to a rank of the second packet data in the plurality of pieces of encapsulated packet data, and the first packet data and the second packet data are non-adjacent packet data in the plurality of pieces of encapsulated packet data.

In an embodiment of this application, the target packet loss processing policy includes a first packet loss processing policy.

The first packet loss processing policy is that the receive end device buffers the second packet data; and the receive end device sends the second packet data if a buffer time of the second packet data is greater than a first time threshold.

In an embodiment of this application, the target packet loss processing policy includes a second packet loss processing policy.

The second packet loss processing policy is that the receive end device determines a first time point at which first encapsulated packet data is received and a second time point at which second encapsulated packet data is received, where the first encapsulated packet data includes the first packet data, and the second encapsulated packet data includes the second packet data; and the receive end device sends the second packet data if a difference between the first time point and the second time point is greater than a second time threshold.

In an embodiment of this application, the target packet loss processing policy includes a third packet loss processing policy.

The third packet loss processing policy is that the receive end device buffers the second packet data; the receive end device sends data request information to the transmit end device if the receive end device has not obtained third packet data within an RTT threshold, where the data request information carries a packet sequence number of the third packet data; the data request information indicates the transmit end device to determine the third packet data based on the packet sequence number of the third packet data and send the third packet data to the receive end device through a target communication link, where the target communication link is a communication link with a minimum RTT; and the RTT threshold is determined based on the RTT of the target communication link; and the receive end device obtains the third packet data, and sends the third packet data.

In an embodiment of this application, the communication module is further configured to receive the data request information sent by the receive end device.

The processing module is further configured to determine the third packet data based on the packet sequence number of the third packet data.

The communication module is further configured to send the third packet data to the receive end device through the target communication link.

In an embodiment of this application, the processing module is further configured to group the plurality of pieces of packet data based on a preset condition, and perform FEC encoding on a plurality of pieces of packet data that belong to a same group, to generate redundant data corresponding to the group, where a plurality of pieces of packet data in each group are adjacent, and a plurality of pieces of packet data that belong to a same group and redundant data corresponding to the group include a same group identifier.

The processing module is configured to encapsulate the plurality of pieces of packet data in the transmission sequence, to obtain the plurality of pieces of encapsulated packet data, where a plurality of pieces of encapsulated packet data that belong to a same group and redundant data corresponding to the group include a same group identifier;

and replicate the plurality of pieces of packet data, and encapsulate a plurality of pieces of replicated packet data in the transmission sequence, to obtain a plurality of pieces of encapsulated replicated packet data.

In an embodiment of this application, the plurality of pieces of packet data are a plurality of pieces of original packet data, the plurality of pieces of encapsulated packet data are a plurality of pieces of encapsulated original packet data, and a communication link, in the N communication links, for sending the plurality of pieces of encapsulated original packet data is an original communication link.

The communication module is configured to send the plurality of pieces of encapsulated original packet data to the receive end device in the transmission sequence through the original communication link, and send redundant data including a group identifier to the receive end device after a plurality of pieces of encapsulated original packet data including the same group identifier is sent; and send the plurality of pieces of encapsulated replicated packet data to the receive end device in the transmission sequence through N−1 communication links.

In an embodiment of this application, the target packet loss processing policy includes a fourth packet loss processing policy.

The fourth packet loss processing policy is that the receive end device obtains the first packet data from an FEC buffer queue when the receive end device obtains the second packet data and target redundant data, the first packet data has been sent, and the receive end device has not obtained the third packet data, where the first packet data, the second packet data, and the third packet data are all the original packet data, the first packet data, the second packet data, and the third packet data include a same group identifier, and redundant data that includes the same group identifier as the first packet data, the second packet data, and the third packet data is the target redundant data; and the receive end device performs repair processing based on the first packet data, the second packet data, and the target redundant data, to obtain the third packet data, and sends the third packet data.

According to a sixth aspect of this application, another data transmission apparatus is provided, and includes:

a communication module, configured to receive an acknowledgment message sent by a receive end device, where the acknowledgment message indicates that the receive end device supports a target packet loss processing policy, where the communication module is further configured to obtain a plurality of pieces of packet data in a transmission sequence; and a processing module, configured to encapsulate the plurality of pieces of packet data in the transmission sequence, to obtain a plurality of pieces of encapsulated packet data, where each piece of encapsulated packet data includes packet data, a packet sequence number, and indication information, the packet sequence number indicates a rank of corresponding encapsulated packet data in the plurality of pieces of encapsulated packet data, a rank of each piece of encapsulated packet data in the plurality of pieces of encapsulated packet data is consistent with that in the transmission sequence, and the indication information indicates the target packet loss processing policy, where the communication module is further configured to send the plurality of pieces of encapsulated packet data to a receive end device in the transmission sequence through N communication links, where N is greater than or equal to 2.

In an embodiment of this application, the plurality of pieces of encapsulated packet data include first packet data and second packet data, a packet sequence number of the first packet data indicates that a rank of the first packet data in the plurality of pieces of encapsulated packet data is prior to a rank of the second packet data in the plurality of pieces of encapsulated packet data, and the first packet data and the second packet data are adjacent packet data in the plurality of pieces of encapsulated packet data.

In an embodiment of this application, the plurality of pieces of encapsulated packet data include first packet data and second packet data, a packet sequence number of the first packet data indicates that a rank of the first packet data in the plurality of pieces of encapsulated packet data is prior to a rank of the second packet data in the plurality of pieces of encapsulated packet data, and the first packet data and the second packet data are non-adjacent packet data in the plurality of pieces of encapsulated packet data.

In an embodiment of this application, the target packet loss processing policy includes a first packet loss processing policy.

The first packet loss processing policy is that the receive end device buffers the second packet data; and the receive end device sends the second packet data if a buffer time of the second packet data is greater than a first time threshold.

In an embodiment of this application, the target packet loss processing policy includes a second packet loss processing policy.

The second packet loss processing policy is that the receive end device determines a first time point at which first encapsulated packet data is received and a second time point at which second encapsulated packet data is received, where the first encapsulated packet data includes the first packet data, and the second encapsulated packet data includes the second packet data; and the receive end device sends the second packet data if a difference between the first time point and the second time point is greater than a second time threshold.

In an embodiment of this application, the target packet loss processing policy includes a third packet loss processing policy.

The third packet loss processing policy is that the receive end device buffers the second packet data; the receive end device sends data request information to the transmit end device if the receive end device has not obtained third packet data within an RTT threshold, where the data request information carries a packet sequence number of the third packet data; the data request information indicates the transmit end device to determine the third packet data based on the packet sequence number of the third packet data and send the third packet data to the receive end device through a target communication link, where the target communication link is a communication link with a minimum RTT; and the RTT threshold is determined based on the RTT of the target communication link; and the receive end device obtains the third packet data, and sends the third packet data.

In an embodiment of this application, the communication module is further configured to receive the data request information sent by the receive end device.

The processing module is further configured to determine the third packet data based on the packet sequence number of the third packet data.

The communication module is further configured to send the third packet data to the receive end device through the target communication link.

In an embodiment of this application, the processing module is further configured to group the plurality of pieces of packet data based on a preset condition, and perform FEC encoding on a plurality of pieces of packet data that belong to a same group, to generate redundant data corresponding to the group, where a plurality of pieces of packet data in each group are adjacent, and a plurality of pieces of packet data that belong to a same group and redundant data corresponding to the group include a same group identifier.

The processing module is configured to encapsulate the plurality of pieces of packet data in the transmission sequence, to obtain the plurality of pieces of encapsulated packet data, where a plurality of pieces of encapsulated packet data that belong to a same group and redundant data corresponding to the group include a same group identifier; and replicate the plurality of pieces of packet data, and encapsulate a plurality of pieces of replicated packet data in the transmission sequence, to obtain a plurality of pieces of encapsulated replicated packet data.

In an embodiment of this application, the plurality of pieces of packet data are a plurality of pieces of original packet data, the plurality of pieces of encapsulated packet data are a plurality of pieces of encapsulated original packet data, and a communication link, in the N communication links, for sending the plurality of pieces of encapsulated original packet data is an original communication link.

The communication module is configured to send the plurality of pieces of encapsulated original packet data to the receive end device in the transmission sequence through the original communication link, and send redundant data including a group identifier to the receive end device after a plurality of pieces of encapsulated original packet data including the same group identifier is sent; and send the plurality of pieces of encapsulated replicated packet data to the receive end device in the transmission sequence through N−1 communication links.

In an embodiment of this application, the target packet loss processing policy includes a fourth packet loss processing policy.

The fourth packet loss processing policy is that the receive end device obtains the first packet data from an FEC buffer queue when the receive end device obtains the second packet data and target redundant data, the first packet data has been sent, and the receive end device has not obtained the third packet data, where the first packet data, the second packet data, and the third packet data are all the original packet data, the first packet data, the second packet data, and the third packet data include a same group identifier, and redundant data that includes the same group identifier as the first packet data, the second packet data, and the third packet data is the target redundant data; and the receive end device performs repair processing based on the first packet data, the second packet data, and the target redundant data, to obtain the third packet data, and sends the third packet data.

According to a seventh aspect of this application, a transmit end device is provided, including a processor. The processor is coupled to a memory, and may be configured to execute instructions in the memory, to implement the method in any possible implementation of the first aspect. Optionally, the transmit end device further includes a memory. Optionally, the transmit end device further includes a communication interface. The processor is coupled to the communication interface. The communication interface is configured to input and/or output information. The information includes at least one of an instruction and data.

In another embodiment, the transmit end device is a chip or a chip system configured in a transmit end device. When the transmit end device is a chip or a chip system configured in a receive end device or a transmit end device, the communication interface may be an input/output interface, an interface circuit, an output circuit, an input circuit, a pin, a related circuit, or the like. The processor may alternatively be embodied as a processing circuit or a logic circuit.

According to an eighth aspect of this application, a receive end device is provided, including a processor. The processor is coupled to a memory, and may be configured to execute instructions in the memory, to implement the method in any possible implementation of the second aspect, or to implement the method in any possible implementation of the third aspect. Optionally, the receive end device further includes a memory. Optionally, the receive end device further includes a communication interface. The processor is coupled to the communication interface. The communication interface is configured to input and/or output information. The information includes at least one of an instruction and data.

In another embodiment, the receive end device is a chip or a chip system configured in a receive end device. When the receive end device is a chip or a chip system configured in a receive end device or a receive end device, the communication interface may be an input/output interface, an interface circuit, an output circuit, an input circuit, a pin, a related circuit, or the like. The processor may alternatively be embodied as a processing circuit or a logic circuit.

In an embodiment, the memory may be a non-transitory memory, for example, a read-only memory (ROM). The memory and the processor may be integrated into a same chip, or may be disposed on different chips. A type of the memory and a manner in which the memory and the processor are disposed are not limited in embodiments of this application.

It should be understood that a related information exchange process, for example, sending a message, may be a process of outputting a message from a processor, or in another example, receiving a message, may be a process of inputting a received message to a processor. Specifically, the information output by the processor may be output to a transmitter, and the input information received by the processor may be from a receiver. The transmitter and the receiver may be collectively referred to as a transceiver.

According to a ninth aspect of this application, a processor is provided, including an input circuit, an output circuit, and a processing circuit. The processing circuit is configured to receive a signal through the input circuit and transmit a signal through the output circuit, so that the processor performs the method in any possible implementation of the first aspect, or performs the method in any possible implementation of the second aspect, or performs the method in any possible implementation of the third aspect.

In an embodiment, the processor may be a chip, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver. A signal output by the output circuit may be, for example, but not limited to, output to a transmitter and transmitted by the transmitter. The input circuit and the output circuit may be a same circuit, and the circuit is used as the input circuit or the output circuit at different moments. Specific implementations of the processor and the circuits are not limited in embodiments of this application.

According to a tenth aspect of this application, a communication system is provided, including a transmit end device and a receive end device. The transmit end device performs the method in any possible embodiment of the first aspect. The receive end device performs the method in any possible embodiment of the second aspect, or performs the method in any possible embodiment of the third aspect.

According to an eleventh aspect of this application, a computer program product is provided. The computer program product includes a computer program (which may also be referred to as code or instructions). When the computer program is run, a computer is enabled to perform the method in any possible embodiment of the first aspect, or perform the method in any possible embodiment of the second aspect, or perform the method in any possible embodiment of the third aspect.

According to a twelfth aspect of this application, a computer-readable storage medium is provided. The computer-readable storage medium stores a computer program (which may also be referred to as code or instructions). When the computer program is run on a computer, the computer is enabled to perform the method in any possible embodiment of the first aspect, or perform the method in any possible embodiment of the second aspect, or perform the method in any possible embodiment of the third aspect.

According to a thirteenth aspect of this application, a non-volatile computer-readable storage medium is provided. The non-volatile computer-readable storage medium stores a computer program (which may also be referred to as code or instructions). When the computer program is run on a computer, the computer is enabled to perform the method in any possible embodiment of the first aspect, or perform the method in any possible embodiment of the second aspect, or perform the method in any possible embodiment of the third aspect.

According to a fourteenth aspect of this application, a chip system is provided. The chip system includes a processor and an interface. The interface is configured to obtain a program or instructions. The processor is configured to call the program or the instructions to implement or support a receive end device to achieve a function involved in the first aspect, or achieve a function involved in the second aspect, or achieve a function involved in the third aspect.

In a possible design, the chip system further includes a memory. The memory is configured to store program instructions and data that are necessary for the receive end device. The chip system may include a chip, or may include a chip and another discrete component.

It should be noted that beneficial effects brought by the implementations of the fourth aspect to the fourteenth aspect of this application may be understood with reference to the implementations of the first aspect to the third aspect. Therefore, details are not described again.

BRIEF DESCRIPTION OF DRAWINGS

FIG. 10A and FIG. 10B are another schematic interaction flowchart of a data transmission method according to an embodiment of this application;

DESCRIPTION OF EMBODIMENTS

Figure 1:
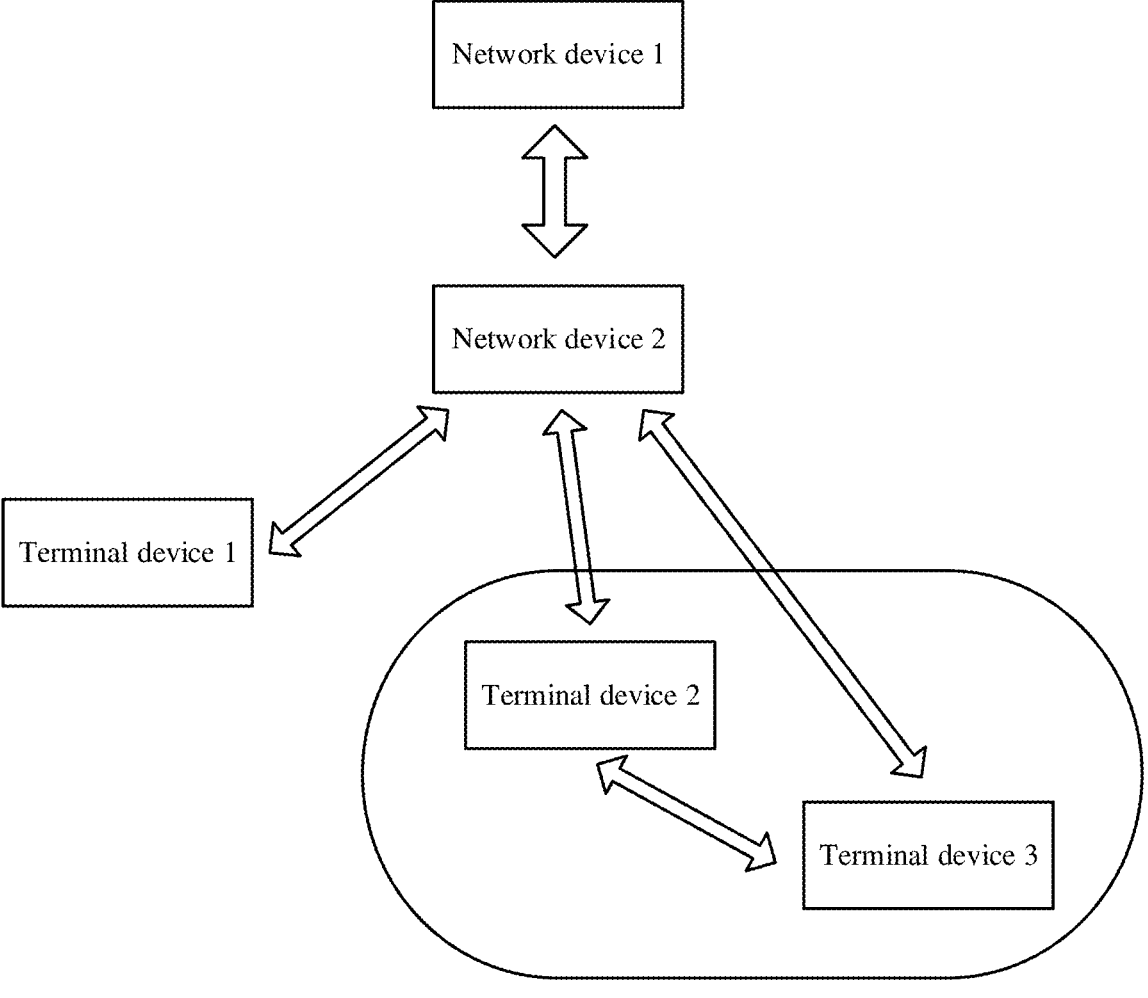
FIG. 1 is a schematic diagram of a system framework according to an embodiment of this application.

To make the objectives, technical solutions, and advantages of this application more understandable, the following provides detailed descriptions. The detailed descriptions provide various embodiments of a device and/or a process by using block diagrams, flowcharts, and/or examples. These block diagrams, flowcharts, and/or examples include one or more functions and/or operations, and therefore a person in the art may understand that each function and/or operation in these block diagrams, flowcharts, and/or examples may be implemented independently and/or jointly by using much hardware, software, firmware, or any combination thereof. In the specification, claims, and accompanying drawings of this application, the terms "first", "second", "third", "fourth", and the like (if any) are intended to distinguish between similar objects but do not necessarily indicate a specific order or sequence. It should be understood that the data used in such a way are interchangeable in appropriate circumstances, so that embodiments described herein can be implemented in an order other than the content illustrated or described herein. In addition, the terms "include" and "have" and any other variants are intended to cover the non-exclusive inclusion. For example, a process, method, system, product, or device that includes a list of operations S or units is not necessarily limited to those expressly listed operations S or units, but may include other operations S or units not expressly listed or inherent to such a process, method, product, or device.

With development of communication technologies, people have a growing requirement for a high data rate and user experience. Therefore, people have an increasing requirement for a proximity service for knowing and communicating with surrounding people or things. Based on this, most application scenarios of wireless communication technologies relate to the field of things-to-things communication, and a minority of application scenarios relate to the field of people-to-things communication. In a 5G scenario, 5GtoB includes but is not limited to security surveillance, industrial manufacturing, a power grid, smart medical, and smart education. 5G communication standards can satisfy real-time and stability requirements of industrial communication, and promote application innovation of industrial technologies. However, there are still many technical difficulties in bandwidth, delay, slicing, and edge-cloud collaboration to be overcome. Currently, for some scenarios that do not support or are inconvenient to deploy a wired connection, a Wi-Fi network connection or a 5G connection is used to resolve a network connectivity problem, so that data transmission can be performed in a scenario with a wireless network connection. However, because the wireless network connection is greatly affected by environment and weather interference, in an industrial production environment, a delay, jitter, and reliability of a network connection cannot be ensured. Consequently, when data transmission is performed in a network in which a delay, jitter, and reliability cannot be ensured, a delay of the data transmission is increased and reliability of the data transmission is reduced. Therefore, how to reduce a delay of data transmission and improve reliability of data transmission in a wireless network connection is a problem to be urgently resolved.

To solve the foregoing problem, embodiments of this application provide a data transmission method, a related apparatus, and a device. For ease of understanding, a system architecture of a communication system used in embodiments of this application is first described. In this application, a plurality of network devices and one or more terminal devices may form a communication system. Based on this, FIG. 1 is a schematic diagram of a system framework according to an embodiment of this application. As shown in FIG. 1, a network device 1, a network device 2, and a terminal device 1 to a terminal device 3 form a communication system. The network device 1 is a transmit end device, and the network device 2 is a receive end device. In the communication system, the network device 1 sends a plurality of pieces of packet data to the network device 2, and the network device 2 needs to send the plurality of pieces of packet data to the terminal device 1 to the terminal device 3 after receiving the plurality of pieces of packet data sent by the network device 1. In addition, the terminal device 2 and the terminal device 3 may also form a communication system. Therefore, in the foregoing communication system, the network device 2 may send a plurality of pieces of packet data to the terminal device 2, and the terminal device 2 needs to receive the plurality of pieces of packet data sent by the network device 2. In the communication system formed by the terminal device 2 and the terminal device 3, after receiving the plurality of pieces of packet data sent by the network device 2, the terminal device 2 needs to send the plurality of pieces of packet data to the terminal device 3. In this embodiment of this application, types and quantities of network devices and terminal devices included in the foregoing communication system, and connection relationships among the network devices and the terminal devices are not limited thereto.

It should be understood that the data transmission method provided in embodiments of this application may be applied to various communication systems, such as a long term evolution (LTE) system, an LTE frequency division duplex (FDD) system, an LTE time division duplex (TDD) system, and a universal mobile telecommunications system (UMTS). With continuous development of communication systems, the technical solutions in this application are applied to a 5G system or new radio (NR), and may be further applied to a future network, such as a 6G system or even a future system. This is not limited herein.

It should be understood that the communication system includes a receive end device and a transmit end device, and the receive end device and the transmit end device are network devices. The network device may be any device having a wireless transceiver function or a chip that can be disposed in the device. The network device includes but is not limited to an evolved NodeB (eNB), a radio network controller (RNC), a NodeB (NB), a base station controller (BSC), a base transceiver station (BTS), a home base station (for example, a Home evolved NodeB, or a Home NodeB, HNB), a baseband unit (BBU), an access point (AP) in a wireless fidelity (Wi-Fi) system, a wireless relay node, a wireless backhaul node, a transmission point (TP), or a transmission-reception point (TRP); or may be a device used in a 5G, 6G, or even future system, such as an NR, a gNB in a system, or a transmission point (TRP or TP), or one antenna panel or a group of antenna panels (including a plurality of antenna panels) of a base station in a 5G system; or may be a network node that forms a gNB or a transmission point, such as a baseband unit (BBU), a distributed unit (DU), a picocell (Picocell), a femtocell, or a road side unit (RSU) in an Internet of Vehicles (e.g., vehicle to everything or V2X) or intelligent driving scenario.

In embodiments disclosed in this application, an apparatus configured to implement functions of the receive end device and the transmit end device may be a network device, or may be an apparatus that can support the receive end device and the transmit end device to implement the functions, for example, a chip system. The apparatus may be disposed in the receive end device and the transmit end device.

It should be further understood that a terminal device in the communication system may also be referred to as user equipment (UE), an access terminal, a subscriber unit, a subscriber station, a mobile station, a mobile console, a remote station, a remote terminal, a mobile device, a user terminal, a terminal, a wireless communication device, a user agent, or a user apparatus. The terminal device in embodiments of this application may be a mobile phone (mobile phone), a tablet computer (Pad), a computer with a wireless transceiver function, a virtual reality (VR) terminal device, an augmented reality (AR) terminal device, a wireless terminal in industrial control, a wireless terminal in self driving, a wireless terminal in remote medical, a wireless terminal in a smart grid, a wireless terminal in transportation safety, a wireless terminal in a smart city, or a wireless terminal in a smart home.

Figure 2:
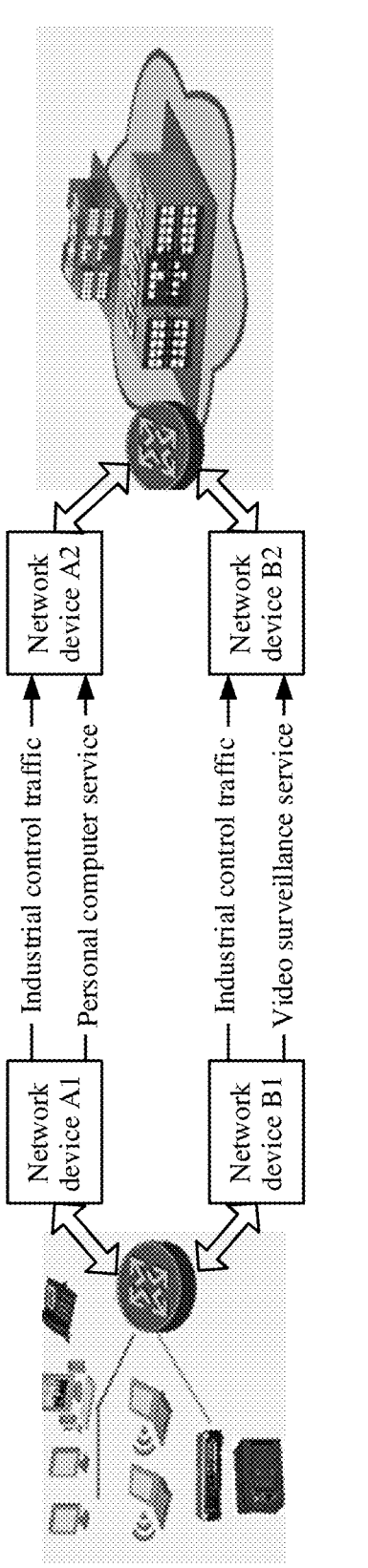
FIG. 2 is a schematic diagram of an application scenario according to an embodiment of this application.

To further understand this solution, the following uses a 5GtoB scenario as an example for description. FIG. 2 is a schematic diagram of an application scenario according to an embodiment of this application. As shown in the figure, a network device A1 and a network device B1 are transmit end devices, and a network device A2 and a network device B2 are receive end devices. A 5G connection is established between the network device A1 and the network device A2, and a Wi-Fi connection is established between the network device B1 and the network device B2. Based on this, there are industrial control traffic and production and office services (such as a personal computer (PC) service and a video surveillance service) in various enterprises. Therefore, for industrial control traffic with a high reliability requirement, data transmission may be performed jointly through a 5G communication link and a Wi-Fi communication link, that is, data transmission is performed through a communication link between the network device A1 and the network device A2 and a communication link between the network device B1 and the network device B2. In addition, for production and office services, a communication link may be selected for transmission according to an actual situation. For example, when a user in an industrial scenario needs to perform a PC service, as a PC is flexible and easy to carry, packet data corresponding to the PC service may be transmitted through a 5G communication link, that is, the packet data corresponding to the PC service is transmitted through a communication link between the network device A1 and the network device A2. However, in an industrial scenario in which wiring is inconvenient, for example, a video surveillance service is performed in an industrial factory, packet data required by the video surveillance service may be transmitted through a Wi-Fi communication link, that is, the packet data required by the video surveillance service is transmitted through a communication link between the network device B1 and the network device B2. It should be understood that, in different 5GtoB scenarios, when same industrial control traffic or a same production and office service is transmitted, only communication links that are physically loaded between network devices are different, but transmitted data is the same.

Based on this, because availability of an E2E communication link in a 5G private line scenario needs to be greater than 99.99%, for industrial control traffic, the transmit end device may replicate packet data, and perform data transmission jointly through two 5G communication links. The two 5G communication links may be communication links of different operators, or may be communication links of different network types (for example, non-standalone (NSA) and standalone (SA)). The receive end device can receive the industrial control traffic from the two 5G communication links, and perform sorting and deduplication. When packet loss occurs, lost data or out-of-order data is processed based on a packet loss processing policy encapsulated by the transmit end device, so that requirements of reliability of data transmission can be satisfied in different scenarios. The foregoing describes only the 5GtoB scenario. This solution has many application scenarios, and the application scenarios are not described in detail in embodiments of this application.

Figures 3, 4:
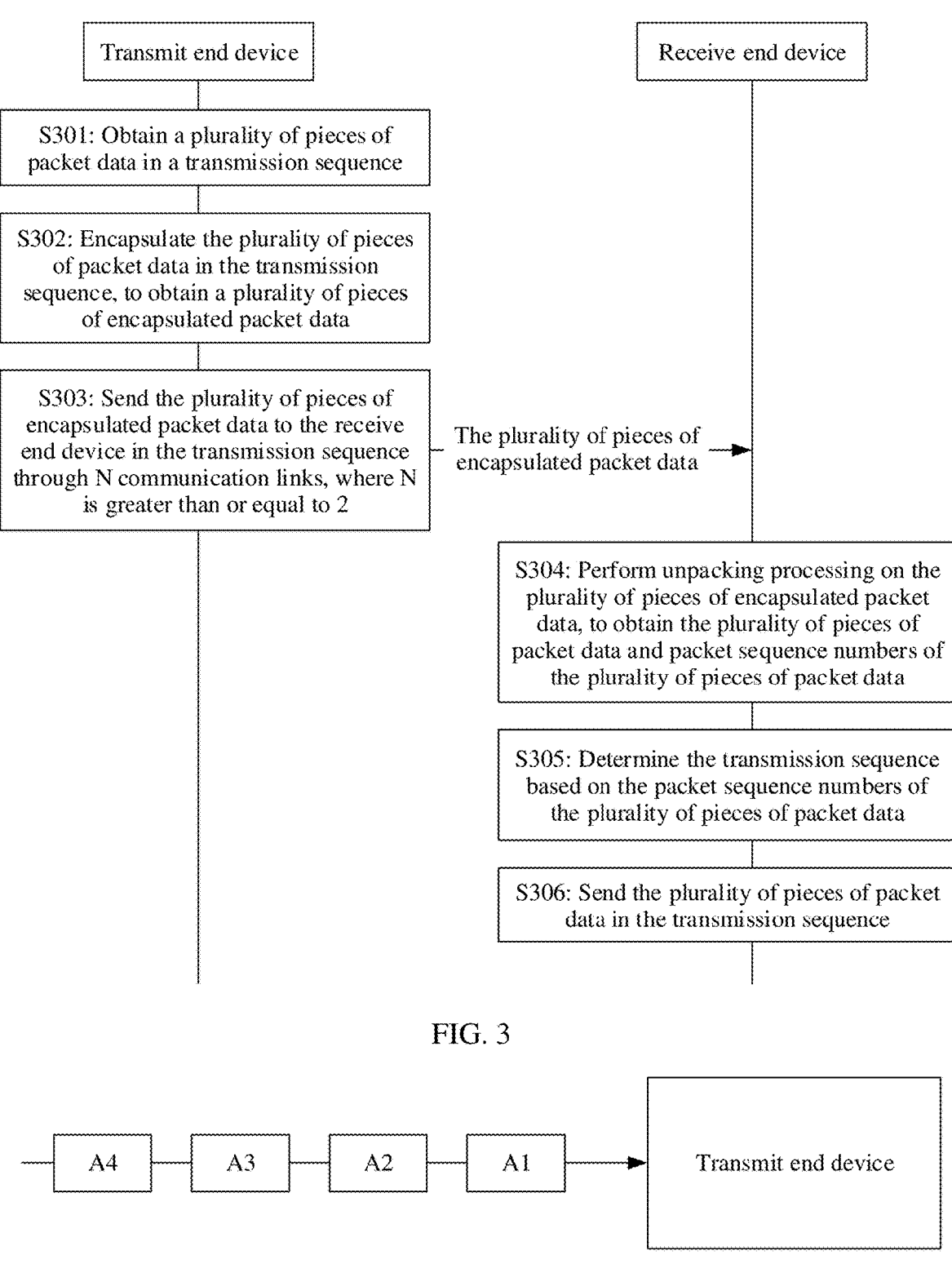
FIG. 3 is a schematic interaction flowchart of a data transmission method according to an embodiment of this application.
FIG. 4 is a schematic diagram of an embodiment of obtaining a plurality of pieces of packet data in a transmission sequence according to an embodiment of this application.

The following describes the solutions provided in embodiments of this application from a perspective of a method. In a data transmission process, packet loss may or may not occur. For better understanding of this solution, a case in which no packet loss occurs in a data transmission process is first described. FIG. 3 is a schematic interaction flowchart of a data transmission method according to an embodiment of this application. As shown in FIG. 3, when no packet loss occurs, the data transmission method includes the following operations.

S301: A transmit end device obtains a plurality of pieces of packet data in a transmission sequence.

In an embodiment, the transmit end device can obtain the plurality of pieces of packet data in the transmission sequence. For example, the plurality of pieces of packet data are packet data 1, packet data 2, packet data 3, and packet data 4. FIG. 4 is a schematic diagram of an embodiment of obtaining a plurality of pieces of packet data in a transmission sequence according to an embodiment of this application. As shown in FIG. 4, A1 indicates the packet data 1, A2 indicates the packet data 2, A3 indicates the packet data 3, and A4 indicates the packet data 4. Therefore, it can be learned that the packet data 1 is first transmitted to the transmit end device, prior to the packet data 2, the packet data 3, and the packet data 4 in sequence. In this case, the transmission sequence is the packet data 1, the packet data 2, the packet data 3, and the packet data 4. It should be understood that the foregoing example is merely used to understand this solution, and a specific quantity and a transmission sequence of a plurality of pieces of packet data need to be flexibly determined according to an actual situation.

S302: The transmit end device encapsulates the plurality of pieces of packet data in the transmission sequence, to obtain a plurality of pieces of encapsulated packet data.

In an embodiment, the transmit end device first needs to select one communication link to transmit the plurality of pieces of packet data, and then encapsulates the plurality of pieces of packet data in the transmission sequence in operation S301, to obtain the plurality of pieces of encapsulated packet data. In addition, each piece of encapsulated packet data includes packet data and a packet sequence number, the packet sequence number indicates a rank of corresponding encapsulated packet data in the plurality of pieces of encapsulated packet data, and a rank of each piece of encapsulated packet data in the plurality of pieces of encapsulated packet data is consistent with that in the transmission sequence.

For example, description is made based on the embodiment shown in FIG. 4. The transmission sequence is the packet data 1, the packet data 2, the packet data 3, and the packet data 4. In this case, the transmit end device first encapsulates the packet data 1 to obtain encapsulated packet data 1. The encapsulated packet data 1 includes the packet data 1 and a packet sequence number. The packet sequence number may be "1", and the packet sequence number "1" indicates that a rank of the encapsulated packet data 1 in the plurality of pieces of encapsulated packet data is 1. Similarly, the transmit end device then encapsulates the packet data 2 to obtain encapsulated packet data 2. The encapsulated packet data 2 includes the packet data 2 and a packet sequence number. The packet sequence number may be "2", and the packet sequence number "2" indicates that a rank of the encapsulated packet data 2 in the plurality of pieces of encapsulated packet data is 2. In addition, encapsulated packet data 3 may be obtained in a similar manner. The encapsulated packet data 3 includes the packet data 3 and a packet sequence number. The packet sequence number may be "3", and the packet sequence number "3" indicates that a rank of the encapsulated packet data 3 in the plurality of pieces of encapsulated packet data is 3. Moreover, encapsulated packet data 4 may be obtained in a similar manner. The encapsulated packet data 4 includes the packet data 4 and a packet sequence number. The packet sequence number may be "4", and the packet sequence number "4" indicates that a rank of the encapsulated packet data 4 in the plurality of pieces of encapsulated packet data is 4. It should be understood that the foregoing example is merely used to understand this solution, and packet sequence numbers may not be consecutive numbers, provided that an indicated sequence is consistent with a transmission sequence.

Further, the transmit end device needs to match traffic that enables replication of packet data. A specific matching manner may be a routing mode or a measurement mode. The routing mode is to directly route to an interface to measure corresponding traffic. The measurement mode is to match to-be-protected traffic based on an access control list (ACL). The access control list may include information such as an IP, a port, a network data exchange rule (protocol), a virtual local area network (VLAN), and a message authentication code (MAC). Based on this, the transmit end device further needs to replicate the plurality of pieces of packet data, transmit a plurality of pieces of replicated packet data through different communication links selected, and encapsulate the plurality of pieces of replicated packet data in the transmission sequence, to obtain a plurality of pieces of encapsulated replicated packet data. A specific manner is similar to the foregoing description, and details are not described herein again.

In an embodiment, the transmit end device adds a reassembly header in the middle of a tunnel header, where the reassembly header includes a packet sequence number or other parameter information, so that each piece of encapsulated packet data includes packet data and a packet sequence number. Alternatively, the transmit end device adds a reassembly header between an internet protocol (IP) header and a payload, where the reassembly header includes a packet sequence number or other parameter information, so that each piece of encapsulated packet data includes packet data and a packet sequence number. A specific encapsulation manner is not limited herein.

In addition, the encapsulated packet data may further include indication information, packet type information, timestamp information, and some other fields (for example, a field indicating active/standby). The indication information indicates a target packet loss processing policy, and the target packet loss processing policy includes a combination of at least one of a first packet loss processing policy, a second packet loss processing policy, a third packet loss processing policy, and a fourth packet loss processing policy. A packet type indicates whether packet data is original packet data or replicated packet data. The original packet data is packet data that has not been replicated.

Based on this, in an industrial scenario, as an intermediate network is usually a wireless network of an operator, a transmit end device in an internal wireless network needs to send transmission data to a receive end device in a wireless network of an operator by using a tunneling technology. In this embodiment, a virtual private network (VPN) tunnel is established in an intermediate network. In this embodiment, the VPN tunnel is configured to provide a network transmission channel between an internal wireless network and a wireless network of an operator, to easily plan an internal network. In this embodiment, the VPN tunnel is further configured to encapsulate packet data, so that encapsulated packet data can include a packet sequence number and other information.

Figure 5:
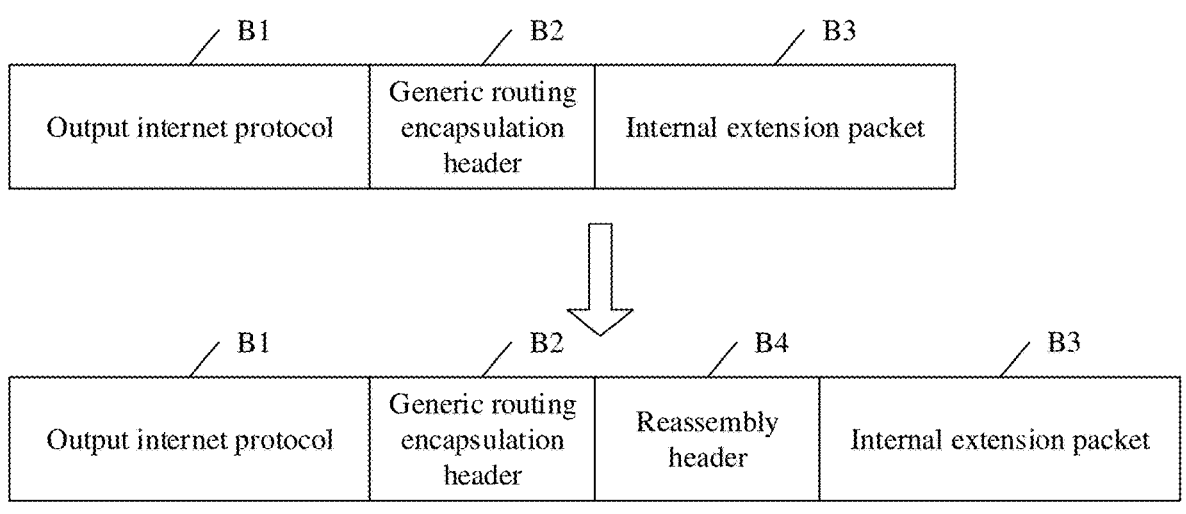
FIG. 5 is a schematic diagram of an embodiment of encapsulating packet data according to an embodiment of this application.
Figure 6:
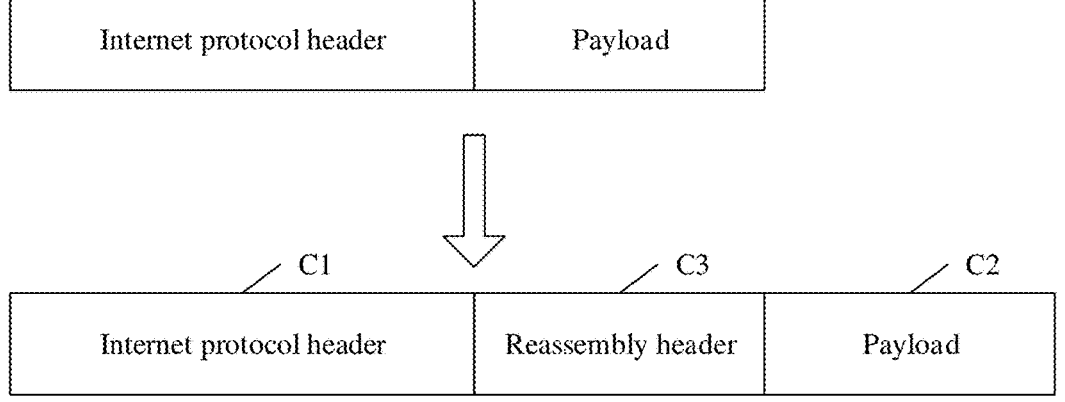
FIG. 6 is a schematic diagram of another embodiment of encapsulating packet data according to an embodiment of this application.

Therefore, in an industrial scenario, in this embodiment, to improve reliability and flexibility of data transmission, packet data is encapsulated through extended tunnel encapsulation, that is, the transmit end device adds a packet sequence number or other parameter information in the middle of a tunnel header. For example, in this embodiment, based on generic routing encapsulation (GRE), GRE extension encapsulation is performed, so that encapsulated packet data includes a packet sequence number. FIG. 5 is a schematic diagram of an embodiment of encapsulating packet data according to an embodiment of this application. As shown in FIG. 5, packet data B1 that has not been encapsulated includes an output internet protocol B1, a GRE header B2, and an internal extension packet B3. Through GRE extension encapsulation, a reassembly header can be added in the GRE header, and the reassembly header includes a packet sequence number. In this case, encapsulated packet data includes the output internet protocol B1, the GRE header B2, a reassembly header B4 including a packet sequence number, and the internal extension packet B3. Through the GRE extension encapsulation shown in FIG. 5, the encapsulated packet data can carry more parameter information, to support more flexible data processing and transmission. In addition, a manner of adding a reassembly header between an IP header and a payload is described. FIG. 6 is a schematic diagram of another embodiment of encapsulating packet data according to an embodiment of this application. As shown in FIG. 6, packet data C1 that has not been encapsulated includes an internet protocol header C1 and a payload C2. A reassembly header is added based on the internet protocol header C1 and the payload C2, and the reassembly header includes a packet sequence number. In this case, encapsulated packet data includes the internet protocol header C1, a reassembly header C3 including a packet sequence number, and the payload C2. It should be understood that the examples in FIG. 4 to FIG. 6 are all used to understand this solution, and should not be construed as a limitation on this solution.

S303: The transmit end device sends the plurality of pieces of encapsulated packet data to a receive end device in the transmission sequence through N communication links, where N is greater than or equal to 2.

In an embodiment, the transmit end device sends the plurality of pieces of encapsulated packet data obtained in operation S302 to the receive end device in the transmission sequence through the N communication links. It should be understood that sending the plurality of pieces of encapsulated packet data in the transmission sequence does not indicate that the plurality of pieces of encapsulated packet data are sent after all the plurality of pieces of packet data are encapsulated. Instead, after packet data is encapsulated in the transmission sequence to obtain encapsulated packet data, the encapsulated packet data may be sent to the receive end device through a communication link. In addition, encapsulated replicated packet data and encapsulated packet data (which has not been replicated) may be sent to the receive end device at the same time, or may be sent to the receive end device in chronological order. Therefore, a time sequence of sending packet data to the receive end device is not limited in this solution.

Figure 7:
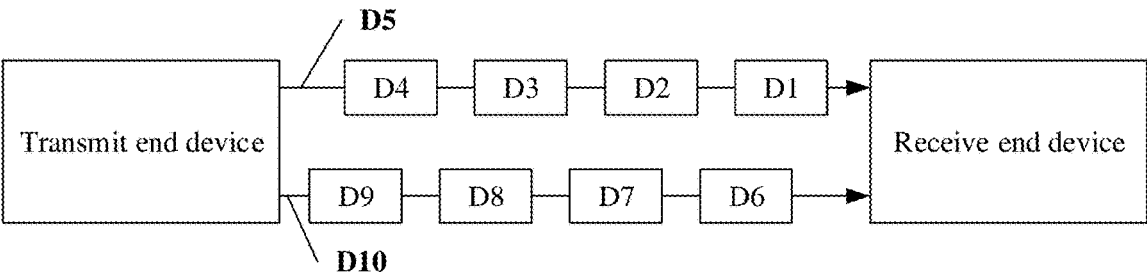
FIG. 7 is a schematic diagram of an embodiment of sending a plurality of pieces of encapsulated packet data through a plurality of communication links according to an embodiment of this application.

For example, description is made based on the embodiment shown in FIG. 4. FIG. 7 is a schematic diagram of an embodiment of sending a plurality of pieces of encapsulated packet data through a plurality of communication links according to an embodiment of this application. As shown in FIG. 7, it can be learned from FIG. 4 that the transmission sequence is the packet data 1, the packet data 2, the packet data 3, and the packet data 4, and a communication link D5 and a communication link D10 are communication links with different physical loads. Based on this, the transmit end device encapsulates the packet data 1 to obtain D1 (the encapsulated packet data 1), and after D1 is obtained, sends D1 to the receive end device through the communication link D5. Similarly, the transmit end device encapsulates the packet data 2 to obtain D2 (the encapsulated packet data 2), and sends D2 to the receive end device through the communication link D5. The transmit end device encapsulates the packet data 3 to obtain D3 (the encapsulated packet data 3), and sends D3 to the receive end device through the communication link D5. The transmit end device encapsulates the packet data 4 to obtain D4 (the encapsulated packet data 4), and sends D4 to the receive end device through the communication link D5.

In addition, the transmit end device can further replicate the packet data 1 and encapsulate replicated packet data 1 to obtain D6 (encapsulated replicated packet data 1), and send D6 to the receive end device through the communication link D10. Similarly, the transmit end device encapsulates replicated packet data 2 to obtain D7 (encapsulated replicated packet data 2), and sends D7 to the receive end device through the communication link D10. The transmit end device encapsulates replicated packet data 3 to obtain D8 (encapsulated replicated packet data 3), and sends D8 to the receive end device through the communication link D10. The transmit end device encapsulates replicated packet data 4 to obtain D9 (encapsulated replicated packet data 4), and sends D9 to the receive end device through the communication link D10.

Specifically, it can be learned from operation S302 that packet data that has not been replicated is original packet data. Therefore, in this embodiment, a communication link for transmitting encapsulated original packet data is defined as an original communication link.

It can be learned from the foregoing description that, as a case in which no packet loss occurs is described in this embodiment, the receive end device can receive, through the communication link, the plurality of pieces of encapsulated packet data sent by the transmit end device, and the plurality of pieces of encapsulated packet data are adjacent. It should be understood that, during actual application, the receive end device may receive all encapsulated packet data through only one communication link, or may receive all encapsulated packet data through a plurality of communication links. A specific quantity of communication links for the receive end device to receive data is not limited herein.

S304: The receive end device performs unpacking processing on the plurality of pieces of encapsulated packet data, to obtain the plurality of pieces of packet data and packet sequence numbers of the plurality of pieces of packet data.

In an embodiment, the receive end device can receive the plurality of pieces of encapsulated packet data in operation S303, and the plurality of pieces of encapsulated packet data are adjacent. In this case, no packet loss occurs. Therefore, the receive end device performs unpacking processing on the plurality of pieces of encapsulated packet data, to obtain the plurality of pieces of packet data and the packet sequence numbers of the plurality of pieces of packet data.

For example, refer to FIG. 7 again, and description is made based on the communication link D5 in the embodiment shown in FIG. 7. The receive end device can sequentially receive the encapsulated packet data 1, the encapsulated packet data 2, the encapsulated packet data 3, and the encapsulated packet data 4 through the communication link D5. After performing unpacking processing on the encapsulated packet data 1, the receive end device can obtain the packet data 1 and the packet sequence number "1". Similarly, it can be learned that after performing unpacking processing on the encapsulated packet data 2, the receive end device can obtain the packet data 2 and the packet sequence number "2". After performing unpacking processing on the encapsulated packet data 3, the receive end device can obtain the packet data 3 and the packet sequence number "3". After performing unpacking processing on the encapsulated packet data 4, the receive end device can obtain the packet data 4 and the packet sequence number "4".

It should be understood that, during actual application, adjacent encapsulated packet data may be received through different communication links. Therefore, if packet data has been sent, when encapsulated packet data including the packet data is received through another communication link, it is determined that the packet data is duplicate, and the encapsulated packet data including the packet data is directly discarded, to save space for data buffering.

S305: The receive end device determines the transmission sequence based on the packet sequence numbers of the plurality of pieces of packet data.

In an embodiment, the receive end device determines the transmission sequence based on the packet sequence numbers of the plurality of pieces of packet data.

For example, description is further made based on the example of operation S304. Because the packet sequence number "1" indicates that a rank of the encapsulated packet data 1 in the plurality of pieces of encapsulated packet data is 1, that is, a rank of the packet data 1 in the plurality of pieces of packet data is 1, it can be determined that the packet data 1 is the first transmitted data. Similarly, it can be learned that the packet sequence number "2" indicates that a rank of the encapsulated packet data 2 in the plurality of pieces of encapsulated packet data is 2, that is, a rank of the packet data 2 in the plurality of pieces of packet data is 2. Therefore, it can be determined that the packet data 2 is the second transmitted data. The packet sequence number "3" indicates that a rank of the encapsulated packet data 3 in the plurality of pieces of encapsulated packet data is 3, that is, a rank of the packet data 3 in the plurality of pieces of packet data is 3. Therefore, it can be determined that the packet data 3 is the third transmitted data. The packet sequence number "4" indicates that a rank of the encapsulated packet data 4 in the plurality of pieces of encapsulated packet data is 4, that is, a rank of the packet data 4 in the plurality of pieces of packet data is 4. Therefore, it can be determined that the packet data 4 is the fourth transmitted data.

S306: The receive end device sends the plurality of pieces of packet data in the transmission sequence.

In an embodiment, as the receive end device can determine a transmission sequence number of each piece of packet data in operation S305, the receive end device sends the plurality of pieces of packet data in the transmission sequence determined in operation S305. Specifically, the receive end device can send the plurality of pieces of packet data to a terminal device corresponding to a service provided by the plurality of pieces of packet data, to provide a service required by the terminal device. In addition, the receive end device can further send the plurality of pieces of packet data to a route conversion device, so that the route conversion device provides a service or other information based on the packet data. Therefore, a specific device to which the receive end device sends the plurality of pieces of packet data is not limited herein.

For example, description is further made based on the example in operation S305. After obtaining the packet data 1 and determining that the packet data 1 is the first transmitted data, the receive end device sends the packet data 1. Similarly, it can be learned that after obtaining the packet data 2, determining that the packet data 2 is the second transmitted data, and determining that the first transmitted data (namely, the packet data 1) has been sent, the receive end device sends the packet data 2. After obtaining the packet data 3, determining that the packet data 3 is the third transmitted data, and determining that the second transmitted data (namely, the packet data 2) has been sent, the receive end device sends the packet data 3. After obtaining the packet data 4, determining that the packet data 4 is the fourth transmitted data, and determining that the third transmitted data (namely, the packet data 3) has been sent, the receive end device sends the packet data 4. In this way, the plurality of pieces of packet data can be sent in the transmission sequence, satisfying requirements of order preserving of data transmission in various scenarios, thereby ensuring reliability of data transmission.

The following describes a case in which packet loss occurs in a data transmission process. It can be learned from the method described in FIG. 3 that the encapsulated packet data may further include indication information, packet type information, timestamp information, and some other fields. The indication information indicates a target packet loss processing policy, and the target packet loss processing policy includes a combination of at least one of a first packet loss processing policy, a second packet loss processing policy, a third packet loss processing policy, and a fourth packet loss processing policy. Therefore, when packet loss occurs, the receive end device may perform packet loss processing based on the target packet loss processing policy indicated by the indication information. The target packet loss processing policy may include a combination of at least one of different packet loss processing policies. The following separately describes a packet loss processing policy including the first packet loss processing policy, a packet loss processing policy including the second packet loss processing policy, a packet loss processing policy including the third packet loss processing policy, and a packet loss processing policy including the fourth packet loss processing policy. During actual application, the target packet loss processing policy may further include a combination of at least one of the foregoing packet loss processing policies. A specific manner is similar to operation S that is separately performed for different packet loss processing policies, or needs to be flexibly determined according to an actual situation. Therefore, all possible implementations are not described in detail in this embodiment.

1. The target packet loss processing policy includes the first packet loss processing policy.

Figure 8:
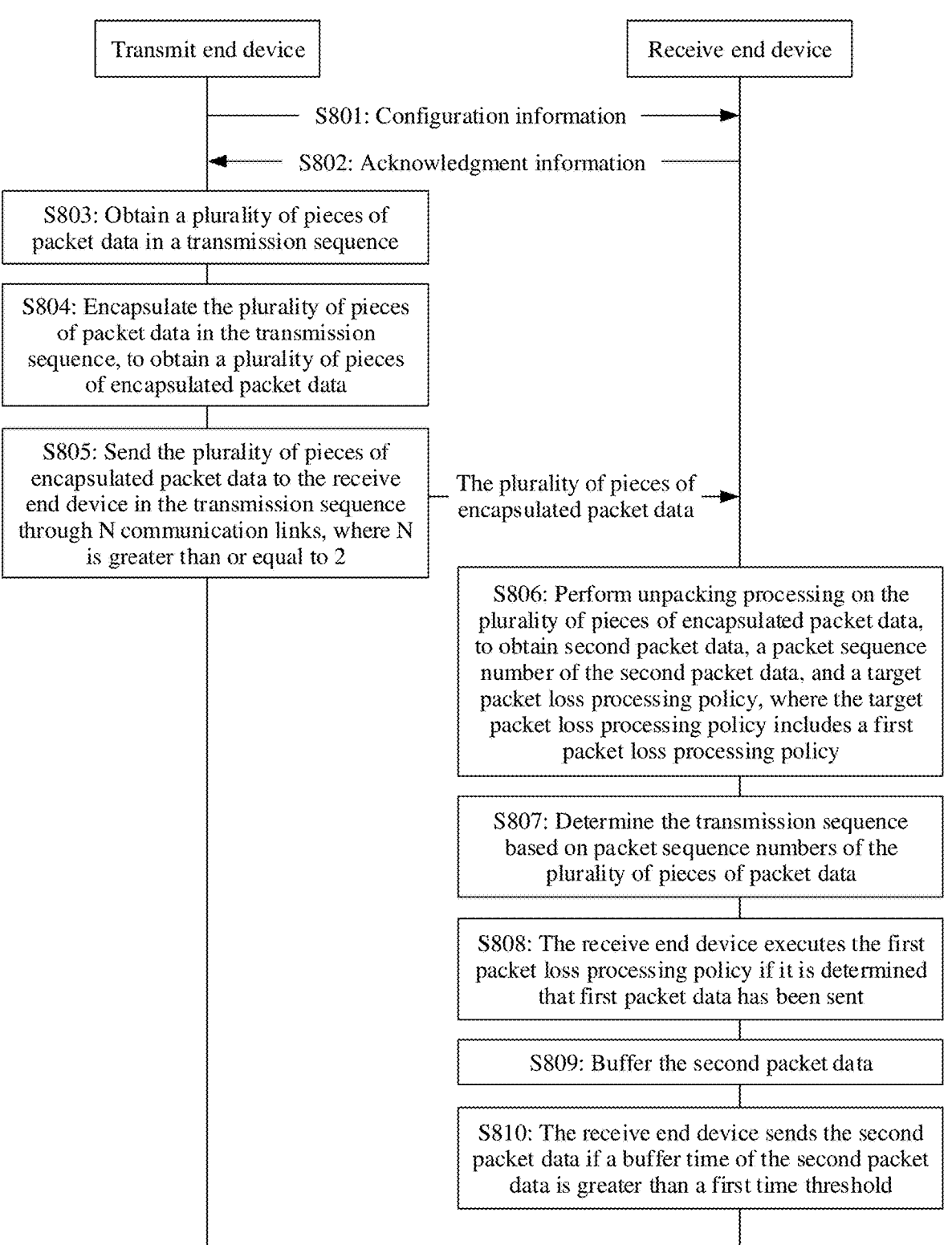
FIG. 8 is another schematic interaction flowchart of a data transmission method according to an embodiment of this application.

FIG. 8 is another schematic interaction flowchart of a data transmission method according to an embodiment of this application. As shown in FIG. 8, when packet loss occurs, the data transmission method includes the following operations.

S801: A transmit end device sends configuration information to a receive end device.

In an embodiment, as the transmit end device cannot know a packet loss processing policy supported by the receive end device, the transmit end device needs to send the configuration information to the receive end device. The configuration information includes a first packet loss processing policy, a second packet loss processing policy, a third packet loss processing policy, and a fourth packet loss processing policy.

S802: The receive end device sends acknowledgment information to the transmit end device.

In an embodiment, the receive end device can receive, in operation S801, the configuration information sent by the transmit end device. Because the configuration information includes the first packet loss processing policy, the second packet loss processing policy, the third packet loss processing policy, and the fourth packet loss processing policy, if the receive end device can support the first packet loss processing policy, the receive end device generates acknowledgment information, where the acknowledgment information indicates that the receive end device supports the first packet loss processing policy, and sends the acknowledgment information to the transmit end device. It should be understood that this embodiment makes a description by using an example in which the target packet loss processing policy includes the first packet loss processing policy. However, during actual application, the target packet loss processing policy may include a combination of a plurality of different packet loss processing policies. Therefore, the acknowledgment information can also indicate a plurality of different packet loss processing policies. This is limited herein.

S803: The transmit end device obtains a plurality of pieces of packet data in a transmission sequence.

In an embodiment, a manner in which the transmit end device obtains the plurality of pieces of packet data in the transmission sequence is similar to that in operation S301, and details are not described herein again.

S804: The transmit end device encapsulates the plurality of pieces of packet data in the transmission sequence, to obtain a plurality of pieces of encapsulated packet data.

In an embodiment, the transmit end device may receive, in operation S802, the acknowledgment information sent by the receive end device, and therefore determine that the receive end device supports the first packet loss processing policy. Therefore, the transmit end device encapsulates the plurality of pieces of packet data in the transmission sequence, to obtain the plurality of pieces of encapsulated packet data. In this case, each piece of encapsulated packet data includes packet data, a packet sequence number, and indication information, the indication information indicates the target packet loss processing policy, and the target packet loss processing policy includes the first packet loss processing policy.

A manner in which the transmit end device encapsulates the plurality of pieces of packet data in the transmission sequence to obtain the plurality of pieces of encapsulated packet data is similar to that in operation S302. To be specific, a reassembly header can include a packet sequence number and can further include indication information indicating the first packet loss processing policy. Details are not described herein again.

S805: The transmit end device sends the plurality of pieces of encapsulated packet data to the receive end device in the transmission sequence through N communication links.

In an embodiment, a manner in which the transmit end device sends the plurality of pieces of encapsulated packet data to the receive end device in the transmission sequence through the N communication links is similar to that in operation S303, and details are not described herein again.

The following operations are described by using an example in which the plurality of pieces of encapsulated packet data include first packet data and second packet data, a packet sequence number of the first packet data indicates that a rank of the first packet data in the plurality of pieces of encapsulated packet data is prior to a rank of the second packet data in the plurality of pieces of encapsulated packet data, and the first packet data and the second packet data are non-adjacent packet data in the plurality of pieces of encapsulated packet data; and a packet sequence number of third packet data indicates that a rank of the third packet data in the plurality of pieces of encapsulated packet data is posterior to the rank of the first packet data in the plurality of pieces of encapsulated packet data, and the third packet data and the first packet data are adjacent packet data in the plurality of pieces of encapsulated packet data.

S806: The receive end device performs unpacking processing on the plurality of pieces of encapsulated packet data, to obtain second packet data, a packet sequence number of the second packet data, and a target packet loss processing policy, where the target packet loss processing policy includes a first packet loss processing policy.

In an embodiment, as the encapsulated packet data further includes the target packet loss processing policy, the receive end device can obtain the second packet data, the packet sequence number of the second packet data, and the target packet loss processing policy by performing unpacking processing on the plurality of pieces of encapsulated packet data, and the target packet loss processing policy includes the first packet loss processing policy. A specific manner in which the receive end device performs unpacking processing is similar to that in operation S304, and details are not described herein again.

S807: The receive end device determines the transmission sequence based on packet sequence numbers of the plurality of pieces of packet data.

In an embodiment, the receive end device determines the transmission sequence based on the packet sequence numbers of the plurality of pieces of packet data. Because the first packet data and the second packet data are non-adjacent packet data in the plurality of pieces of encapsulated packet data, the receive end device can determine that packet loss occurs. In addition, after obtaining the second packet data and the packet sequence number through unpacking, the receive end device can determine, based on the packet sequence number of the second packet data, that the second packet data is sent after the first packet data.

For example, description is made by using an example in which the transmission sequence is the packet data 1, the packet data 2, the packet data 3, and the packet data 4. In this case, the transmit end device sequentially sends the encapsulated packet data 1, the encapsulated packet data 2, the encapsulated packet data 3, and the encapsulated packet data 4 to the receive end device. If the encapsulated packet data 1 is the first packet data, and the packet sequence number "1" of the packet data 1 indicates that a rank of the encapsulated packet data 1 in the plurality of pieces of encapsulated packet data is 1, the packet data 1 is the first transmitted data. In addition, if the encapsulated packet data 3 is the second packet data, and the packet sequence number "3" of the packet data 3 indicates that a rank of the encapsulated packet data 3 in the plurality of pieces of encapsulated packet data is 3, the packet data 3 is the third transmitted data, that is, the packet data 3 needs to be transmitted after the packet data 1.

S808: The receive end device executes the first packet loss processing policy if it is determined that first packet data has been sent.

In an embodiment, it can be learned from operation S807 that the second packet data needs to be sent after the first packet data. In this case, if the first packet data has been sent, it can be determined that packet loss occurs, and the receive end device needs to execute the first packet loss processing policy.

For example, description is further made based on the example in operation S807. Because it can be determined, based on the packet sequence number "1" of the packet data 1, that the packet data 1 is the first transmitted data, the receive end device can send the packet data 1. Then, the receive end device receives the encapsulated packet data 3, and performs unpacking processing on the encapsulated packet data 3, to obtain the packet data 3 and the packet sequence number "3". It can be determined, based on the packet sequence number "3" of the packet data 3, that the packet data 3 is the third transmitted data. It can be learned from the foregoing example that the assumed transmission sequence is the packet data 1 to the packet data 4. Therefore, it may be determined that packet loss occurs, and the lost packet is the encapsulated packet data 2 (the third packet data). Therefore, it can be determined that the packet data 2 is lost, and the receive end device executes the first packet loss processing policy.

S809: The receive end device buffers the second packet data.

In an embodiment, based on the example of the foregoing embodiment, to ensure that the plurality of pieces of packet data can be sent in the transmission sequence, when packet loss occurs, the receive end device cannot send the second packet data, that is, needs to buffer the second packet data.

S810: The receive end device sends the second packet data if a buffer time of the second packet data is greater than a first time threshold.

In an embodiment, if the buffer time of the second packet data is greater than the first time threshold, the receive end device sends the second packet data. Optionally, the first time threshold may be a minimum value of a buffer that can be allowed by a service corresponding to a plurality of pieces of packet data, or the first time threshold may be a maximum value of a buffer that can be allowed by a service corresponding to a plurality of pieces of packet data. This is not limited in this embodiment.

In addition, in another optional embodiment, if the receive end device can obtain the third packet data by performing, within the first time threshold, unpacking processing on the encapsulated packet data received through another communication link, as the third packet data and the first packet data are adjacent packet data, the receive end device directly sends the third packet data, obtains the second packet data from the buffer, and sends the second packet data.

For example, a service for transmission of industrial control traffic is used as an example for description. If a minimum value of a buffer that can be allowed by a service of industrial control traffic corresponding to a plurality of pieces of packet data is 10 ms, when the buffer time of the second packet data is greater than 10 ms, the second packet data is directly sent, to reduce a data buffer waiting time and reduce a delay of data transmission. Alternatively, if a maximum value of a buffer that can be allowed by a service corresponding to a plurality of pieces of packet data is 1 s, when the buffer time of the second packet data is greater than 1 s, the second packet data is directly sent. In this case, although a data buffer waiting time is increased, the third packet data may be obtained through another communication link within 1 s. Therefore, it is ensured that data transmission is still order-preserving, thereby ensuring reliability of data transmission.

2. The target packet loss processing policy includes the second packet loss processing policy.

Figure 9:
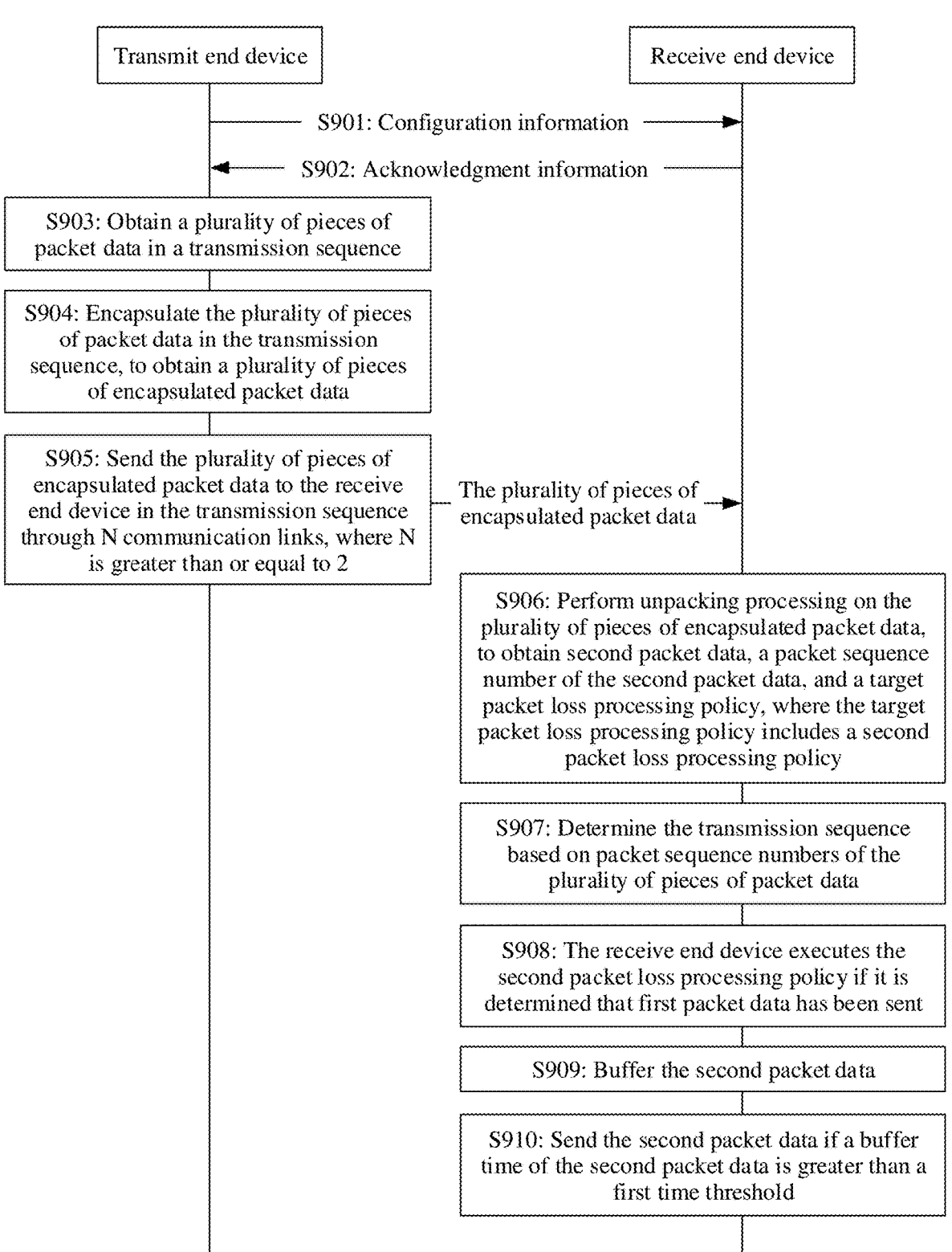
FIG. 9 is another schematic interaction flowchart of a data transmission method according to an embodiment of this application.

FIG. 9 is another schematic interaction flowchart of a data transmission method according to an embodiment of this application. As shown in FIG. 9, when packet loss occurs, another data transmission method includes the following operations.

S901: A transmit end device sends configuration information to a receive end device.

In an embodiment, as the transmit end device cannot know a packet loss processing policy supported by the receive end device, the transmit end device needs to send the configuration information to the receive end device. The configuration information includes a second packet loss processing policy, a second packet loss processing policy, a third packet loss processing policy, and a fourth packet loss processing policy.

S902: The receive end device sends acknowledgment information to the transmit end device.

In an embodiment, the receive end device can receive, in operation S901, the configuration information sent by the transmit end device. Because the configuration information includes the second packet loss processing policy, the second packet loss processing policy, the third packet loss processing policy, and the fourth packet loss processing policy, if the receive end device can support the second packet loss processing policy, the receive end device generates acknowledgment information, where the acknowledgment information indicates that the receive end device supports the second packet loss processing policy, and sends the acknowledgment information to the transmit end device. It should be understood that this embodiment makes a description by using an example in which the target packet loss processing policy includes the second packet loss processing policy. However, during actual application, the target packet loss processing policy may include a combination of a plurality of different packet loss processing policies. Therefore, the acknowledgment information can also indicate a plurality of different packet loss processing policies. This is limited herein.

S903: The transmit end device obtains a plurality of pieces of packet data in a transmission sequence.

In an embodiment, a manner in which the transmit end device obtains the plurality of pieces of packet data in the transmission sequence is similar to that in operation S301, and details are not described herein again.

S904: The transmit end device encapsulates the plurality of pieces of packet data in the transmission sequence, to obtain a plurality of pieces of encapsulated packet data.

In an embodiment, the transmit end device may receive, in operation S902, the acknowledgment information sent by the receive end device, and therefore determine that the receive end device supports the second packet loss processing policy. Therefore, the transmit end device encapsulates the plurality of pieces of packet data in the transmission sequence, to obtain the plurality of pieces of encapsulated packet data. In this case, each piece of encapsulated packet data includes packet data, a packet sequence number, and indication information, the indication information indicates the target packet loss processing policy, and the target packet loss processing policy includes the second packet loss processing policy.

A manner in which the transmit end device encapsulates the plurality of pieces of packet data in the transmission sequence to obtain the plurality of pieces of encapsulated packet data is similar to that in operation S302. To be specific, a reassembly header can include a packet sequence number and can further include indication information indicating the second packet loss processing policy. Details are not described herein again.

S905: The transmit end device sends the plurality of pieces of encapsulated packet data to the receive end device in the transmission sequence through N communication links.

In an embodiment, a manner in which the transmit end device sends the plurality of pieces of encapsulated packet data to the receive end device in the transmission sequence through the N communication links is similar to that in operation S303, and details are not described herein again.

The following operations are described by using an example in which the plurality of pieces of encapsulated packet data include first packet data and second packet data, a packet sequence number of the first packet data indicates that a rank of the first packet data in the plurality of pieces of encapsulated packet data is prior to a rank of the second packet data in the plurality of pieces of encapsulated packet data, and the first packet data and the second packet data are non-adjacent packet data in the plurality of pieces of encapsulated packet data; and a packet sequence number of third packet data indicates that a rank of the third packet data in the plurality of pieces of encapsulated packet data is posterior to the rank of the first packet data in the plurality of pieces of encapsulated packet data, and the third packet data and the first packet data are adjacent packet data in the plurality of pieces of encapsulated packet data.

S906: The receive end device performs unpacking processing on the plurality of pieces of encapsulated packet data, to obtain second packet data, a packet sequence number of the second packet data, and a target packet loss processing policy, where the target packet loss processing policy includes a second packet loss processing policy.

In an embodiment, as the encapsulated packet data further includes the target packet loss processing policy, the receive end device can obtain the second packet data, the packet sequence number of the second packet data, and the target packet loss processing policy by performing unpacking processing on the plurality of pieces of encapsulated packet data, and the target packet loss processing policy includes the second packet loss processing policy. A specific manner in which the receive end device performs unpacking processing is similar to that in operation S304, and details are not described herein again.

S907: The receive end device determines the transmission sequence based on packet sequence numbers of the plurality of pieces of packet data.

In an embodiment, the receive end device determines the transmission sequence based on the packet sequence numbers of the plurality of pieces of packet data. Because the first packet data and the second packet data are non-adjacent packet data in the plurality of pieces of encapsulated packet data, the receive end device can determine that packet loss occurs. In addition, after obtaining the second packet data and the packet sequence number through unpacking, the receive end device can determine, based on the packet sequence number of the second packet data, that the second packet data is sent after the first packet data. A specific manner of determining the transmission sequence is similar to that in operation S807, and details are not described herein again.

S908: The receive end device executes the second packet loss processing policy if it is determined that first packet data has been sent.

In an embodiment, it can be learned from operation S907 that the second packet data needs to be sent after the first packet data. In this case, if the first packet data has been sent, it can be determined that packet loss occurs, and the receive end device needs to execute the second packet loss processing policy. A specific manner in which the first packet data has been sent and a specific manner of determining that packet loss occurs are similar to those in operation S808, and details are not described herein again.

S909: The receive end device determines a first time point at which first encapsulated packet data is received and a second time point at which second encapsulated packet data is received.

In an embodiment, based on the example of the foregoing embodiment, to ensure that the plurality of pieces of packet data can be sent in the transmission sequence, when packet loss occurs, the receive end device determines the first time point at which the first encapsulated packet data is received and the second time point at which the second encapsulated packet data is received. The first encapsulated packet data includes the first packet data, and the second encapsulated packet data includes the second packet data.

For example, if the first encapsulated packet data is received at the 50th ms, it may be determined that the first time point is the 50th ms; and if the second encapsulated packet data is received at the 65th ms, it may be determined that the second time point is the 65th ms.

S910: The receive end device sends the second packet data if a difference between the first time point and the second time point is greater than a second time threshold.

In an embodiment, if the difference between the first time point and the second time point is greater than the second time threshold, the receive end device sends the second packet data. In addition, after the second packet data is sent, the subsequently obtained third packet data is not sent but is directly discarded.

Specifically, the second time threshold is determined based on a jitter time that can be allowed by the plurality of pieces of packet data. For example, for a scanning service in industrial control traffic, the scanning service allows one piece of packet data at a fixed interval of 10 ms. If no next piece of packet data is received within 13 ms after one piece of packet data is received, it indicates that the scanning service is faulty. In this case, it can be determined that a jitter time cannot exceed 3 ms, that is, a time interval between adjacent pieces of packet data cannot exceed 13 ms. Based on this, description is made based on the example of operation S909 by using an example in which the second time threshold is 13 ms. As the first time point is the 50th ms, and the second time point is the 65th ms, a difference between the first time point and the second time point may be calculated to be 15 ms, which is greater than 13 ms. In this case, the receive end device directly sends the second packet data, and discards the subsequently obtained third packet data.

3. The target packet loss processing policy includes the third packet loss processing policy.

Figure 10A:
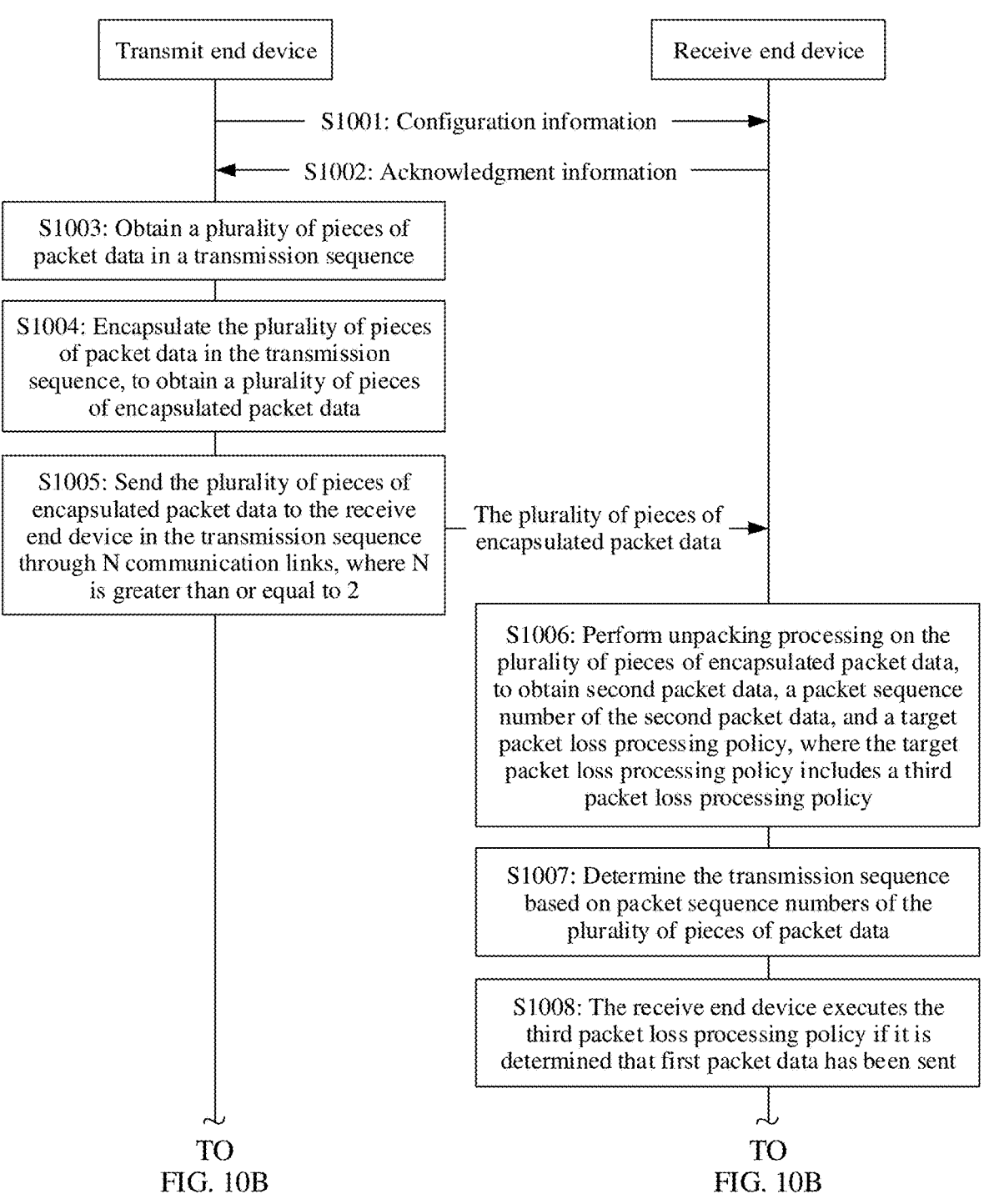

FIG. 10A and FIG. 10B are another schematic interaction flowchart of a data transmission method according to an embodiment of this application. As shown in FIG. 10A and FIG. 10B, when packet loss occurs, another data transmission method includes the following operations.

S1001: A transmit end device sends configuration information to a receive end device.

In an embodiment, as the transmit end device cannot know a packet loss processing policy supported by the receive end device, the transmit end device needs to send the configuration information to the receive end device. The configuration information includes a third packet loss processing policy, a third packet loss processing policy, a third packet loss processing policy, and a fourth packet loss processing policy.

S1002: The receive end device sends acknowledgment information to the transmit end device.

In an embodiment, the receive end device can receive, in operation S1001, the configuration information sent by the transmit end device. Because the configuration information includes the third packet loss processing policy, the third packet loss processing policy, the third packet loss processing policy, and the fourth packet loss processing policy, if the receive end device can support the third packet loss processing policy, the receive end device generates acknowledgment information, where the acknowledgment information indicates that the receive end device supports the third packet loss processing policy, and sends the acknowledgment information to the transmit end device. It should be understood that this embodiment makes a description by using an example in which the target packet loss processing policy includes the third packet loss processing policy. However, during actual application, the target packet loss processing policy may include a combination of a plurality of different packet loss processing policies. Therefore, the acknowledgment information can also indicate a plurality of different packet loss processing policies. This is limited herein.

S1003: The transmit end device obtains a plurality of pieces of packet data in a transmission sequence.

In an embodiment, a manner in which the transmit end device obtains the plurality of pieces of packet data in the transmission sequence is similar to that in operation S301, and details are not described herein again.

S1004: The transmit end device encapsulates the plurality of pieces of packet data in the transmission sequence, to obtain a plurality of pieces of encapsulated packet data.

In an embodiment, the transmit end device may receive, in operation S1002, the acknowledgment information sent by the receive end device, and therefore determine that the receive end device supports the third packet loss processing policy. Therefore, the transmit end device encapsulates the plurality of pieces of packet data in the transmission sequence, to obtain the plurality of pieces of encapsulated packet data. In this case, each piece of encapsulated packet data includes packet data, a packet sequence number, and indication information, the indication information indicates the target packet loss processing policy, and the target packet loss processing policy includes the third packet loss processing policy.

A manner in which the transmit end device encapsulates the plurality of pieces of packet data in the transmission sequence to obtain the plurality of pieces of encapsulated packet data is similar to that in operation S302. To be specific, a reassembly header can include a packet sequence number and can further include indication information indicating the third packet loss processing policy. Details are not described herein again.

S1005: The transmit end device sends the plurality of pieces of encapsulated packet data to the receive end device in the transmission sequence through N communication links.

In an embodiment, a manner in which the transmit end device sends the plurality of pieces of encapsulated packet data to the receive end device in the transmission sequence through the N communication links is similar to that in operation S303, and details are not described herein again.

The following operations are described by using an example in which the plurality of pieces of encapsulated packet data include first packet data and second packet data, a packet sequence number of the first packet data indicates that a rank of the first packet data in the plurality of pieces of encapsulated packet data is prior to a rank of the second packet data in the plurality of pieces of encapsulated packet data, and the first packet data and the second packet data are non-adjacent packet data in the plurality of pieces of encapsulated packet data; and a packet sequence number of third packet data indicates that a rank of the third packet data in the plurality of pieces of encapsulated packet data is posterior to the rank of the first packet data in the plurality of pieces of encapsulated packet data, and the third packet data and the first packet data are adjacent packet data in the plurality of pieces of encapsulated packet data.

S1006: The receive end device performs unpacking processing on the plurality of pieces of encapsulated packet data, to obtain second packet data, a packet sequence number of the second packet data, and a target packet loss processing policy, where the target packet loss processing policy includes a third packet loss processing policy.

In an embodiment, as the encapsulated packet data further includes the target packet loss processing policy, the receive end device can obtain the second packet data, the packet sequence number of the second packet data, and the target packet loss processing policy by performing unpacking processing on the plurality of pieces of encapsulated packet data, and the target packet loss processing policy includes the third packet loss processing policy. A specific manner in which the receive end device performs unpacking processing is similar to that in operation S304, and details are not described herein again.

S1007: The receive end device determines the transmission sequence based on packet sequence numbers of the plurality of pieces of packet data.

In an embodiment, the receive end device determines the transmission sequence based on the packet sequence numbers of the plurality of pieces of packet data. Because the first packet data and the second packet data are non-adjacent packet data in the plurality of pieces of encapsulated packet data, the receive end device can determine that packet loss occurs. In addition, after obtaining the second packet data and the packet sequence number through unpacking, the receive end device can determine, based on the packet sequence number of the second packet data, that the second packet data is sent after the first packet data. A specific manner of determining the transmission sequence is similar to that in operation S807, and details are not described herein again.

S1008: The receive end device executes the third packet loss processing policy if it is determined that first packet data has been sent.

In an embodiment, it can be learned from operation S1007 that the second packet data needs to be sent after the first packet data. In this case, if the first packet data has been sent, it can be determined that packet loss occurs, and the receive end device needs to execute the third packet loss processing policy. A specific manner in which the first packet data has been sent and a specific manner of determining that packet loss occurs are similar to those in operation S808, and details are not described herein again.

S1009: The receive end device buffers the second packet data.

In an embodiment, a manner in which the receive end device buffers the second packet data is similar to that in operation S809, and details are not described herein again.

S1010: The receive end device detects an RTT of each communication link, to determine RTTs of communication links.

In an embodiment, the receive end device detects the RTT of each communication link, to determine the RTTs of the communication links. Optionally, when obtaining an indication of the third packet loss processing policy, the receive end device can detect the RTT of each communication link within a predetermined period, that is, does not need to perform this operation S when determining that packet loss occurs.

S1011: The receive end device determines a communication link with a minimum RTT in the RTTs of the communication links as a target communication link.

In an embodiment, as the receive end device can determine the RTTs of the communication links in operation S1010, the communication link with the minimum RTT in the RTTs of the communication links is a communication link for the fastest data transmission. In this case, the communication link with the minimum RTT is determined as the target communication link.

S1012: The receive end device determines an RTT threshold based on the RTT of the target communication link.

In an embodiment, the receive end device determines the RTT threshold based on the RTT of the target communication link. Specifically, ½ of the RTT of the target communication link is determined as the RTT threshold. During actual application, the RTT threshold may be ⅓ or the like of the RTT of the target communication link. This needs to be flexibly limited based on a service requirement.

S1013: The receive end device sends data request information to the transmit end device if the receive end device has not obtained third packet data within the RTT threshold.

In an embodiment, if the receive end device has not obtained the third packet data within the RTT threshold, that is, does not obtain the third packet data through another communication link, the receive end device actively sends the data request information to the transmit end device. The data request information carries a packet sequence number of the third packet data. Based on this, after receiving the data request information sent by the receive end device, the transmit end device can determine the third packet data based on the packet sequence number of the third packet data, and send the third packet data to the receive end device through the target communication link. After determining the third packet data, the transmit end can perform data retransmission through the communication link with the minimum RTT, thereby reducing a buffer waiting time, and further reducing a delay of data transmission.

Optionally, the third packet loss processing policy can be executed together with the first packet loss processing policy, to reduce buffer waiting and ensure order-preserving data transmission, thereby implementing optimization and balancing of packet loss and a delay.

S1014: The receive end device obtains the third packet data, and sends the third packet data.

In an embodiment, the receive end device obtains the third packet data, and sends the third packet data. Specifically, after sending the data request information, the receive end device performs unpacking processing on a plurality of pieces of encapsulated packet data obtained through another communication link. If third packet data can be obtained, the receive end device directly sends the third packet data obtained by unpacking without waiting for the transmit end device to retransmit the third packet data. Alternatively, if the receive end device fails to obtain third packet data by unpacking processing after sending the data request information, the receive end device needs to wait for the transmit end device to retransmit the third packet data, and then send the third packet data. During actual application, both the foregoing two cases may occur. How the receive end device obtains the third packet data is not limited.

4. The target packet loss processing policy includes the fourth packet loss processing policy.

Figure 11A:
FIG. 11A and FIG. 11B are another schematic interaction flowchart of a data transmission method according to an embodiment of this application.
Figure 11B:
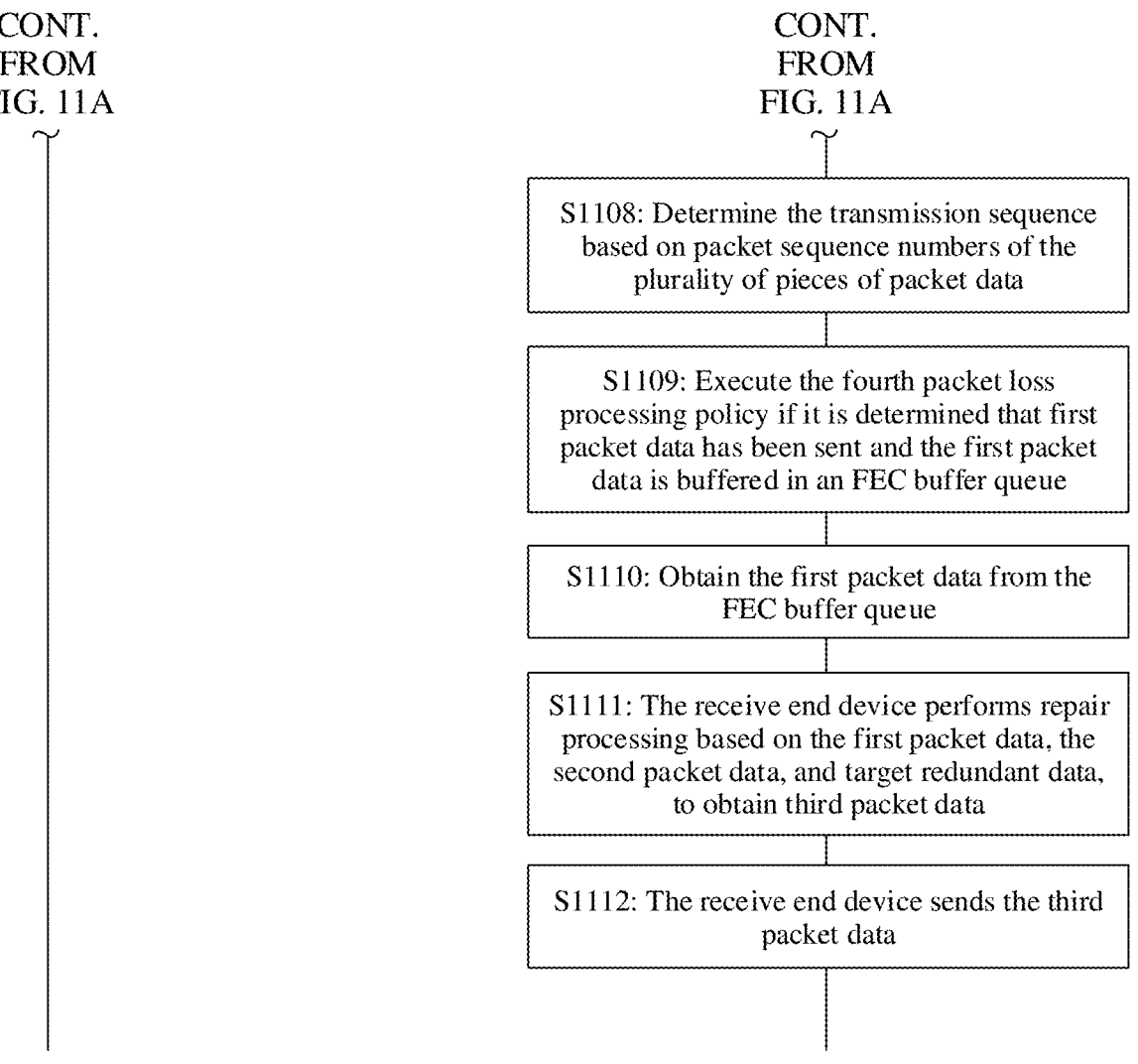

FIG. 11A and FIG. 11B are another schematic interaction flowchart of a data transmission method according to an embodiment of this application. As shown in FIG. 11A and FIG. 11B, when packet loss occurs, another data transmission method includes the following operations.

S1101: A transmit end device sends configuration information to a receive end device.

In an embodiment, as the transmit end device cannot know a packet loss processing policy supported by the receive end device, the transmit end device needs to send the configuration information to the receive end device. The configuration information includes a fourth packet loss processing policy, a fourth packet loss processing policy, a fourth packet loss processing policy, and a fourth packet loss processing policy.

S1102: The receive end device sends acknowledgment information to the transmit end device.

In an embodiment, the receive end device can receive, in operation S1101, the configuration information sent by the transmit end device. Because the configuration information includes the fourth packet loss processing policy, the fourth packet loss processing policy, the fourth packet loss processing policy, and the fourth packet loss processing policy, if the receive end device can support the fourth packet loss processing policy, the receive end device generates acknowledgment information, where the acknowledgment information indicates that the receive end device supports the fourth packet loss processing policy, and sends the acknowledgment information to the transmit end device. It should be understood that this embodiment makes a description by using an example in which the target packet loss processing policy includes the fourth packet loss processing policy. However, during actual application, the target packet loss processing policy may include a combination of a plurality of different packet loss processing policies. Therefore, the acknowledgment information can also indicate a plurality of different packet loss processing policies. This is limited herein.

S1103: The transmit end device obtains a plurality of pieces of packet data in a transmission sequence.

In an embodiment, a manner in which the transmit end device obtains the plurality of pieces of packet data in the transmission sequence is similar to that in operation S301, and details are not described herein again.

S1104: The transmit end device groups the plurality of pieces of packet data based on a preset condition, and performs FEC encoding on a plurality of pieces of packet data that belong to a same group, to generate redundant data corresponding to the group.

In an embodiment, the transmit end device groups the plurality of pieces of packet data based on a preset condition, and performs FEC encoding on a plurality of pieces of packet data that belong to a same group, to generate redundant data corresponding to the group. A plurality of pieces of packet data in each group are adjacent, and a plurality of pieces of packet data that belong to a same group and redundant data corresponding to the group include a same group identifier.

Specifically, the FEC is a channel coding algorithm for recovering a lost data packet by adding redundant data. To be specific, the transmit end device performs FEC encoding on a plurality of pieces of packet data, to generate a redundant parity check data packet (namely, redundant data corresponding to each group). The plurality of pieces of packet data and the redundant data may be combined into an FEC data block, and a quantity ratio of the plurality of pieces of packet data to the redundant data is fixed. In addition, an FEC codec algorithm includes but is not limited to a Reed-Solomon (Reed-Solomon, RS) codec algorithm, a Raptor codec algorithm, and a Tornado codec algorithm. When an FEC encoding algorithm is used, redundancy needs to be set based on a packet loss rate (packet loss rate, PLR).

S1105: The transmit end device encapsulates the plurality of pieces of packet data in the transmission sequence, to obtain a plurality of pieces of encapsulated packet data.

In an embodiment, the transmit end device may receive, in operation S1102, the acknowledgment information sent by the receive end device, and therefore determine that the receive end device supports the fourth packet loss processing policy. Therefore, the transmit end device encapsulates the plurality of pieces of packet data in the transmission sequence, to obtain the plurality of pieces of encapsulated packet data. In this case, each piece of encapsulated packet data includes packet data, a packet sequence number, and indication information, the indication information indicates the target packet loss processing policy, and the target packet loss processing policy includes the fourth packet loss processing policy. Further, the plurality of pieces of encapsulated packet data that belong to the same group and the redundant data corresponding to the group further include the same group identifier.

Further, the transmit end device can further replicate the plurality of pieces of packet data, and encapsulate a plurality of pieces of replicated packet data in the transmission sequence, to obtain a plurality of pieces of encapsulated replicated packet data. A manner of replicating the plurality of pieces of packet data is similar to the manner described in operation S302, and details are not described herein again.

Specifically, a manner in which the transmit end device encapsulates the plurality of pieces of packet data in the transmission sequence to obtain the plurality of pieces of encapsulated packet data is similar to that in operation S302. To be specific, a reassembly header can include a packet sequence number and can further include indication information indicating the fourth packet loss processing policy and a group identifier. Details are not described herein again.

S1106: The transmit end device sends the plurality of pieces of encapsulated packet data to the receive end device in the transmission sequence through N communication links.

In an embodiment, the transmit end device sends the plurality of pieces of encapsulated packet data to the receive end device in the transmission sequence through the N communication links. Specifically, the transmit end device sends the plurality of pieces of encapsulated original packet data to the receive end device in the transmission sequence through the original communication link, and sends redundant data including a group identifier to the receive end device after a plurality of pieces of encapsulated original packet data including the same group identifier is sent. Then, the transmit end device sends the plurality of pieces of encapsulated replicated packet data to the receive end device in the transmission sequence through N−1 communication links.

The following operations are described by using an example in which the plurality of pieces of encapsulated packet data include first packet data and second packet data, a packet sequence number of the first packet data indicates that a rank of the first packet data in the plurality of pieces of encapsulated packet data is prior to a rank of the second packet data in the plurality of pieces of encapsulated packet data, and the first packet data and the second packet data are non-adjacent packet data in the plurality of pieces of encapsulated packet data; a packet sequence number of third packet data indicates that a rank of the third packet data in the plurality of pieces of encapsulated packet data is posterior to the rank of the first packet data in the plurality of pieces of encapsulated packet data, and the third packet data and the first packet data are adjacent packet data in the plurality of pieces of encapsulated packet data; and the first packet data, the second packet data, and the third packet data are all the original packet data, the first packet data, the second packet data, and the third packet data include a same group identifier, and redundant data that includes the same group identifier as the first packet data, the second packet data, and the third packet data is target redundant data.

S1107: The receive end device performs unpacking processing on the plurality of pieces of encapsulated packet data, to obtain second packet data, a packet sequence number of the second packet data, and a target packet loss processing policy, where the target packet loss processing policy includes a fourth packet loss processing policy.

In an embodiment, the encapsulated packet data further includes the target packet loss processing policy, and after sending a plurality of pieces of encapsulated original packet data including a group identifier, the transmit end device further sends redundant data including the same group identifier to the receive end device. Therefore, the receive end device can receive, through the original communication link, the plurality of pieces of encapsulated original packet data and a plurality of pieces of redundant data that are sent by the transmit end device.

Based on this, the receive end device performs unpacking processing on the plurality of pieces of encapsulated packet data, to obtain the second packet data, the packet sequence number of the second packet data, and the target packet loss processing policy. The target packet loss processing policy includes the fourth packet loss processing policy. A specific manner in which the receive end device performs unpacking processing is similar to that in operation S304, and details are not described herein again.

S1108: The receive end device determines the transmission sequence based on packet sequence numbers of the plurality of pieces of packet data.

In an embodiment, the receive end device determines the transmission sequence based on the packet sequence numbers of the plurality of pieces of packet data. Because the first packet data and the second packet data are non-adjacent packet data in the plurality of pieces of encapsulated packet data, the receive end device can determine that packet loss occurs. In addition, after obtaining the second packet data and the packet sequence number through unpacking, the receive end device can determine, based on the packet sequence number of the second packet data, that the second packet data is sent after the first packet data. A specific manner of determining the transmission sequence is similar to that in operation S807, and details are not described herein again.

S1109: The receive end device executes the fourth packet loss processing policy if it is determined that first packet data has been sent and the first packet data is buffered in an FEC buffer queue.

In an embodiment, the receive end device can also obtain the target packet loss processing policy when obtaining the first packet data through unpacking, and the target packet loss processing policy includes the fourth packet loss processing policy. In this case, even if the first packet data is sent in a correct transmission sequence, the receive end device buffers the first packet data in the FEC buffer queue based on the fourth packet loss processing policy. Based on this, the second packet data needs to be sent after the first packet data. In this case, if the first packet data has been sent, it can be determined that packet loss occurs, and the receive end device needs to execute the fourth packet loss processing policy. A specific manner in which the first packet data has been sent and a specific manner of determining that packet loss occurs are similar to those in operation S808, and details are not described herein again.

S1110: The receive end device obtains the first packet data from the FEC buffer queue.

In an embodiment, the receive end device obtains the first packet data from the FEC buffer queue. Optionally, a preset quantity threshold can be set for the FEC buffer queue. To be specific, when a quantity of packet data buffered in the FEC buffer queue is greater than the preset quantity threshold, packet data in the foremost sequence number is discarded, to ensure that subsequent packet data can be buffered but does not occupy excessive buffer resources.

S1111: The receive end device performs repair processing based on the first packet data, the second packet data, and target redundant data, to obtain third packet data.

In an embodiment, it can be learned from the foregoing embodiment that the third packet data is lost packet data, and the first packet data, the second packet data, the third packet data, and the target redundant data include a same group identifier, that is, the target redundant data is obtained by performing FEC encoding on a plurality of pieces of packet data that include the same group identifier by the transmit end device. Based on this, the receive end device can perform repair processing based on the first packet data, the second packet data, and the target redundant data, to obtain the third packet data. Specifically, an FEC codec algorithm includes but is not limited to an RS codec algorithm, a Raptor codec algorithm, and a Tornado codec algorithm.

In an embodiment, if the receive end device can obtain third packet data by performing unpacking processing on a plurality of pieces of encapsulated packet data obtained through another communication link when performing repair processing, the receive end device does not continue to perform the repair processing, but directly sends the third packet data obtained by unpacking. Alternatively, if the receive end device fails to obtain third packet data by unpacking processing when performing repair processing, the receive end device needs to wait for the repair processing to be completed to obtain the third packet data, and then sends the third packet data. During actual application, both the foregoing two cases may occur. A manner of obtaining the third packet data sent by the receive end device is not limited.

S1112: The receive end device sends the third packet data.

In an embodiment, the receive end device sends the third packet data obtained in operation S1111.

5. The indication information is not included.

Figure 12:
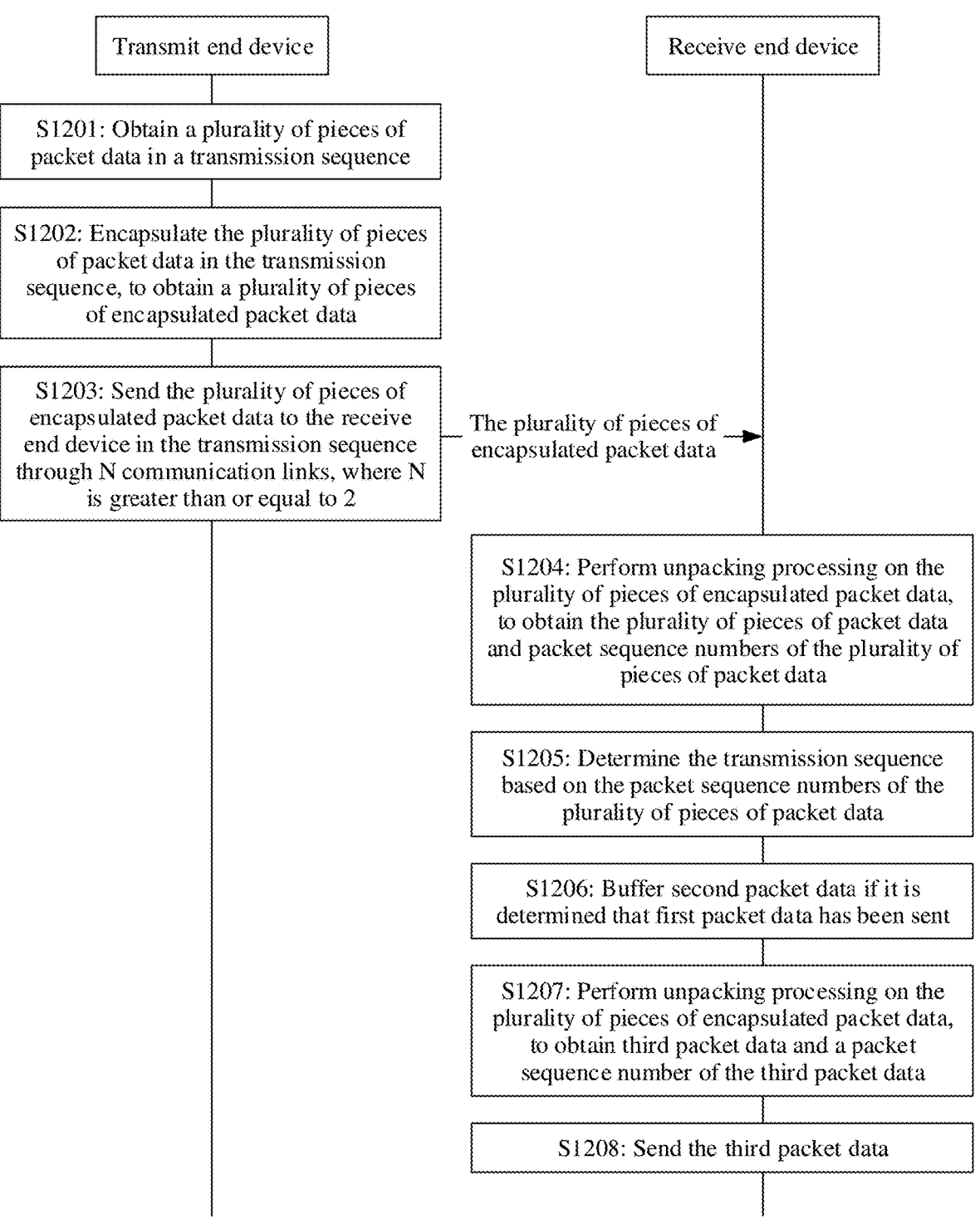
FIG. 12 is another schematic interaction flowchart of a data transmission method according to an embodiment of this application.

FIG. 12 is another schematic interaction flowchart of a data transmission method according to an embodiment of this application. As shown in FIG. 12, when packet loss occurs, another data transmission method includes the following operations.

S1201: A transmit end device obtains a plurality of pieces of packet data in a transmission sequence.

In an embodiment, a manner in which the transmit end device obtains the plurality of pieces of packet data in the transmission sequence is similar to that in operation S301, and details are not described herein again.

S1202: The transmit end device encapsulates the plurality of pieces of packet data in the transmission sequence, to obtain a plurality of pieces of encapsulated packet data.

In this embodiment, a manner in which the transmit end device encapsulates the plurality of pieces of packet data in the transmission sequence to obtain the plurality of pieces of encapsulated packet data is similar to that in operation S302, and details are not described herein again.

S1203: The transmit end device sends the plurality of pieces of encapsulated packet data to a receive end device in the transmission sequence through N communication links.

In an embodiment, a manner in which the transmit end device sends the plurality of pieces of encapsulated packet data to the receive end device in the transmission sequence through the N communication links is similar to that in operation S303, and details are not described herein again.

The following operations are described by using an example in which the plurality of pieces of encapsulated packet data include first packet data and second packet data, a packet sequence number of the first packet data indicates that a rank of the first packet data in the plurality of pieces of encapsulated packet data is prior to a rank of the second packet data in the plurality of pieces of encapsulated packet data, and the first packet data and the second packet data are non-adjacent packet data in the plurality of pieces of encapsulated packet data; and a packet sequence number of third packet data indicates that a rank of the third packet data in the plurality of pieces of encapsulated packet data is posterior to the rank of the first packet data in the plurality of pieces of encapsulated packet data, and the third packet data and the first packet data are adjacent packet data in the plurality of pieces of encapsulated packet data.

S1204: The receive end device performs unpacking processing on the plurality of pieces of encapsulated packet data, to obtain the second packet data and a packet sequence number of the second packet data.

In an embodiment, the receive end device performs unpacking processing on the plurality of pieces of encapsulated packet data, to obtain the second packet data, the packet sequence number of the second packet data, and a target packet loss processing policy. A specific manner in which the receive end device performs unpacking processing is similar to that in operation S304, and details are not described herein again.

S1205: The receive end device determines the transmission sequence based on the packet sequence numbers of the plurality of pieces of packet data.

In an embodiment, it can be learned from operation S1007 that the second packet data needs to be sent after the first packet data. In this case, if the first packet data has been sent, it can be determined that packet loss occurs, and the receive end device needs to execute the third packet loss processing policy. A specific manner in which the first packet data has been sent and a specific manner of determining that packet loss occurs are similar to those in operation S808, and details are not described herein again.

S1206: The receive end device buffers second packet data if it is determined that first packet data has been sent.

In an embodiment, the second packet data needs to be sent after the first packet data. In this case, if the first packet data has been sent, it can be determined that packet loss occurs. To ensure that the plurality of pieces of packet data can be sent in the transmission sequence, when packet loss occurs, the receive end device cannot send the second packet data, that is, needs to buffer the second packet data.

S1207: The receive end device performs unpacking processing on the plurality of pieces of encapsulated packet data, to obtain third packet data and a packet sequence number of the third packet data.

In an embodiment, the receive end device performs unpacking processing on encapsulated packet data received through another communication link, to obtain the third packet data and the packet sequence number of the third packet data. The third packet data and the first packet data are adjacent packet data, and the packet sequence number of the third packet data indicates that the third packet data needs to be sent after the first packet data. In this case, it can be determined that packet data in a correct transmission sequence is received.

S1208: The receive end device sends the third packet data.

In an embodiment, the receive end device sends the third packet data obtained in operation S1208.

The foregoing mainly describes the solutions provided in embodiments of this application from the perspective of the method. It can be understood that, to implement the foregoing function, a data transmission apparatus includes a corresponding hardware structure and/or software module for implementing the function. A person skilled in the art should easily be aware that, in combination with the examples described in embodiments disclosed in this specification, modules, algorithms, and operations S can be implemented by hardware or a combination of hardware and computer software in this application. Whether a function is implemented by hardware or hardware driven by computer software depends on a particular application and a design constraint condition of the technical solutions. A person skilled in the art may use different methods to implement the described functions for particular applications, but it should not be considered that the implementation goes beyond the scope of this application.

In embodiments of this application, a data transmission apparatus may be divided into functional modules based on the foregoing method examples. For example, functional modules may be obtained through division based on corresponding functions, or two or more functions may be integrated into one processing module. The integrated module may be implemented in a form of hardware, or may be implemented in a form of a software functional module. It should be noted that, in embodiments of this application, division into the modules is an example and is merely logical function division, and may be other division in an actual implementation.

Figure 13:
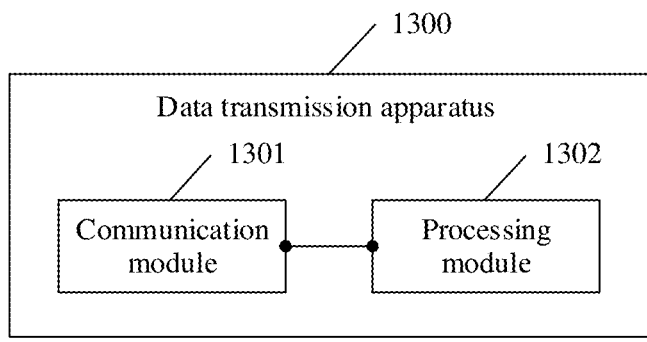
FIG. 13 is a schematic diagram of a structure of a data transmission apparatus according to an embodiment of this application.

Therefore, the following describes in detail a data transmission apparatus in this application, and the data transmission apparatus is disposed in a receive end device. FIG. 13 is a schematic diagram of a structure of a data transmission apparatus according to an embodiment of this application. As shown in the figure, a data transmission apparatus 1300 includes a communication module 1301 and a processing module 1302.

The communication module 1301 is configured to receive, through a communication link, a plurality of pieces of encapsulated packet data sent by a transmit end device, where the plurality of pieces of encapsulated packet data are obtained by encapsulating a plurality of pieces of packet data in a transmission sequence, each piece of encapsulated packet data includes packet data and a packet sequence number, the packet sequence number indicates a rank of corresponding encapsulated packet data in the plurality of pieces of encapsulated packet data, and a rank of each piece of encapsulated packet data in the plurality of pieces of encapsulated packet data is consistent with that in the transmission sequence. For a specific implementation, refer to the detailed descriptions of operation S303 in the embodiment shown in FIG. 3, or the detailed descriptions of operation S805 in the embodiment shown in FIG. 8, or the detailed descriptions of operation S905 in the embodiment shown in FIG. 9, or the detailed descriptions of operation S1005 in the embodiment shown in FIG. 10A, or the detailed descriptions of operation S1106 in the embodiment shown in FIG. 11A, or the detailed descriptions of operation S1203 in the embodiment shown in FIG. 12. Details are not described herein again.

The processing module 1302 is configured to perform unpacking processing on the plurality of pieces of encapsulated packet data, to obtain the plurality of pieces of packet data and packet sequence numbers of the plurality of pieces of packet data. For a specific implementation, refer to the detailed descriptions of operation S304 in the embodiment shown in FIG. 3, or the detailed descriptions of operation S806 in the embodiment shown in FIG. 8, or the detailed descriptions of operation S906 in the embodiment shown in FIG. 9, or the detailed descriptions of operation S1006 in the embodiment shown in FIG. 10A, or the detailed descriptions of operation S1107 in the embodiment shown in FIG. 11A, or the detailed descriptions of operation S1204 in the embodiment shown in FIG. 12. Details are not described herein again.

The processing module 1302 is further configured to determine the transmission sequence based on the packet sequence numbers of the plurality of pieces of packet data. For a specific implementation, refer to the detailed descriptions of operation S305 in the embodiment shown in FIG. 3, or the detailed descriptions of operation S807 in the embodiment shown in FIG. 8, or the detailed descriptions of operation S907 in the embodiment shown in FIG. 9, or the detailed descriptions of operation S1007 in the embodiment shown in FIG. 10A, or the detailed descriptions of operation S1108 in the embodiment shown in FIG. 11B, or the detailed descriptions of operation S1205 in the embodiment shown in FIG. 12. Details are not described herein again.

The communication module 1301 is further configured to send the plurality of pieces of packet data in the transmission sequence. For a specific implementation, refer to the detailed descriptions of operation S306 in the embodiment shown in FIG. 3, or the detailed descriptions of operation S808 to operation S810 in the embodiment shown in FIG. 8, or the detailed descriptions of operation S908 to operation S910 in the embodiment shown in FIG. 9, or the detailed descriptions of operation S1008 to operation S1014 in the embodiment shown in FIG. 10A and FIG. 10B, or the detailed descriptions of operation S1109 to operation S1113 in the embodiment shown in FIG. 11B, or the detailed descriptions of operation S1206 to operation S1208 in the embodiment shown in FIG. 12. Details are not described herein again.

In an embodiment, based on the foregoing embodiment corresponding to FIG. 13, in another embodiment of the data transmission apparatus 1300 provided in this embodiment of this application, encapsulated packet data further includes indication information, where the indication information indicates a target packet loss processing policy.

The communication module 1301 is further configured to send an acknowledgment message to the transmit end device before receiving, through the communication link, the plurality of pieces of encapsulated packet data sent by the transmit end device, where the acknowledgment message indicates that a receive end device supports the target packet loss processing policy. For a specific implementation, refer to the detailed descriptions of operation S802 in the embodiment shown in FIG. 8, or the detailed descriptions of operation S902 in the embodiment shown in FIG. 9, or the detailed descriptions of operation S1002 in the embodiment shown in FIG. 10A, or the detailed descriptions of operation S1102 in the embodiment shown in FIG. 11A. Details are not described herein again.

In an embodiment, based on the foregoing embodiment corresponding to FIG. 13, in another embodiment of the data transmission apparatus 1300 provided in this embodiment of this application, the plurality of pieces of encapsulated packet data include first packet data and second packet data, a packet sequence number of the first packet data indicates that a rank of the first packet data in the plurality of pieces of encapsulated packet data is prior to a rank of the second packet data in the plurality of pieces of encapsulated packet data, and the first packet data and the second packet data are adjacent packet data in the plurality of pieces of encapsulated packet data.

The processing module 1302 is configured to perform unpacking processing on the plurality of pieces of encapsulated packet data, to obtain the second packet data and a packet sequence number of the second packet data. For a specific implementation, refer to the detailed descriptions of operation S304 in the embodiment shown in FIG. 3. Details are not described herein again.

The processing module 1302 is configured to determine, based on the packet sequence number of the second packet data, that the second packet data is sent after the first packet data. For a specific implementation, refer to the detailed descriptions of operation S305 in the embodiment shown in FIG. 3. Details are not described herein again.

The communication module 1301 is configured to send the second packet data if it is determined that the first packet data has been sent. For a specific implementation, refer to the detailed descriptions of operation S306 in the embodiment shown in FIG. 3. Details are not described herein again.

In an embodiment, based on the foregoing embodiment corresponding to FIG. 13, in another embodiment of the data transmission apparatus 1300 provided in this embodiment of this application, the plurality of pieces of encapsulated packet data include first packet data and second packet data, a packet sequence number of the first packet data indicates that a rank of the first packet data in the plurality of pieces of encapsulated packet data is prior to a rank of the second packet data in the plurality of pieces of encapsulated packet data, and the first packet data and the second packet data are non-adjacent packet data in the plurality of pieces of encapsulated packet data.

In an embodiment, based on the foregoing embodiment corresponding to FIG. 13, in another embodiment of the data transmission apparatus 1300 provided in this embodiment of this application, the processing module 1302 is configured to perform unpacking processing on the plurality of pieces of encapsulated packet data, to obtain the second packet data and a packet sequence number of the second packet data. For a specific implementation, refer to the detailed descriptions of operation S1204 in the embodiment shown in FIG. 12. Details are not described herein again.

The processing module 1302 is configured to determine, based on the packet sequence number of the second packet data, that the second packet data is sent after the first packet data. For a specific implementation, refer to the detailed descriptions of operation S1205 in the embodiment shown in FIG. 12. Details are not described herein again.

The communication module 1301 is configured to buffer the second packet data if it is determined that the first packet data has been sent, where for a specific implementation, refer to the detailed descriptions of operation S1206 in the embodiment shown in FIG. 12, and details are not described herein again; perform unpacking processing on the plurality of pieces of encapsulated packet data, to obtain third packet data and a packet sequence number of the third packet data, where the packet sequence number of the third packet data indicates that a rank of the third packet data in the plurality of pieces of encapsulated packet data is posterior to the rank of the first packet data in the plurality of pieces of encapsulated packet data, and the third packet data and the first packet data are adjacent packet data in the plurality of pieces of encapsulated packet data, where for a specific implementation, refer to the detailed descriptions of operation S1207 in the embodiment shown in FIG. 12, and details are not described herein again; and send the third packet data, where for a specific implementation, refer to the detailed descriptions of operation S1208 in the embodiment shown in FIG. 12, and details are not described herein again.

In an embodiment, based on the foregoing embodiment corresponding to FIG. 13, in another embodiment of the data transmission apparatus 1300 provided in this embodiment of this application, the processing module 1302 is configured to perform unpacking processing on the plurality of pieces of encapsulated packet data, to obtain the second packet data, a packet sequence number of the second packet data, and the target packet loss processing policy, where the target packet loss processing policy includes a first packet loss processing policy. For a specific implementation, refer to the detailed descriptions of operation S806 in the embodiment shown in FIG. 8. Details are not described herein again.

The processing module 1302 is configured to determine, based on the packet sequence number of the second packet data, that the second packet data is sent after the first packet data. For a specific implementation, refer to the detailed descriptions of operation S807 in the embodiment shown in FIG. 8. Details are not described herein again.

The communication module 1301 is configured to execute, by the receive end device, the first packet loss processing policy if it is determined that the first packet data has been sent, where for a specific implementation, refer to the detailed descriptions of operation S808 in the embodiment shown in FIG. 8, and details are not described herein again; buffer the second packet data, where for a specific implementation, refer to the detailed descriptions of operation S809 in the embodiment shown in FIG. 8, and details are not described herein again; and send the second packet data if a buffer time of the second packet data is greater than a first time threshold, where for a specific implementation, refer to the detailed descriptions of operation S810 in the embodiment shown in FIG. 8, and details are not described herein again.

In an embodiment, based on the foregoing embodiment corresponding to FIG. 13, in another embodiment of the data transmission apparatus 1300 provided in this embodiment of this application, the processing module 1302 is configured to perform unpacking processing on the plurality of pieces of encapsulated packet data, to obtain the second packet data, a packet sequence number of the second packet data, and the target packet loss processing policy, where the target packet loss processing policy includes a second packet loss processing policy. For a specific implementation, refer to the detailed descriptions of operation S906 in the embodiment shown in FIG. 9. Details are not described herein again.

The processing module 1302 is configured to determine, based on the packet sequence number of the second packet data, that the second packet data is sent after the first packet data. For a specific implementation, refer to the detailed descriptions of operation S907 in the embodiment shown in FIG. 9. Details are not described herein again.

The communication module 1301 is configured to execute, by the receive end device, the second packet loss processing policy if it is determined that the first packet data has been sent, where for a specific implementation, refer to the detailed descriptions of operation S908 in the embodiment shown in FIG. 9, and details are not described herein again; determine a first time point at which first encapsulated packet data is received and a second time point at which second encapsulated packet data is received, where the first encapsulated packet data includes the first packet data, and the second encapsulated packet data includes the second packet data, where for a specific implementation, refer to the detailed descriptions of operation S909 in the embodiment shown in FIG. 9, and details are not described herein again; and send the second packet data if a difference between the first time point and the second time point is greater than a second time threshold, where for a specific implementation, refer to the detailed descriptions of operation S910 in the embodiment shown in FIG. 9, and details are not described herein again.

In an embodiment, based on the foregoing embodiment corresponding to FIG. 13, in another embodiment of the data transmission apparatus 1300 provided in this embodiment of this application, the processing module 1302 is configured to perform unpacking processing on the plurality of pieces of encapsulated packet data, to obtain the second packet data, a packet sequence number of the second packet data, and the target packet loss processing policy, where the target packet loss processing policy includes a third packet loss processing policy. For a specific implementation, refer to the detailed descriptions of operation S1006 in the embodiment shown in FIG. 10A. Details are not described herein again.

The processing module 1302 is configured to determine, based on the packet sequence number of the second packet data, that the second packet data is sent after the first packet data. For a specific implementation, refer to the detailed descriptions of operation S1007 in the embodiment shown in FIG. 10A. Details are not described herein again.

The communication module 1301 is configured to execute, by the receive end device, the third packet loss processing policy if it is determined that the first packet data has been sent, where for a specific implementation, refer to the detailed descriptions of operation S1008 in the embodiment shown in FIG. 10A, and details are not described herein again; buffer the second packet data, where for a specific implementation, refer to the detailed descriptions of operation S1009 in the embodiment shown in FIG. 10B, and details are not described herein again; send data request information to the transmit end device if third packet data has not been obtained within an RTT threshold, where the data request information carries a packet sequence number of the third packet data; the data request information indicates the transmit end device to determine the third packet data based on the packet sequence number of the third packet data and send the third packet data to the receive end device through a target communication link, where the target communication link is a communication link with a minimum RTT; and the RTT threshold is determined based on the RTT of the target communication link, where for a specific implementation, refer to the detailed descriptions of operation S1013 in the embodiment shown in FIG. 10B, and details are not described herein again; and obtain, by the receive end device, the third packet data, and send the third packet data, where for a specific implementation, refer to the detailed descriptions of operation S1014 in the embodiment shown in FIG. 10B, and details are not described herein again.

In an embodiment, based on the foregoing embodiment corresponding to FIG. 13, in another embodiment of the data transmission apparatus 1300 provided in this embodiment of this application, the processing module 1302 is further configured to detect an RTT of each communication link, to determine RTTs of communication links. For a specific implementation, refer to the detailed descriptions of operation S1010 in the embodiment shown in FIG. 10B. Details are not described herein again.

The processing module 1302 is further configured to determine a communication link with a minimum RTT in the RTTs of the communication links as the target communication link. For a specific implementation, refer to the detailed descriptions of operation S1011 in the embodiment shown in FIG. 10B. Details are not described herein again.

The processing module 1302 is further configured to determine the RTT threshold based on the RTT of the target communication link. For a specific implementation, refer to the detailed descriptions of operation S1012 in the embodiment shown in FIG. 10B. Details are not described herein again.

In an embodiment, based on the foregoing embodiment corresponding to FIG. 13, in another embodiment of the data transmission apparatus 1300 provided in this embodiment of this application, the communication module 1301 is configured to receive, through an original communication link, a plurality of pieces of encapsulated original packet data and a plurality of pieces of redundant data that are sent by the transmit end device, where the original packet data is packet data that has not been replicated, the original communication link is a communication link for sending the original packet data, the redundant data is generated by grouping the plurality of pieces of packet data based on a preset condition and performing FEC encoding on a plurality of pieces of packet data that belong to a same group, and a plurality of pieces of encapsulated original packet data that belong to a same group and redundant data corresponding to the group include a same group identifier. For a specific implementation, refer to the detailed descriptions of operation S1106 in the embodiment shown in FIG. 11A. Details are not described herein again.

In an embodiment, based on the foregoing embodiment corresponding to FIG. 13, in another embodiment of the data transmission apparatus 1300 provided in this embodiment of this application, the first packet data, the second packet data, and the third packet data are all the original packet data, the first packet data, the second packet data, and the third packet data include a same group identifier, and redundant data that includes the same group identifier as the first packet data, the second packet data, and the third packet data is the target redundant data.

The processing module 1302 is configured to perform unpacking processing on the plurality of pieces of encapsulated packet data, to obtain the second packet data, a packet sequence number of the second packet data, and the target packet loss processing policy, where the target packet loss processing policy includes a fourth packet loss processing policy. For a specific implementation, refer to the detailed descriptions of operation S1107 in the embodiment shown in FIG. 11A. Details are not described herein again.

The processing module 1302 is configured to determine, based on the packet sequence number of the second packet data, that the second packet data is sent after the first packet data. For a specific implementation, refer to the detailed descriptions of operation S1108 in the embodiment shown in FIG. 11B. Details are not described herein again.

The communication module 1301 is configured to execute, by the receive end device, the fourth packet loss processing policy if it is determined that the first packet data has been sent and the first packet data is buffered in an FEC buffer queue, where for a specific implementation, refer to the detailed descriptions of operation S1109 in the embodiment shown in FIG. 11B, and details are not described herein again; obtain the first packet data from the FEC buffer queue, where for a specific implementation, refer to the detailed descriptions of operation S1110 in the embodiment shown in FIG. 11B, and details are not described herein again; perform repair processing based on the first packet data, the second packet data, and the target redundant data, to obtain the third packet data, where for a specific implementation, refer to the detailed descriptions of operation S1111 in the embodiment shown in FIG. 11B, and details are not described herein again; and send the third packet data, where for a specific implementation, refer to the detailed descriptions of operation S1112 in the embodiment shown in FIG. 11B, and details are not described herein again.

Figure 14:
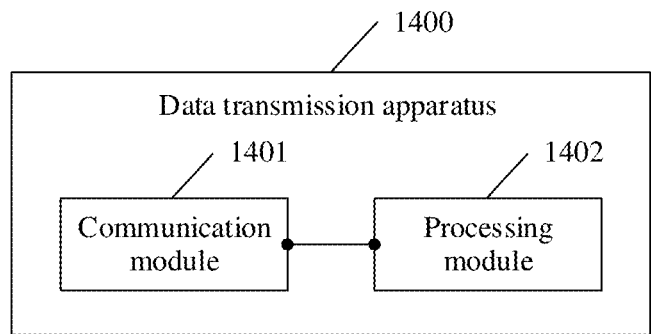
FIG. 14 is a schematic diagram of another structure of a data transmission apparatus according to an embodiment of this application.

The following describes in detail a data transmission apparatus in this application, and the data transmission apparatus is disposed in a transmit end device. FIG. 14 is a schematic diagram of another structure of a data transmission apparatus according to an embodiment of this application. As shown in the figure, a data transmission apparatus 1400 includes a communication module 1401 and a processing module 1402.

The communication module 1401 is configured to obtain a plurality of pieces of packet data in a transmission sequence. For a specific implementation, refer to the detailed descriptions of operation S301 in the embodiment shown in FIG. 3. Details are not described herein again.

The processing module 1402 is configured to encapsulate the plurality of pieces of packet data in the transmission sequence, to obtain a plurality of pieces of encapsulated packet data, where each piece of encapsulated packet data includes packet data and a packet sequence number, the packet sequence number indicates a rank of corresponding encapsulated packet data in the plurality of pieces of encapsulated packet data, and a rank of each piece of encapsulated packet data in the plurality of pieces of encapsulated packet data is consistent with that in the transmission sequence. For a specific implementation, refer to the detailed descriptions of operation S302 in the embodiment shown in FIG. 3, or the detailed descriptions of operation S804 in the embodiment shown in FIG. 8, or the detailed descriptions of operation S904 in the embodiment shown in FIG. 9, or the detailed descriptions of operation S1004 in the embodiment shown in FIG. 10A, or the detailed descriptions of operation S1104 in the embodiment shown in FIG. 11A, or the detailed descriptions of operation S1202 in the embodiment shown in FIG. 12. Details are not described herein again.

The communication module 1401 is further configured to send the plurality of pieces of encapsulated packet data to a receive end device in the transmission sequence through N communication links, where N is greater than or equal to 2. For a specific implementation, refer to the detailed descriptions of operation S303 in the embodiment shown in FIG. 3, or the detailed descriptions of operation S805 in the embodiment shown in FIG. 8, or the detailed descriptions of operation S905 in the embodiment shown in FIG. 9, or the detailed descriptions of operation S1005 in the embodiment shown in FIG. 10A, or the detailed descriptions of operation S1105 in the embodiment shown in FIG. 11A, or the detailed descriptions of operation S1203 in the embodiment shown in FIG. 12. Details are not described herein again.

In an embodiment of this application, each piece of encapsulated packet data further includes indication information, where the indication information indicates a target packet loss processing policy.

The communication module 1401 is further configured to receive an acknowledgment message sent by the receive end device before encapsulating the plurality of pieces of packet data in the transmission sequence to obtain the plurality of pieces of encapsulated packet data, where the acknowledgment message indicates that the receive end device supports the target packet loss processing policy. For a specific implementation, refer to the detailed descriptions of operation S802 in the embodiment shown in FIG. 8, or the detailed descriptions of operation S902 in the embodiment shown in FIG. 9, or the detailed descriptions of operation S1002 in the embodiment shown in FIG. 10A, or the detailed descriptions of operation S1102 in the embodiment shown in FIG. 11A. Details are not described herein again.

In an embodiment, based on the foregoing embodiment corresponding to FIG. 14, in another embodiment of the data transmission apparatus 1400 provided in this embodiment of this application, the plurality of pieces of encapsulated packet data include first packet data and second packet data, a packet sequence number of the first packet data indicates that a rank of the first packet data in the plurality of pieces of encapsulated packet data is prior to a rank of the second packet data in the plurality of pieces of encapsulated packet data, and the first packet data and the second packet data are adjacent packet data in the plurality of pieces of encapsulated packet data.

In an embodiment, based on the foregoing embodiment corresponding to FIG. 14, in another embodiment of the data transmission apparatus 1400 provided in this embodiment of this application, the plurality of pieces of encapsulated packet data include first packet data and second packet data, a packet sequence number of the first packet data indicates that a rank of the first packet data in the plurality of pieces of encapsulated packet data is prior to a rank of the second packet data in the plurality of pieces of encapsulated packet data, and the first packet data and the second packet data are non-adjacent packet data in the plurality of pieces of encapsulated packet data.

In an embodiment, based on the foregoing embodiment corresponding to FIG. 14, in another embodiment of the data transmission apparatus 1400 provided in this embodiment of this application, the target packet loss processing policy includes a first packet loss processing policy.

The first packet loss processing policy is that the receive end device buffers the second packet data; and the receive end device sends the second packet data if a buffer time of the second packet data is greater than a first time threshold. For a specific implementation of the first packet loss processing policy, refer to the detailed descriptions of operation S806 to operation S810 in the embodiment shown in FIG. 8. Details are not described herein again.

In an embodiment, based on the foregoing embodiment corresponding to FIG. 14, in another embodiment of the data transmission apparatus 1400 provided in this embodiment of this application, the target packet loss processing policy includes a second packet loss processing policy.

The second packet loss processing policy is that the receive end device determines a first time point at which first encapsulated packet data is received and a second time point at which second encapsulated packet data is received, where the first encapsulated packet data includes the first packet data, and the second encapsulated packet data includes the second packet data; and the receive end device sends the second packet data if a difference between the first time point and the second time point is greater than a second time threshold. For a specific implementation of the second packet loss processing policy, refer to the detailed descriptions of operation S906 to operation S910 in the embodiment shown in FIG. 9. Details are not described herein again.

In an embodiment, based on the foregoing embodiment corresponding to FIG. 14, in another embodiment of the data transmission apparatus 1400 provided in this embodiment of this application, the target packet loss processing policy includes a third packet loss processing policy.

The third packet loss processing policy is that the receive end device buffers the second packet data; the receive end device sends data request information to the transmit end device if the receive end device has not obtained third packet data within an RTT threshold, where the data request information carries a packet sequence number of the third packet data; the data request information indicates the transmit end device to determine the third packet data based on the packet sequence number of the third packet data and send the third packet data to the receive end device through a target communication link, where the target communication link is a communication link with a minimum RTT; and the RTT threshold is determined based on the RTT of the target communication link; and the receive end device obtains the third packet data, and sends the third packet data. For a specific implementation of the third packet loss processing policy, refer to the detailed descriptions of operation S1006 to operation S1014 in the embodiment shown in FIG. 10A and FIG. 10B. Details are not described herein again.

In an embodiment, based on the foregoing embodiment corresponding to FIG. 14, in another embodiment of the data transmission apparatus 1400 provided in this embodiment of this application, the communication module 1401 is further configured to receive the data request information sent by the receive end device. For a specific implementation, refer to the detailed descriptions of operation S1013 in the embodiment shown in FIG. 10B. Details are not described herein again.

The processing module 1402 is further configured to determine the third packet data based on the packet sequence number of the third packet data. For a specific implementation, refer to the detailed descriptions of operation S1013 in the embodiment shown in FIG. 10B. Details are not described herein again.

The communication module 1401 is further configured to send the third packet data to the receive end device through the target communication link. For a specific implementation, refer to the detailed descriptions of operation S1014 in the embodiment shown in FIG. 10B. Details are not described herein again.

In an embodiment, based on the foregoing embodiment corresponding to FIG. 14, in another embodiment of the data transmission apparatus 1400 provided in this embodiment of this application, the processing module 1402 is further configured to group the plurality of pieces of packet data based on a preset condition, and perform FEC encoding on a plurality of pieces of packet data that belong to a same group, to generate redundant data corresponding to the group, where a plurality of pieces of packet data in each group are adjacent, and a plurality of pieces of packet data that belong to a same group and redundant data corresponding to the group include a same group identifier. For a specific implementation, refer to the detailed descriptions of operation S1104 in the embodiment shown in FIG. 11A. Details are not described herein again.

The processing module 1402 is configured to encapsulate the plurality of pieces of packet data in the transmission sequence, to obtain the plurality of pieces of encapsulated packet data, where a plurality of pieces of encapsulated packet data that belong to a same group and redundant data corresponding to the group include a same group identifier, where for a specific implementation, refer to the detailed descriptions of operation S1105 in the embodiment shown in FIG. 11A, and details are not described herein again; and replicate the plurality of pieces of packet data, and encapsulate a plurality of pieces of replicated packet data in the transmission sequence, to obtain a plurality of pieces of encapsulated replicated packet data, where for a specific implementation, refer to the detailed descriptions of operation S1105 in the embodiment shown in FIG. 11A, and details are not described herein again.

In an embodiment, based on the foregoing embodiment corresponding to FIG. 14, in another embodiment of the data transmission apparatus 1400 provided in this embodiment of this application, the plurality of pieces of packet data are a plurality of pieces of original packet data, the plurality of pieces of encapsulated packet data are a plurality of pieces of encapsulated original packet data, and a communication link, in the N communication links, for sending the plurality of pieces of encapsulated original packet data is an original communication link.

The communication module 1401 is configured to send the plurality of pieces of encapsulated original packet data to the receive end device in the transmission sequence through the original communication link, and send redundant data including a group identifier to the receive end device after a plurality of pieces of encapsulated original packet data including the same group identifier is sent, where for a specific implementation, refer to the detailed descriptions of operation S1106 in the embodiment shown in FIG. 11A, and details are not described herein again; and send the plurality of pieces of encapsulated replicated packet data to the receive end device in the transmission sequence through N−1 communication links, where for a specific implementation, refer to the detailed descriptions of operation S1106 in the embodiment shown in FIG. 11A, and details are not described herein again.

In an embodiment, based on the foregoing embodiment corresponding to FIG. 14, in another embodiment of the data transmission apparatus 1400 provided in this embodiment of this application, the target packet loss processing policy includes a fourth packet loss processing policy.

The fourth packet loss processing policy is that the receive end device obtains the first packet data from an FEC buffer queue when the receive end device obtains the second packet data and target redundant data, the first packet data has been sent, and the receive end device has not obtained the third packet data, where the first packet data, the second packet data, and the third packet data are all the original packet data, the first packet data, the second packet data, and the third packet data include a same group identifier, and redundant data that includes the same group identifier as the first packet data, the second packet data, and the third packet data is the target redundant data; and the receive end device performs repair processing based on the first packet data, the second packet data, and the target redundant data, to obtain the third packet data, and sends the third packet data. For a specific implementation of the fourth packet loss processing policy, refer to the detailed descriptions of operation S1107 to operation S1112 in the embodiment shown in FIG. 11A and FIG. 11B. Details are not described herein again.

Figure 15:
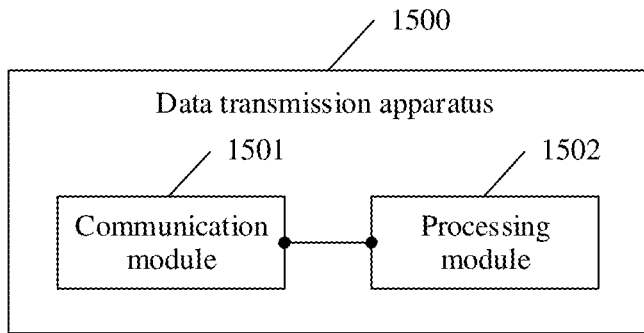
FIG. 15 is a schematic diagram of still another structure of a data transmission apparatus according to an embodiment of this application.

The following describes in detail a data transmission apparatus in this application, and the data transmission apparatus is disposed in a transmit end device. FIG. 15 is a schematic diagram of still another structure of a data transmission apparatus according to an embodiment of this application. As shown in the figure, a data transmission apparatus 1500 includes a communication module 1501 and a processing module 1502.

The communication module 1501 is configured to receive an acknowledgment message sent by a receive end device, where the acknowledgment message indicates that the receive end device supports a target packet loss processing policy. For a specific implementation, refer to the detailed descriptions of operation S802 in the embodiment shown in FIG. 8, or the detailed descriptions of operation S902 in the embodiment shown in FIG. 9, or the detailed descriptions of operation S1002 in the embodiment shown in FIG. 10A, or the detailed descriptions of operation S1102 in the embodiment shown in FIG. 11A. Details are not described herein again.

The communication module 1501 is further configured to obtain a plurality of pieces of packet data in a transmission sequence. For a specific implementation, refer to the detailed descriptions of operation S301 in the embodiment shown in FIG. 3. Details are not described herein again.

The processing module 1502 is configured to encapsulate the plurality of pieces of packet data in the transmission sequence, to obtain a plurality of pieces of encapsulated packet data, where each piece of encapsulated packet data includes packet data, a packet sequence number, and indication information, the packet sequence number indicates a rank of corresponding encapsulated packet data in the plurality of pieces of encapsulated packet data, a rank of each piece of encapsulated packet data in the plurality of pieces of encapsulated packet data is consistent with that in the transmission sequence, and the indication information indicates the target packet loss processing policy. For a specific implementation, refer to the detailed descriptions of operation S302 in the embodiment shown in FIG. 3, or the detailed descriptions of operation S804 in the embodiment shown in FIG. 8, or the detailed descriptions of operation S904 in the embodiment shown in FIG. 9, or the detailed descriptions of operation S1004 in the embodiment shown in FIG. 10A, or the detailed descriptions of operation S1104 in the embodiment shown in FIG. 11A, or the detailed descriptions of operation S1202 in the embodiment shown in FIG. 12. Details are not described herein again.

The communication module 1501 is further configured to send the plurality of pieces of encapsulated packet data to a receive end device in the transmission sequence through N communication links, where N is greater than or equal to 2. For a specific implementation, refer to the detailed descriptions of operation S303 in the embodiment shown in FIG. 3, or the detailed descriptions of operation S805 in the embodiment shown in FIG. 8, or the detailed descriptions of operation S905 in the embodiment shown in FIG. 9, or the detailed descriptions of operation S1005 in the embodiment shown in FIG. 10A, or the detailed descriptions of operation S1105 in the embodiment shown in FIG. 11A, or the detailed descriptions of operation S1203 in the embodiment shown in FIG. 12. Details are not described herein again.

Based on the foregoing embodiment corresponding to FIG. 15, in another embodiment of the data transmission apparatus 1500 provided in this embodiment of this application, the plurality of pieces of encapsulated packet data include first packet data and second packet data, a packet sequence number of the first packet data indicates that a rank of the first packet data in the plurality of pieces of encapsulated packet data is prior to a rank of the second packet data in the plurality of pieces of encapsulated packet data, and the first packet data and the second packet data are adjacent packet data in the plurality of pieces of encapsulated packet data.

Based on the foregoing embodiment corresponding to FIG. 15, in another embodiment of the data transmission apparatus 1500 provided in this embodiment of this application, the plurality of pieces of encapsulated packet data include first packet data and second packet data, a packet sequence number of the first packet data indicates that a rank of the first packet data in the plurality of pieces of encapsulated packet data is prior to a rank of the second packet data in the plurality of pieces of encapsulated packet data, and the first packet data and the second packet data are non-adjacent packet data in the plurality of pieces of encapsulated packet data.

Based on the foregoing embodiment corresponding to FIG. 15, in another embodiment of the data transmission apparatus 1500 provided in this embodiment of this application, the target packet loss processing policy includes a first packet loss processing policy.

The first packet loss processing policy is that the receive end device buffers the second packet data; and the receive end device sends the second packet data if a buffer time of the second packet data is greater than a first time threshold. For a specific implementation of the first packet loss processing policy, refer to the detailed descriptions of operation S806 to operation S810 in the embodiment shown in FIG. 8. Details are not described herein again.

Based on the foregoing embodiment corresponding to FIG. 15, in another embodiment of the data transmission apparatus 1500 provided in this embodiment of this application, the target packet loss processing policy includes a second packet loss processing policy.

The second packet loss processing policy is that the receive end device determines a first time point at which first encapsulated packet data is received and a second time point at which second encapsulated packet data is received, where the first encapsulated packet data includes the first packet data, and the second encapsulated packet data includes the second packet data; and the receive end device sends the second packet data if a difference between the first time point and the second time point is greater than a second time threshold. For a specific implementation of the second packet loss processing policy, refer to the detailed descriptions of operation S906 to operation S910 in the embodiment shown in FIG. 9. Details are not described herein again.

Based on the foregoing embodiment corresponding to FIG. 15, in another embodiment of the data transmission apparatus 1500 provided in this embodiment of this application, the target packet loss processing policy includes a third packet loss processing policy.

The third packet loss processing policy is that the receive end device buffers the second packet data; the receive end device sends data request information to the transmit end device if the receive end device has not obtained third packet data within an RTT threshold, where the data request information carries a packet sequence number of the third packet data; the data request information indicates the transmit end device to determine the third packet data based on the packet sequence number of the third packet data and send the third packet data to the receive end device through a target communication link, where the target communication link is a communication link with a minimum RTT; and the RTT threshold is determined based on the RTT of the target communication link; and the receive end device obtains the third packet data, and sends the third packet data. For a specific implementation of the third packet loss processing policy, refer to the detailed descriptions of operation S1006 to operation S1014 in the embodiment shown in FIG. 10A and FIG. 10B. Details are not described herein again.

Based on the foregoing embodiment corresponding to FIG. 15, in another embodiment of the data transmission apparatus 1500 provided in this embodiment of this application, the communication module 1501 is further configured to receive the data request information sent by the receive end device. For a specific implementation, refer to the detailed descriptions of operation S1013 in the embodiment shown in FIG. 10B. Details are not described herein again.

The processing module 1502 is further configured to determine the third packet data based on the packet sequence number of the third packet data. For a specific implementation, refer to the detailed descriptions of operation S1013 in the embodiment shown in FIG. 10B. Details are not described herein again.

The communication module 1501 is further configured to send the third packet data to the receive end device through the target communication link. For a specific implementation, refer to the detailed descriptions of operation S1014 in the embodiment shown in FIG. 10B. Details are not described herein again.

Based on the foregoing embodiment corresponding to FIG. 15, in another embodiment of the data transmission apparatus 1500 provided in this embodiment of this application, the processing module 1502 is further configured to group the plurality of pieces of packet data based on a preset condition, and perform FEC encoding on a plurality of pieces of packet data that belong to a same group, to generate redundant data corresponding to the group, where a plurality of pieces of packet data in each group are adjacent, and a plurality of pieces of packet data that belong to a same group and redundant data corresponding to the group include a same group identifier. For a specific implementation, refer to the detailed descriptions of operation S1104 in the embodiment shown in FIG. 11A. Details are not described herein again.

The processing module 1502 is configured to encapsulate the plurality of pieces of packet data in the transmission sequence, to obtain the plurality of pieces of encapsulated packet data, where a plurality of pieces of encapsulated packet data that belong to a same group and redundant data corresponding to the group include a same group identifier, where for a specific implementation, refer to the detailed descriptions of operation S1105 in the embodiment shown in FIG. 11A, and details are not described herein again; and replicate the plurality of pieces of packet data, and encapsulate a plurality of pieces of replicated packet data in the transmission sequence, to obtain a plurality of pieces of encapsulated replicated packet data, where for a specific implementation, refer to the detailed descriptions of operation S1105 in the embodiment shown in FIG. 11A, and details are not described herein again.

Based on the foregoing embodiment corresponding to FIG. 15, in another embodiment of the data transmission apparatus 1500 provided in this embodiment of this application, the plurality of pieces of packet data are a plurality of pieces of original packet data, the plurality of pieces of encapsulated packet data are a plurality of pieces of encapsulated original packet data, and a communication link, in the N communication links, for sending the plurality of pieces of encapsulated original packet data is an original communication link.

The communication module 1501 is configured to send the plurality of pieces of encapsulated original packet data to the receive end device in the transmission sequence through the original communication link, and send redundant data including a group identifier to the receive end device after a plurality of pieces of encapsulated original packet data including the same group identifier is sent, where for a specific implementation, refer to the detailed descriptions of operation S1106 in the embodiment shown in FIG. 11A, and details are not described herein again; and send the plurality of pieces of encapsulated replicated packet data to the receive end device in the transmission sequence through N−1 communication links, where for a specific implementation, refer to the detailed descriptions of operation S1106 in the embodiment shown in FIG. 11A, and details are not described herein again.

Based on the foregoing embodiment corresponding to FIG. 15, in another embodiment of the data transmission apparatus 1500 provided in this embodiment of this application, the target packet loss processing policy includes a fourth packet loss processing policy.

The fourth packet loss processing policy is that the receive end device obtains the first packet data from an FEC buffer queue when the receive end device obtains the second packet data and target redundant data, the first packet data has been sent, and the receive end device has not obtained the third packet data, where the first packet data, the second packet data, and the third packet data are all the original packet data, the first packet data, the second packet data, and the third packet data include a same group identifier, and redundant data that includes the same group identifier as the first packet data, the second packet data, and the third packet data is the target redundant data; and the receive end device performs repair processing based on the first packet data, the second packet data, and the target redundant data, to obtain the third packet data, and sends the third packet data. For a specific implementation of the fourth packet loss processing policy, refer to the detailed descriptions of operation S1107 to operation S1112 in the embodiment shown in FIG. 11A and FIG. 11B. Details are not described herein again.

Figure 16:
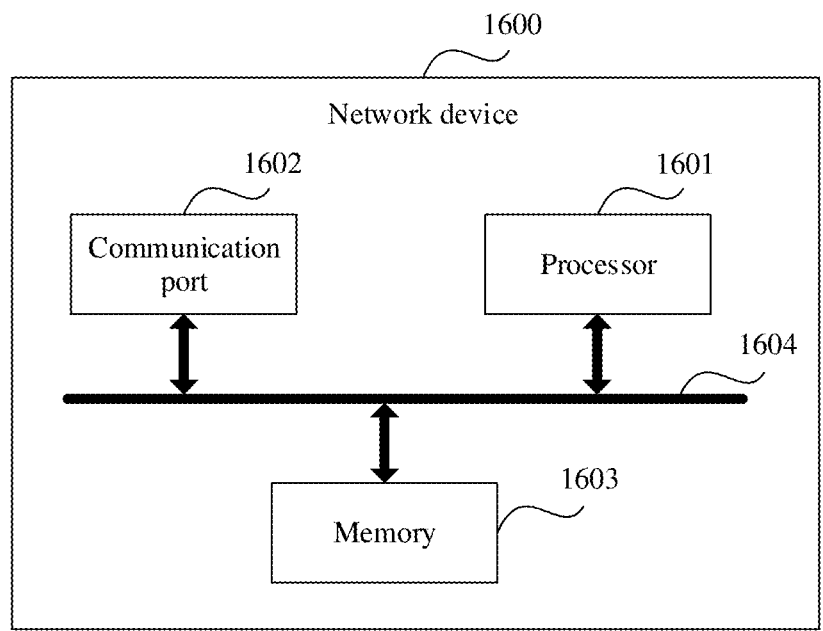
FIG. 16 is a schematic diagram of a structure of a network device according to an embodiment of this application.

FIG. 16 is a schematic diagram of a specific logical structure of a network device 1600 involved in the foregoing embodiments according to an embodiment of this application. The network device 1600 may include but is not limited to a processor 1601, a communication port 1602, a memory 1603, and a bus 1604. In this embodiment of this application, the processor 1601 is configured to perform control processing on an action of the network device 1600, and the processor 1601 is further configured to execute instructions stored in the memory 1603, to control the communication port 1602 to send and/or receive a signal.

It should be understood that the network device 1600 may be corresponding to the receive end device or the transmit end device in the foregoing method embodiments, and may be configured to perform the operations and/or procedures performed by the receive end device or the transmit end device in the foregoing method embodiments. Optionally, the memory 1603 may include a read-only memory and a random access memory, and provide instructions and data to the processor 1601. A part of the memory 1603 may further include a non-volatile random access memory. The memory 1603 may be an independent component, or may be integrated into the processor 1601.

The communication port 1602 may include a transmitter and a receiver. The communication port 1602 may further include an antenna, and there may be one or more antennas. The processor 1601, the communication port 1602, and the memory 1603 may be components integrated in different chips. For example, the processor 160 and the memory 1603 may be integrated into a baseband chip, and the communication port 1602 may be integrated into a radio frequency chip. Alternatively, the processor 1601, the communication port 1602, and the memory 1603 may be components integrated in a same chip. This is not limited in this application.

As a specific implementation, the network device 1600 is corresponding to the receive end device in the foregoing method embodiments. Based on this, when the modules in the embodiment shown in FIG. 13, such as the communication module 1301 and the processing module 1302, are implemented in a form of software, the communication module 1301 and the processing module 1302 may be stored in the memory 1603 in this embodiment, the processor 1601 runs the processing module 1302, and the communication port 1602 runs the communication module 1301, to implement the functions of the communication module 1301 and the processing module 1302 in the foregoing embodiment. For a specific implementation, refer to the detailed descriptions of the communication module 1301 and the processing module 1302 in the embodiment shown in FIG. 13. Details are not described herein again.

As a specific implementation, the network device 1600 is corresponding to the transmit end device in the foregoing method embodiments. Based on this, when the modules in the embodiment shown in FIG. 14, such as the communication module 1401 and the processing module 1402, are implemented in a form of software, the communication module 1401 and the processing module 1402 may be stored in the memory 1603 in this embodiment, the processor 1601 runs the processing module 1402, and the communication port 1602 runs the communication module 1401, to implement the functions of the communication module 1401 and the processing module 1402 in the foregoing embodiment. For a specific implementation, refer to the detailed descriptions of the communication module 1401 and the processing module 1402 in the embodiment shown in FIG. 14. Details are not described herein again.

As a specific implementation, the network device 1600 is corresponding to the transmit end device in the foregoing method embodiments. Based on this, when the modules in the embodiment shown in FIG. 15, such as the communication module 1501 and the processing module 1502, are implemented in a form of software, the communication module 1501 and the processing module 1502 may be stored in the memory 1603 in this embodiment, the processor 1601 runs the processing module 1502, and the communication port 1602 runs the communication module 1501, to implement the functions of the modules in the foregoing embodiment. For a specific implementation, refer to the detailed descriptions of the communication module 1501 and the processing module 1502 in the embodiment shown in FIG. 15. Details are not described herein again.

In addition, the processor 1601 may be a central processing unit, a general-purpose processor, a digital signal processor, an application-specific integrated circuit, a field-programmable gate array or another programmable logic device, a transistor logic device, a hardware component, or any combination thereof. The processor 1601 may implement or execute logical blocks, modules, and circuits in various examples described with reference to content disclosed in this application. Alternatively, the processor may be a combination of processors implementing a computing function, for example, a combination of one or more microprocessors, or a combination of a digital signal processor and a microprocessor. It may be clearly understood by a person skilled in the art that, for the purpose of convenient and brief description, for a detailed working process of the foregoing system, apparatus, and unit, refer to a corresponding process in the foregoing method embodiments. Details are not described herein again.

An embodiment of this application provides a receive end device, including at least one processor. The at least one processor is configured to execute a computer program stored in a memory, so that the transmit end device performs the method performed by the receive end device in any one of the foregoing method embodiments.

An embodiment of this application provides a transmit end device, including at least one processor. The at least one processor is configured to execute a computer program stored in a memory, so that the transmit end device performs the method performed by the transmit end device in any one of the foregoing method embodiments.

An embodiment of this application provides a communication system, including a transmit end device and a receive end device. The transmit end device performs the method performed by the receive end device in any one of the foregoing method embodiments, and the receive end device performs the method performed by the transmit end device in any one of the foregoing method embodiments.

An embodiment of this application provides a computer program product. The computer program product includes a computer program (which may also be referred to as code or instructions). When the computer program is run, a computer is enabled to perform the method performed by the receive end device in any one of the foregoing method embodiments, or perform the method performed by the transmit end device in any one of the foregoing method embodiments.

This application further provides a data transmission apparatus, including at least one processor. The at least one processor is configured to execute a computer program stored in a memory, so that the data transmission apparatus performs the method performed by the receive end device and/or the transmit end device in any one of the foregoing method embodiments.

It should be understood that the data transmission apparatus may be one or more chips. For example, the data transmission apparatus may be a field-programmable gate array (FPGA), an application-specific integrated circuit (ASIC), a system on chip (SoC), a central processing unit (CPU), a network processor (NP), a digital signal processor (DSP), a micro controller unit (MCU), a programmable logic device (PLD), or another integrated chip.

An embodiment of this application further provides a data transmission apparatus, including a processor and a communication interface. The communication interface is coupled to the processor. The communication interface is configured to input and/or output information. The information includes at least one of an instruction and data. The processor is configured to execute a computer program, so that the data transmission apparatus performs the method performed by the receive end device and/or the transmit end device in any one of the foregoing method embodiments.

An embodiment of this application further provides a data transmission apparatus, including a processor and a communication interface. The communication interface is coupled to the processor. The communication interface is configured to input and/or output information. The information includes at least one of an instruction and data. The processor is configured to execute a computer program, so that the data transmission apparatus performs the method performed by the receive end device and/or the transmit end device in any one of the foregoing method embodiments.

An embodiment of this application further provides a data transmission apparatus, including a processor and a memory. The memory is configured to store a computer program. The processor is configured to call the computer program from the memory and run the computer program, so that the data transmission apparatus performs the method performed by the receive end device and/or the transmit end device in any one of the foregoing method embodiments.

In an implementation process, the operations in the foregoing methods may be implemented by using a hardware integrated logic circuit in the processor, or by using instructions in a form of software. The operations of the method disclosed with reference to embodiments of this application may be directly performed by a hardware processor, or may be performed by a combination of hardware and software modules in the processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the operations in the foregoing methods in combination with hardware of the processor. To avoid repetition, details are not described herein again.

It should be noted that, the processor in this embodiment of this application may be an integrated circuit chip, and has a signal processing capability. In an implementation process, the operations in the foregoing method embodiments may be implemented by using a hardware integrated logic circuit in the processor, or by using instructions in a form of software. The processor may be a general-purpose processor, a digital signal processor (DSP), an application-specific integrated circuit (ASIC), a field-programmable gate array (FPGA) or another programmable logic device, a discrete gate or a transistor logic device, or a discrete hardware component. The processor may implement or perform the methods, operations, and logical block diagrams that are disclosed in embodiments of this application. The general-purpose processor may be a microprocessor, or the processor may be any conventional processor or the like. The operations of the method disclosed with reference to embodiments of this application may be directly performed and completed by a hardware decoding processor, or may be performed and completed by using a combination of hardware in the decoding processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the operations in the foregoing methods in combination with hardware of the processor.

It may be understood that the memory in this embodiment of this application may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) and is used as an external cache. By way of example and not limitation, RAMs in many forms may be used, such as a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memory in the systems and methods described in this specification includes but is not limited to these and any memory of another appropriate type.

According to the methods provided in embodiments of this application, this application further provides a computer program product. The computer program product includes computer program code. When the computer program code is run on a computer, the computer is enabled to perform the methods performed by the units in the embodiments shown in FIG. 3, FIG. 8, FIG. 9, FIG. 10A and FIG. 10B, FIG. 11A and FIG. 11B, and FIG. 12.

According to the methods provided in embodiments of this application, this application further provides a computer-readable storage medium. The computer-readable storage medium stores program code. When the program code is run on a computer, the computer is enabled to perform the methods performed by the units in the embodiments shown in FIG. 3, FIG. 8, FIG. 9, FIG. 10A and FIG. 10B, FIG. 11A and FIG. 11B, and FIG. 12.

The modules in the foregoing apparatus embodiments are completely corresponding to the units in the method embodiments. Corresponding modules or units perform corresponding operations. For example, a communication unit (e.g., a transceiver) performs the receiving or transmitting operation in the method embodiments, and other operations except transmitting and receiving may be performed by a processing unit (e.g., a processor). For a function of a specific unit, refer to a corresponding method embodiment. There may be one or more processors.

Terms such as "component", "module", and "system" used in this specification are used to indicate a computer-related entity, hardware, firmware, a combination of hardware and software, software, or software being executed. For example, a component may be, but is not limited to, a process that is run on a processor, a processor, an object, an executable file, a thread of execution, a program, and/or a computer. As illustrated by using figures, both a computing device and an application that is run on the computing device may be components. One or more components may reside within a process and/or a thread of execution, and a component may be located on one computer and/or distributed between two or more computers. In addition, these components may be executed by various computer-readable media that store various data structures. The components may communicate by using a local and/or remote process and based on, for example, a signal having one or more data packets (for example, data from two components interacting with another component in a local system, in a distributed system, and/or across a network such as the Internet interacting with other systems by using the signal).

A person of ordinary skill in the art may be aware that, in combination with the examples described in embodiments disclosed in this specification, units and algorithm operations can be implemented by electronic hardware or a combination of computer software and electronic hardware. Whether the functions are implemented by hardware or software depends on particular applications and design constraint conditions of the technical solutions. A person skilled in the art may use different methods to implement the described functions for particular applications, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In several embodiments provided in this application, it should be understood that the disclosed system, apparatus, and method may be implemented in another manner. For example, the described apparatus embodiment is merely an example. For example, division into the units is merely logical function division and may be other division in an actual implementation. For example, a plurality of units or components may be combined or integrated into another system, or some features may be omitted or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions in this application essentially, or the part contributing to the conventional technology, or some of the technical solutions may be implemented in a form of a software product. The computer software product is stored in a storage medium and includes several instructions for instructing a computer device (which may be a personal computer, a server, a network device, or the like) to perform all or some of the operations of the method in embodiments of this application. The foregoing storage medium includes any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data transmission method, comprising:

receiving, by a receive end device through an original communication link in N communication links, a plurality of pieces of encapsulated original packet data sent by a transmit end device, wherein the plurality of pieces of encapsulated original packet data are obtained by encapsulating packet data in a plurality of pieces of original packet data in a transmission sequence, each piece of encapsulated original packet data comprises packet data and a packet sequence number that indicates a rank of corresponding encapsulated original packet data in the plurality of pieces of encapsulated original packet data, a rank of each piece of encapsulated original packet data in the plurality of pieces of encapsulated original packet data is consistent with that in the transmission sequence, and N is greater than or equal to 2;

receiving, by the receive end device through an $(N-1)^{th}$ communication link, different from the original communication link, in the N communication links, a plurality of pieces of encapsulated replicated packet data sent by the transmit end device, wherein the plurality of pieces of encapsulated replicated packet data are obtained by encapsulating a plurality of pieces of replicated packet data, and the plurality of pieces of replicated packet data are obtained by replicating packet data in the plurality of pieces of original packet data;

performing, by the receive end device, unpacking processing on the plurality of pieces of encapsulated original packet data, and on the plurality of pieces of encapsulated replicated packet data, to obtain the plurality of pieces of original packet data and packet sequence numbers of the plurality of pieces of original packet data;

determining, by the receive end device, the transmission sequence based on the packet sequence numbers of the plurality of pieces of original packet data; and sending, by the receive end device, the plurality of pieces of original packet data in the transmission sequence.

2. The method according to claim 1, wherein the encapsulated original packet data further comprises indication information that indicates a target packet loss processing policy; and before receiving, through the N communication links, the plurality of pieces of encapsulated original packet data, the method further comprises:

sending, by the receive end device, an acknowledgment message to the transmit end device, wherein the acknowledgment message indicates that the receive end device supports the target packet loss processing policy.

3. The method according to claim 1, wherein the plurality of pieces of encapsulated original packet data comprise first packet data and second packet data that are adjacent packet data, and wherein a packet sequence number of the first packet data indicates that a rank of the first packet data in the plurality of pieces of encapsulated original packet data is prior to a rank of the second packet data in the plurality of pieces of encapsulated original packet data;

wherein performing unpacking processing on the plurality of pieces of encapsulated original packet data comprises:

performing, by the receive end device, unpacking processing on the plurality of pieces of encapsulated original packet data, to obtain the second packet data and a packet sequence number of the second packet data;

wherein determining the transmission sequence based on the packet sequence numbers of the plurality of pieces of original packet data comprises:

determining, by the receive end device based on the packet sequence number of the second packet data, that the second packet data is sent after the first packet data; and wherein sending the plurality of pieces of original packet data in the transmission sequence comprises:

sending, by the receive end device, the second packet data if it is determined that the first packet data has been sent.

4. The method according to claim 2, wherein the plurality of pieces of encapsulated original packet data comprise first packet data and second packet data that are non-adjacent packet data, and wherein a packet sequence number of the first packet data indicates that a rank of the first packet data in the plurality of pieces of encapsulated original packet data is prior to a rank of the second packet data in the plurality of pieces of encapsulated original packet data.

5. The method according to claim 4, wherein performing unpacking processing on the plurality of pieces of encapsulated original packet data comprises:

performing, by the receive end device, unpacking processing on the plurality of pieces of encapsulated original packet data, to obtain the second packet data and a packet sequence number of the second packet data;

wherein determining the transmission sequence based on the packet sequence numbers of the plurality of pieces of original packet data comprises:

determining, by the receive end device based on the packet sequence number of the second packet data, that the second packet data is sent after the first packet data; and wherein sending the plurality of pieces of original packet data in the transmission sequence comprises:

buffering, by the receive end device, the second packet data if it is determined that the first packet data has been sent;

performing, by the receive end device, unpacking processing on the plurality of pieces of encapsulated original packet data, to obtain third packet data and a packet sequence number of the third packet data, wherein the packet sequence number of the third packet data indicates that a rank of the third packet data in the plurality of pieces of encapsulated original packet data is posterior to the rank of the first packet data in the plurality of pieces of encapsulated original packet data, and the third packet data and the first packet data are adjacent packet data in the plurality of pieces of encapsulated original packet data; and sending, by the receive end device, the third packet data.

6. The method according to claim 4, wherein performing unpacking processing on the plurality of pieces of encapsulated original packet data comprises:

performing, by the receive end device, unpacking processing on the plurality of pieces of encapsulated original packet data, to obtain the second packet data, a packet sequence number of the second packet data, and the target packet loss processing policy, wherein the target packet loss processing policy comprises a first packet loss processing policy;

wherein determining the transmission sequence based on the packet sequence numbers of the plurality of pieces of original packet data comprises:

determining, by the receive end device based on the packet sequence number of the second packet data, that the second packet data is sent after the first packet data; and wherein sending the plurality of pieces of original packet data in the transmission sequence comprises:

executing, by the receive end device, the first packet loss processing policy if it is determined that the first packet data has been sent;

buffering, by the receive end device, the second packet data; and sending, by the receive end device, the second packet data if a buffer time of the second packet data is greater than a first time threshold.

7. The method according to claim 4, wherein performing unpacking processing on the plurality of pieces of encapsulated original packet data comprises:

performing, by the receive end device, unpacking processing on the plurality of pieces of encapsulated original packet data, to obtain the second packet data, a packet sequence number of the second packet data, and the target packet loss processing policy, wherein the target packet loss processing policy comprises a second packet loss processing policy;

wherein determining the transmission sequence based on the packet sequence numbers of the plurality of pieces of original packet data comprises:

determining, by the receive end device based on the packet sequence number of the second packet data, that the second packet data is sent after the first packet data; and wherein sending the plurality of pieces of original packet data in the transmission sequence comprises:

executing, by the receive end device, the second packet loss processing policy if it is determined that the first packet data has been sent;

determining, by the receive end device, a first time point at which first encapsulated packet data is received and a second time point at which second encapsulated packet data is received, wherein the first encapsulated packet data comprises the first packet data, and the second encapsulated packet data comprises the second packet data; and sending, by the receive end device, the second packet data if a difference between the first time point and the second time point is greater than a second time threshold.

8. The method according to claim 4, wherein performing unpacking processing on the plurality of pieces of encapsulated original packet data comprises:

performing, by the receive end device, unpacking processing on the plurality of pieces of encapsulated original packet data, to obtain the second packet data, a packet sequence number of the second packet data, and the target packet loss processing policy, wherein the target packet loss processing policy comprises a third packet loss processing policy;

wherein determining the transmission sequence based on the packet sequence numbers of the plurality of pieces of original packet data comprises:

determining, by the receive end device based on the packet sequence number of the second packet data, that the second packet data is sent after the first packet data; and wherein sending the plurality of pieces of original packet data in the transmission sequence comprises:

executing, by the receive end device, the third packet loss processing policy if it is determined that the first packet data has been sent;

buffering, by the receive end device, the second packet data;

sending, by the receive end device, data request information to the transmit end device if the receive end device has not obtained third packet data within a round trip time (RTT) threshold, wherein the data request information carries a packet sequence number of the third packet data;

the data request information indicates the transmit end device to determine the third packet data based on the packet sequence number of the third packet data and send the third packet data to the receive end device through a target communication link, wherein the target communication link is a communication link with a minimum RTT; and the RTT threshold is determined based on the RTT of the target communication link; and obtaining, by the receive end device, the third packet data, and sending the third packet data.

9. The method according to claim 8, wherein the method further comprises:

detecting, by the receive end device, an RTT of each communication link, to determine RTTs of communication links;

determining, by the receive end device, a communication link with a minimum RTT in the RTTs of the communication links as the target communication link; and determining, by the receive end device, the RTT threshold based on the RTT of the target communication link.

10. The method according to claim 1, further comprising:

receiving, by the receive end device through the original communication link, a plurality of pieces of redundant data that are sent by the transmit end device, wherein the redundant data is generated by grouping the plurality of pieces of original packet data based on a preset condition and performing forward error correction (FEC) encoding on a plurality of pieces of original packet data that belong to a same group, and wherein a plurality of pieces of encapsulated original packet data that belong to the same group and redundant data corresponding to the group comprise a same group identifier.

11. The method according to claim 10, wherein the plurality of pieces of encapsulated original packet data that belong to the same group comprise first packet data, second packet data, and third packet data, wherein the first packet data, the second packet data, and the third packet data comprise a same group identifier, and redundant data that comprises the same group identifier as the first packet data, the second packet data, and the third packet data is target redundant data;

wherein performing unpacking processing on the plurality of pieces of encapsulated original packet data comprises:

performing, by the receive end device, unpacking processing on the plurality of pieces of encapsulated original packet data, to obtain the second packet data, a packet sequence number of the second packet data, and a target packet loss processing policy, wherein the target packet loss processing policy comprises a fourth packet loss processing policy;

wherein determining the transmission sequence based on the packet sequence numbers of the plurality of pieces of original packet data comprises:

determining, by the receive end device based on the packet sequence number of the second packet data, that the second packet data is sent after the first packet data; and wherein sending, the plurality of pieces of original packet data in the transmission sequence comprises:

executing, by the receive end device, the fourth packet loss processing policy if it is determined that the first packet data has been sent and the first packet data is buffered in an FEC buffer queue;

obtaining, by the receive end device, the first packet data from the FEC buffer queue;

performing, by the receive end device, repair processing based on the first packet data, the second packet data, and the target redundant data, to obtain the third packet data; and sending, by the receive end device, the third packet data.

12. A data transmission method, comprising:

obtaining, by a transmit end device, a plurality of pieces of original packet data in a transmission sequence;

encapsulating, by the transmit end device, the plurality of pieces of original packet data in the transmission sequence, to obtain a plurality of pieces of encapsulated original packet data, wherein each piece of encapsulated original packet data comprises packet data and a packet sequence number that indicates a rank of corresponding encapsulated original packet data in the plurality of pieces of encapsulated original packet data, and a rank of each piece of encapsulated original packet data in the plurality of pieces of encapsulated original packet data is consistent with that in the transmission sequence;

replicating, by the transmit end device, the plurality of pieces of original packet data, to obtain a plurality of pieces of replicated packet data;

encapsulating the plurality of pieces of replicated packet data, to obtain a plurality of pieces of encapsulated replicated packet data;

sending, by the transmit end device, the plurality of pieces of encapsulated original packet data to a receive end device in the transmission sequence through an original communication link in N communication links, wherein N is greater than or equal to 2; and sending, by the transmit end device, the plurality of pieces of encapsulated replicated packet data to the receive end device in the transmission sequence through an $(N-1)^{th}$ communication links, different from the original communication link, in the N communication links.

13. The method according to claim 12, wherein each piece of encapsulated original packet data further comprises indication information that indicates a target packet loss processing policy; and before encapsulating the plurality of pieces of original packet data in the transmission sequence, the method further comprises:

receiving, by the transmit end device, an acknowledgment message sent by the receive end device, wherein the acknowledgment message indicates that the receive end device supports the target packet loss processing policy.

14. The method according to claim 12, wherein the plurality of pieces of encapsulated original packet data comprise first packet data and second packet data that are adjacent, a packet sequence number of the first packet data indicates that a rank of the first packet data in the plurality of pieces of encapsulated original packet data is prior to a rank of the second packet data in the plurality of pieces of encapsulated original packet data.

15. The method according to claim 13, wherein the plurality of pieces of encapsulated original packet data comprise first packet data and second packet data that are non-adjacent, a packet sequence number of the first packet data indicates that a rank of the first packet data in the plurality of pieces of encapsulated original packet data is prior to a rank of the second packet data in the plurality of pieces of encapsulated original packet data.

16. The method according to claim 15, wherein the target packet loss processing policy comprises a first packet loss processing policy; and the first packet loss processing policy specifies that the receive end device buffers the second packet data; and the receive end device sends the second packet data if a buffer time of the second packet data is greater than a first time threshold.

17. The method according to claim 15, wherein the target packet loss processing policy comprises a second packet loss processing policy; and the second packet loss processing policy specifies that the receive end device determines a first time point at which first encapsulated packet data is received and a second time point at which second encapsulated packet data is received, wherein the first encapsulated packet data comprises the first packet data, and the second encapsulated packet data comprises the second packet data; and the receive end device sends the second packet data if a difference between the first time point and the second time point is greater than a second time threshold.

18. The method according to claim 15, wherein the target packet loss processing policy comprises a third packet loss processing policy; and the third packet loss processing policy specifies that the receive end device buffers the second packet data;

the receive end device sends data request information to the transmit end device if the receive end device has not obtained third packet data within a round trip time (RTT) threshold, wherein the data request information carries a packet sequence number of the third packet data; the data request information indicates the transmit end device to determine the third packet data based on the packet sequence number of the third packet data and send the third packet data to the receive end device through a target communication link, wherein the target communication link is a communication link with a minimum RTT; and the RTT threshold is determined based on the RTT of the target communication link; and the receive end device obtains the third packet data, and sends the third packet data.

19. The method according to claim 18, wherein the method further comprises:

receiving, by the transmit end device, the data request information sent by the receive end device;

determining, by the transmit end device, the third packet data based on the packet sequence number of the third packet data; and sending, by the transmit end device, the third packet data to the receive end device through the target communication link.

20. A receive end device, comprising:

a processor; and a memory coupled to the processor and storing instructions, which when executed by the processor, cause the receive end device to:

receive, through an original communication link in N communication links, a plurality of pieces of encapsulated original packet data sent by a transmit end device, wherein the plurality of pieces of encapsulated original packet data are obtained by encapsulating packet data in a plurality of pieces of original packet data in a transmission sequence, each piece of encapsulated original packet data comprises packet data and a packet sequence number that indicates a rank of corresponding encapsulated original packet data in the plurality of pieces of encapsulated original packet data, a rank of each piece of encapsulated original packet data in the plurality of pieces of encapsulated original packet data is consistent with that in the transmission sequence, and N is greater than or equal to 2;

receive, through an $(N-1)^{th}$ communication link, different from the original communication link, in the N communication links, a plurality of pieces of encapsulated replicated packet data sent by the transmit end device, wherein the plurality of pieces of encapsulated replicated packet data are obtained by encapsulating a plurality of pieces of replicated packet data, and the plurality of pieces of replicated packet data are obtained by replicating packet data in the plurality of pieces of original packet data;

perform unpacking processing on the plurality of pieces of encapsulated original packet data, and on the plurality of pieces of encapsulated replicated packet data, to obtain the plurality of pieces of original packet data and packet sequence numbers of the plurality of pieces of original packet data;

determine the transmission sequence based on the packet sequence numbers of the plurality of pieces of original packet data; and send the plurality of pieces of original packet data in the transmission sequence.

21. The method according to claim 1, wherein the N communication links comprises a wireless fidelity (Wi-Fi) network connection or a 5G connection.

\* \* \* \* \*